United States Patent
Yamaguchi et al.

(10) Patent No.: US 8,340,445 B2
(45) Date of Patent: Dec. 25, 2012

(54) IMAGE ENCODING DEVICE, IMAGE ENCODING METHOD, IMAGE ENCODING/DECODING SYSTEM

(75) Inventors: Masayuki Yamaguchi, Osaka (JP); Akihisa Yamada, Osaka (JP); Shinichi Maeta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 402 days.

(21) Appl. No.: 12/733,904

(22) PCT Filed: Sep. 30, 2008

(86) PCT No.: PCT/JP2008/067762
§ 371 (c)(1),
(2), (4) Date: Mar. 26, 2010

(87) PCT Pub. No.: WO2009/044744
PCT Pub. Date: Apr. 9, 2009

(65) Prior Publication Data
US 2010/0220936 A1 Sep. 2, 2010

(30) Foreign Application Priority Data

Oct. 1, 2007 (JP) .................................. 2007-257981
May 21, 2008 (JP) .................................. 2008-133522

(51) Int. Cl.
*G06K 9/36* (2006.01)
*G06K 9/46* (2006.01)
*H04B 14/04* (2006.01)
*H04B 14/06* (2006.01)

(52) U.S. Cl. .................. 382/238; 375/242; 375/244

(58) Field of Classification Search .................. None
See application file for complete search history.

(56) References Cited

U.S. PATENT DOCUMENTS 5,128,963 A * 7/1992 Akagiri .................. 375/244
(Continued)

FOREIGN PATENT DOCUMENTS

JP 02-285720 11/1990
(Continued)

OTHER PUBLICATIONS

Liang-Bi Chen et al., "Design of a Dynamic PCM Selector for Non-deterministic Environment," Proceedings of the IEEE Asia Pacific Conference on Circuits and System, 2006 (APCCAS 2006), Dec. 4-7, 2006, pp. 1124-1127.
International Search Report dated Nov. 4, 2008.

*Primary Examiner* — Li Liu
(74) *Attorney, Agent, or Firm* — Harness, Dickey & Pierce, P.L.C.

(57) ABSTRACT

An image encoding device comprises: a predicted value generation means for predicting target pixel data which is the pixel data of an encoding target pixel to generate predicted value data; a subtractor for calculating the difference value between the target pixel data and the predicted value data to generate difference value data; an encoding mode decision means for determining an encoding mode based on the difference value data and temporarily holding it in a buffer; an encoding target decision means for determining which data of the target pixel or the difference value is used as encoding target data to be encoded based on the encoding mode; a quantization means for applying a quantization processing to the encoding target data based on the encoding mode to generate quantized data; and a fixed-length code generation means for adding the encoding mode to the quantized data to generate a fixed-length code.

38 Claims, 22 Drawing Sheets

U.S. PATENT DOCUMENTS

| | | | |
|---|---|---|---|
| 2004/0202375 A1* | 10/2004 | Kalevo | 382/239 |
| 2008/0175498 A1* | 7/2008 | Lee et al. | 382/238 |
| 2008/0226183 A1* | 9/2008 | Lei et al. | 382/238 |
| 2009/0135921 A1* | 5/2009 | Lei et al. | 375/245 |

FOREIGN PATENT DOCUMENTS

| | | |
|---|---|---|
| JP | 06-319128 | 11/1994 |
| JP | 2002-078016 | 3/2002 |

* cited by examiner

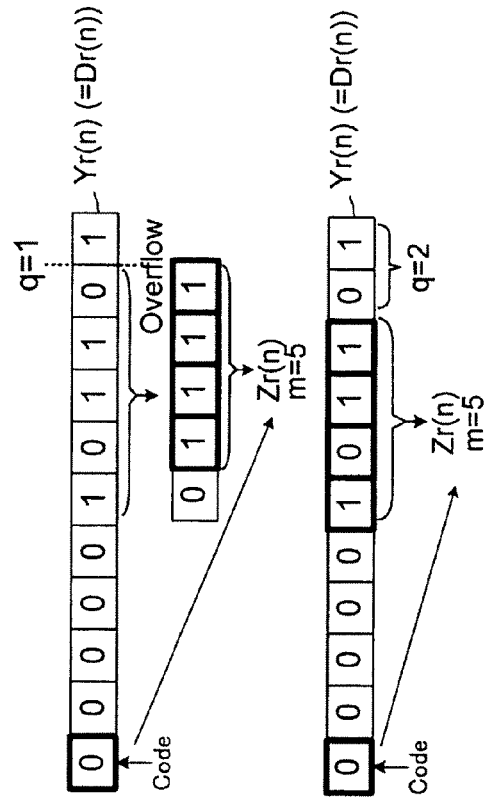
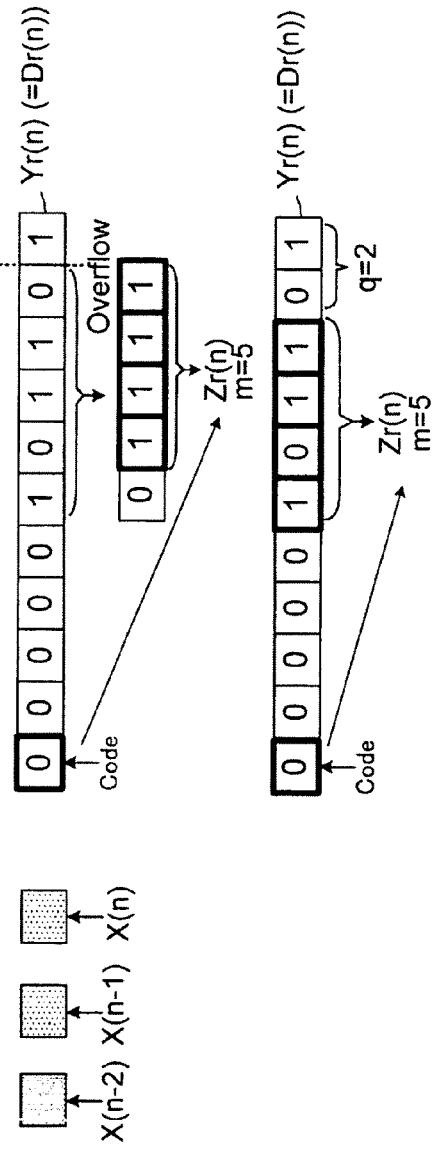
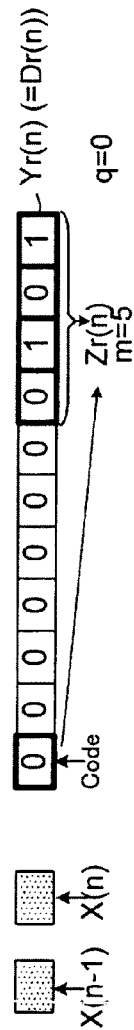
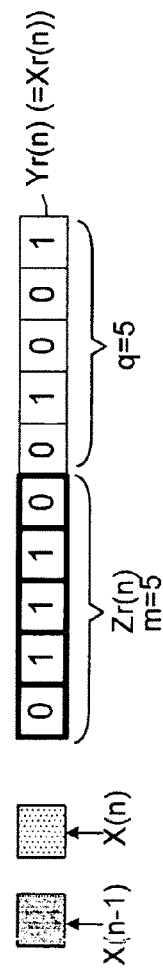
FIG. 4A
FIG. 4B
FIG. 4C

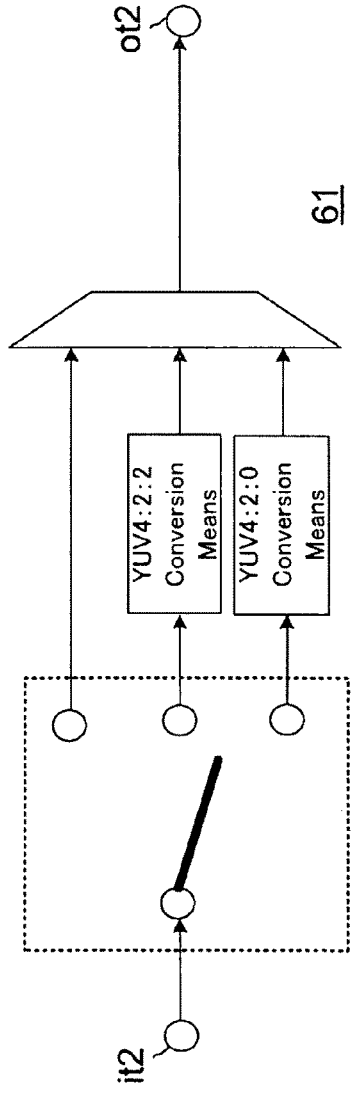
FIG. 13A
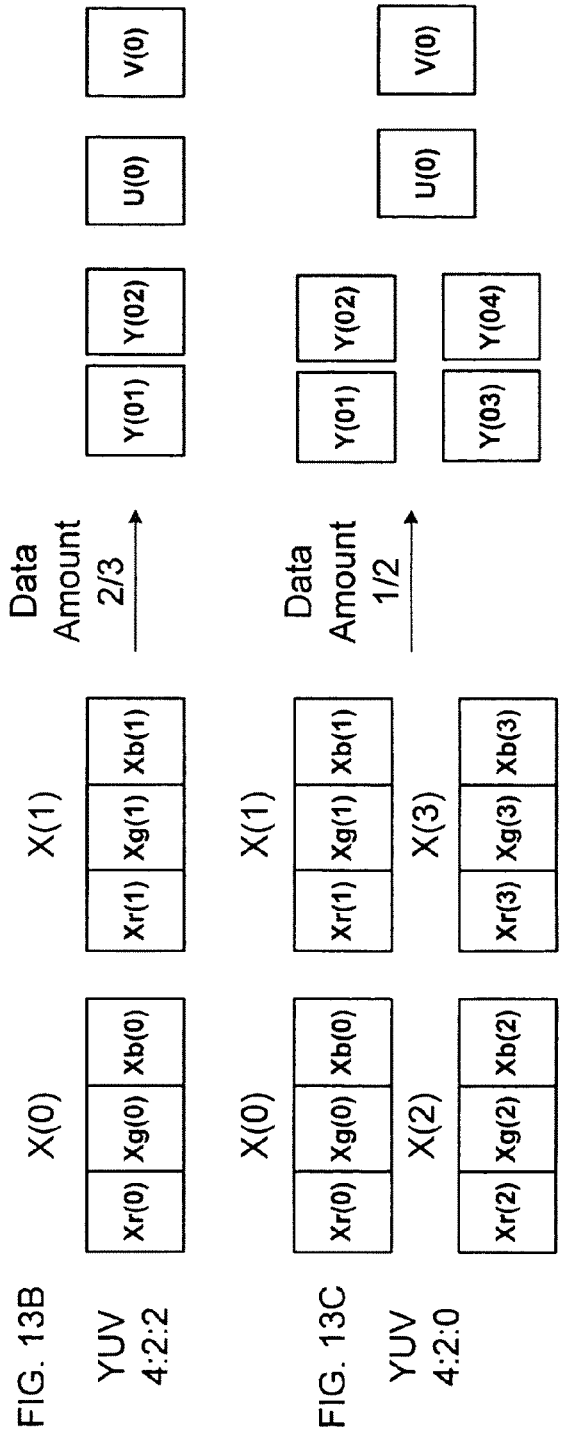
FIG. 13B
YUV 4:2:2
FIG. 13C
YUV 4:2:0

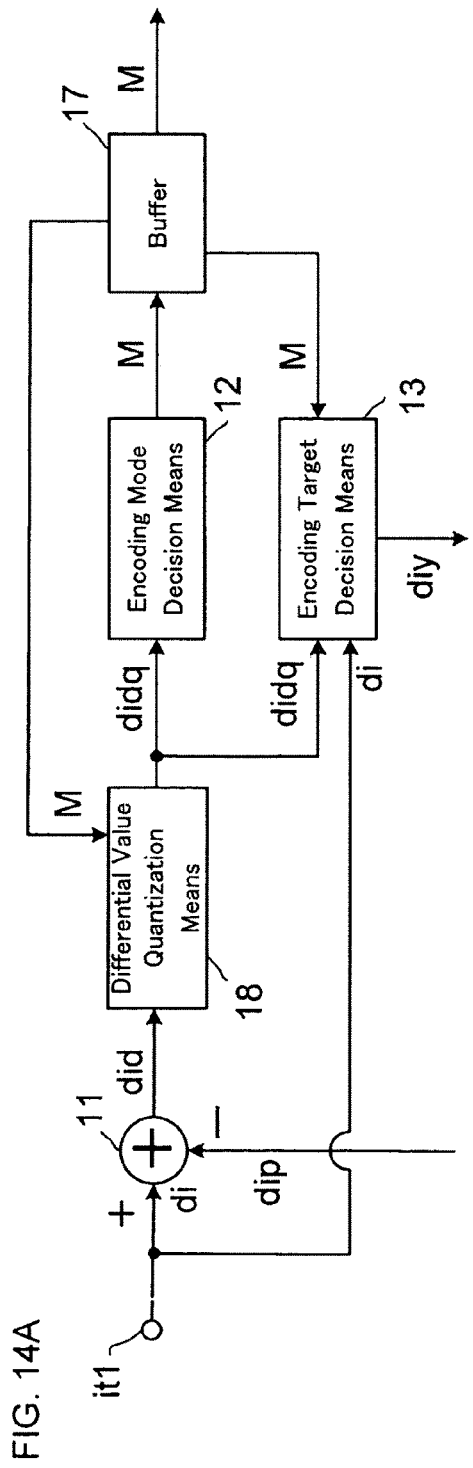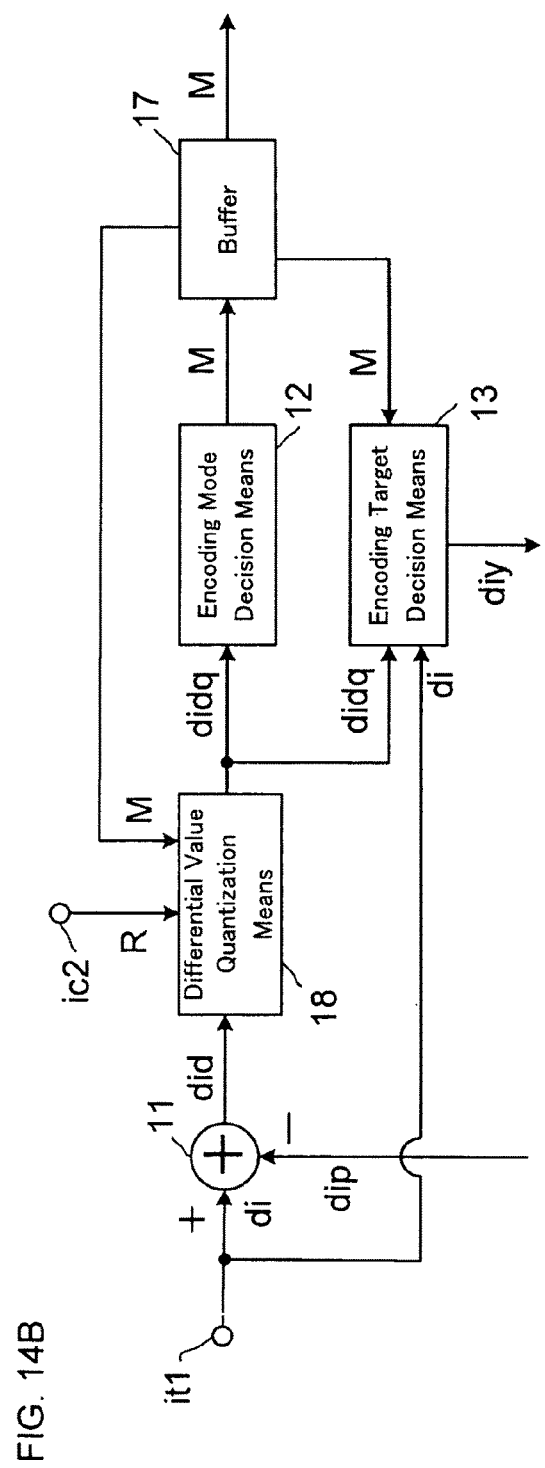

FIG. 19A
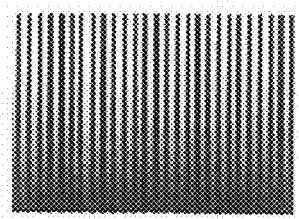
STRIPE_GRAD
FIG. 19B
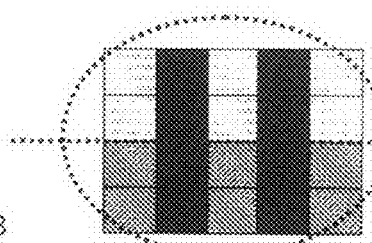
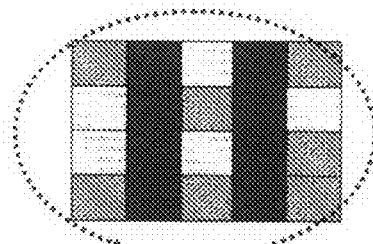
False Contour appears.
STRIPE_GRAD_A
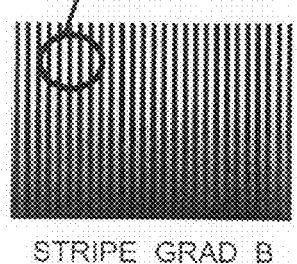
STRIPE_GRAD_B

IMAGE ENCODING DEVICE, IMAGE ENCODING METHOD, IMAGE ENCODING/DECODING SYSTEM

CROSS-REFERENCE TO RELATED APPLICATIONS

This application is a National Phase filing under 35 U.S.C. §371 of International Application No. PCT/JP2008/067762 filed on Sep. 30, 2008, and which claims priority to Japanese Patent Applications No. 2007-257981 filed on Oct. 1, 2007 and No. 2008-133522 filed on-May 21, 2008.

TECHNICAL FIELD

The present invention relates to an image encoding device, and particularly relates to the image encoding device suitable for reducing an image memory capacity and an access band width, with the device incorporated into an image memory interface and a bus interface, and relates to an image encoding method. Further, the present invention relates to an image encoding device that performs encoding by using such an encoding method, and relates to an image encoding/decoding system including an image decoding device for decoding encoded data.

BACKGROUND ART

Amounts of image data to be processed by a device and a system go on increasing explosively, with a fast growing development of a semiconductor technique and higher definition of the image data of recent years. Meanwhile, in many cases, intermediate image data in a middle of processing needs to be temporarily held during processing of image information.

In an image information processing apparatus, the image data is generally stored in an internal buffer or an external memory through a memory interface or a bus. However, for example, when 60 full high-vision images of 30 bits transmitted per second are processed, while holding the intermediate image data of three screens per one screen, a data transfer capacity of 1920 (pixel)×1080 (pixel)×60 (images)×30 (bit)×3 (screen)×2 (the number of times of read/write))= about 22.4 G bits/second, and the memory capacity of 1920 (pixel)×1080 (pixel)×30 (bit)×3 (screen)=about 186 M bits, are needed, to thereby make it difficult to realize the processing in a practical circuit. Therefore, reduction of the amount of data stored in a memory is extremely important.

As one of the methods of reducing the amount of data, there is a method of performing encoding processing to the image data. As such an encoding method, conventionally, there are methods such as PCM (Pulse Code Modulation) and DPCM (Differential Pulse Code Modulation).

The PCM is a method of carrying out sampling of a signal in every fixed time, and quantizing the sampled signal to an integer value of defined bits, and this is originally a method of converting an analogue signal to a digital signal. However, the PCM can also be applied to a compression of digital data. Meanwhile, the DPCM is a predictive encoding method of not encoding a sampled value as it is, but encoding a differential value between the sampled value and a signal value of a predicted image. Further, an adaptive DPCM (ADPCM) method is proposed as an improvement of the DPCM method, wherein a quantization step is adaptively changed by using information such as local complexity of the image.

Various image compression techniques are proposed other than the PCM and DPCM. For example, a variable length encoding method such as Huffman encoding is employed in a part of various compression methods, particularly as a reversible conversion, and a complicated processing technique using an orthogonal conversion represented by DCT (Discrete Cosine Transform) is employed in an image compression algorithm aiming at a high compression rate such as JPEG and MPEG.

Incidentally, in a case of an image compression directed to the image memory interface, it is desirable to reduce the image degradation due to compression as small as possible, under restriction that an encoding delay is small and a fixed length code is used for the image data. This is because when the encoding delay is large, processing time is increased, because it takes time to set the intermediate image data stored in the memory, in an utilizable state in a later processing. Further, this is because when an encoding length of the encoded data after applying compression to each pixel data is not fixed, it is necessary to manage which address is used to store the encoded data for each pixel data, or it is necessary to perform re-calculation for every access.

According to the predictive encoding method such as DPCM method and ADPCM method, the encoding delay is small, and the image data can be encoded with fixed length for every pixel. However, in order to encode with a fixed length, when encoding is applied to an image at a part, where the differential value is large, like an edge of the image, with the same bits as bits required for encoding at a part where the differential value is small, there is a problem that image degradation is easily generated. Reversely, in order to prevent the image degradation, when encoding is performed with the same bits as bits required for encoding at a part where the differential value is large, encoding with unnecessarily large bits is performed at a part where the differential value is small, resulting in an increase of the bits as a whole after encoding.

Further, a gradation value is quantized as it is by the PCM method, and therefore the difference of the image data between neighboring pixels is poorly reproduced, thus generating the image degradation due to lack of a nuance of the image.

Under such a background, patent document 1 as described below discloses a device for reducing and preventing the image degradation by selecting encoding means with small signal degradation, out of the means for encoding an input sample value (PCM processing) and the means for applying differential encoding to the input sample value (DPCM processing).

FIG. 21 is a block diagram showing an outline structure of an encoding device of the patent document 1 as described below.

A conventional encoding device 101 shown in FIG. 21 includes: a subtractor 142; PCM quantization means 144; DPCM quantization means 146, PCM inverse quantization means 148, DPCM inverse quantization means 150; prediction means 156; and a decision circuit 159. The PCM quantization means 144 quantizes input data xi inputted from an input terminal 140 by PCM processing, and transmits the obtained data to a contact point "a" between the PCM inverse quantization means 148 and a switch 160. The subtractor 142 generates differential value data ei between input data xi and predicted value data xip predicted by the prediction means 156, and transmits it to the DPCM quantization means 146. The DPCM quantization means 146 quantizes the differential value data ei by DPCM processing, and transmits the obtained data to the DPCM inverse quantization means 150 and a contact point "b" of the switch 160.

The PCM inverse quantization means 148 restores the data to original input data based on PCM quantized data outputted from the PCM quantization means 144, and transmits it to the contact point "a" of a switch 158. Further, the DPCM inverse quantization means 150 restores the data to original input data based on the DPCM quantized data outputted from the DPCM quantization means 146, and transmits it to the contact point "b" of the switch 158.

The decision circuit 159 compares an absolute value of the differential value data ei serving as an output of the subtractor 142, with a prescribed threshold value, and when the absolute value is larger than the threshold value, connects the switches 158 and 160 to the contact point "a" side, and when the absolute value is smaller than or equal to the threshold value, connects both switches to the contact point "b" side. Thus, the quantized data based on the PCM quantization means 144 is used at an edge portion of the image, and the quantized data based on the DPCM quantization means 146 is used at a part where the differential value is small. Note that in FIG. 21, outputted data is expressed as output data yi.

Note that appearance probability of the differential value between the input data xi and the predicted value data xip is focused in the neighborhood of 0, and therefore, in a normal state, the switches 158 and 160 are connected to the contact point "b" side. Only when the absolute value of the differential value data ei exceeds the threshold value, the DPCM quantization means 146 transmits the quantized data after a prescribed control code is previously transmitted, showing switch of a connection. When the control code is recognized, the switch 160 switches the connection to the-contact point "a" side. Note that normally, quantization is achieved with less bits in a case that the data is quantized by DPCM processing, compared with PCM processing, and therefore excess bits are generated, and the excess bits can be used as the control code.

FIG. 22 is a block diagram showing an outline structure of a decoding device corresponding to FIG. 21. The decoding device is used for restoring the image data from the data to which encoding processing is applied by the encoding device shown in FIG. 21.

A conventional decoding device 102 shown in FIG. 22 includes: PCM inverse quantization means 168; DPCM inverse quantization means 170; and control code detecting means 178.

When detecting a control code is added to the inputted encoded data yi, the control code detecting means 178 connects a switch 180 to the contact point "a", so that inverse quantized data is outputted by the PCM inverse quantization means 168. Further, as long as the control code is not detected, the control code detecting means 178 connects the switch 180 to the contact point "b", so that the inverse quantized data by the DPCM inverse quantization means 170 is outputted.

According to the above-described conventional method, at a normal time, the quantization can be performed by DPCM processing, and in the neighborhood of the edge of the image where the differential value from the neighboring pixel is large, the quantization can be performed by PCM processing.

Patent document 1: Japanese Patent Laid Open Publication No. 02-285720

DISCLOSURE OF THE INVENTION

Problems to be Solved by the Invention

In a case of the method according to the patent document 1, when the PCM processing and the DPCM processing are switched, the control code showing such switching needs to be newly transmitted as encoded data. Therefore, as a result, original pixel data and the encoded data do not correspond to each other, thus involving a problem that an encoding length with respect to the whole image data is not a complete fixed length.

As a simplest method for solving such a problem, a method of adding a flag of 1 bit can be considered, thereby showing which processing of the PCM processing and DPCM processing is used for every pixel component. However, as described above, in order to fix the encoding length, when the quantization step in the PCM processing is completely conformed to the quantization step in the DPCM processing, the image degradation is caused at a part where a differential value is large like the edge of the image. Further, reversely, when the quantization step in the DPCM processing is completely conformed to the quantization step in the PCM processing, the data is encoded with unnecessarily large bits, thus increasing required bits, resulting in decrease of a compression rate. The compression rate is further decreased, by adding the flag of 1 bit to each component when the image data, which is normally expressed by a plurality of components such as RGB, is encoded.

Further, the image data has a tendency of having a different distribution of gradation values and differential values, with the complexity of the image locally increased in the neighborhood of the edge of the image. Generally, it is known that the distribution of the differential values of the neighboring pixels in the image data is close to Laplace distribution with 0 as a center. However, the distribution of the differential values, in which only difference of edge-neighborhood pixels is set as the population, is not the Laplace distribution with 0 as a center. Therefore, there is a problem that the image degradation can not be suppressed to minimum only by simply switching the PCM processing and the DPCM processing, like the method described in the aforementioned patent document 1.

In view of the above-described problems, an object of the present invention is to provide the image encoding device and the image encoding method, having small encoding delay, capable of performing encoding with each pixel data compressed by fixed length data, and also capable of suppressing the image degradation to minimum, which is caused by decoding.

Means for Solving the Problem

In order to achieve the above-described object, a first structure of an image encoding device of the present invention is provided that compresses and encodes pixel data of a prescribed image data format of pixels arranged in a scan order into a fixed length code, including: predicted value generation means for predicting target pixel data serving as pixel data of a target pixel to be encoded and generating predicted value data; a subtractor for calculating a differential value between the target pixel data and the predicted value data and generating differential value data; encoding mode decision means for deciding an encoding mode serving as information showing an encoding method based on the differential value data; a first buffer for temporarily holding the encoding mode; encoding target decision means for deciding which of the target pixel data and the differential value data is used as encoding target data serving as a target to which encoding processing is applied, based on the encoding mode; quantization means for applying re-quantization processing to the encoding target data, based on the encoding mode, and generating quantized data; and fixed length code generation means for adding the encoding mode to the quantized data, and generating a fixed length code, wherein the encoding mode decision means compares an absolute value of the differential value data, and a threshold value uniquely decided from a plurality of values by the encoding modes of one or more preceding pixels immediately before the target pixel, and generates the encoding mode with fixed length data, the encoding mode showing first information that indicates the differential value data is used as the encoding target data when the absolute value of the differential value data is the threshold value or less, and showing second information that indicates the target pixel data is used as the encoding target data when the absolute value of the differential value data exceeds the threshold value, and the quantization means decides a quantization step in accordance with the encoding mode of the target pixel and the threshold value, and applies re-quantization processing to the encoding target data with the quantization step to generate the quantized data with fixed length.

According to the first structure of the image encoding device of the present invention, the PCM processing for quantizing the pixel data itself, and the DPCM processing for quantizing differential data between the pixel data and a predicted value, can be automatically selected in quantization, depending on the pixel data. Specifically, when the differential value between a target pixel and the neighboring pixel is large, the quantization is performed by the PCM processing, and when the differential value is small, the quantization is performed by the DPCM processing. Then, even in a case of a small differential value between the target pixel and the neighboring pixel, the image data with little error can be obtained after restoration, by changing the quantization step in accordance with the threshold value decided by the differential value between the neighboring pixel and the further preceding pixel. Thus, in an area where the differential value between neighboring pixels is small, the differential value can be encoded without involving the image degradation by the DPCM processing, and a high luminance and the nuance of color can be restored. Further, in an area where the differential value between neighboring pixels is large, the image data is encoded by the PCM processing, by emphasizing a dynamic variation range rather than the luminance of the pixel or a subtle visually unnoticeable variation of a gradation of color components, thus making it possible to faithfully restore the dynamic variation. Thus, both subtle nuance and dynamic variation can be successfully encoded, so as to be adapted to a human visual characteristic, and visual image degradation due to encoding can be suppressed to minimum.

As described above, it is found that in a certain image, normally more than half of the differential values are concentrated in the neighborhood of 0, in a distribution showing the amount of the differential value between each pixel and its preceding neighboring pixel, thereby showing a so-called Laplace distribution. Meanwhile, when the distribution of the differential values is totalized only for pixels each having a large differential value from its preceding pixel, the distribution of the differential values is not the Laplace distribution in which 0 is set as a center, but is the distribution having two peaks at approximately symmetrical positions.

When the differential value is small, the image data can be encoded only by using low-order bits of the differential value. However, in a case of the pixels each having a large differential value from its preceding pixel, the image degradation is caused in the neighborhood of the area where the differential value between each pixel and its preceding pixel is large, namely in the neighborhood of the edge.

According to the image encoding device of the present invention, even when the absolute value of the differential value between the target pixel and one preceding pixel is the threshold value or less, namely, even when the differential value between pixels is small, the quantization step is changed in accordance with the threshold value uniquely decided from a plurality of values, depending on the amount of the differential value between the one preceding pixel and the further preceding pixel or between further preceding several pixels. Therefore, when the differential value between the target pixel and the preceding pixel is small, and when the differential value between the pixel data of the one preceding pixel and further preceding neighboring pixel is also small, the pixel differential values are concentrated in the neighborhood of 0 in an area where no edge of the image exists and therefore the quantization step is narrowed. Reversely, when the differential value between the one preceding pixel data and further preceding neighboring pixel data is large, the distribution of the pixel differential values is widened, and therefore there is a high possibility that the image edge exits in the neighborhood. Accordingly, in such a case, the quantization step is widened, and DPCM quantization processing is performed, to thereby prevent the image degradation in the neighborhood of the edge.

Further, encoding can be automatically performed with a prescribed fixed length code for every pixel, irrespective of the value of the pixel data and the amount of the differential value between the target pixel data and the neighboring pixel data. Thus, data management after encoding can be facilitated.

Further, according to the present invention, in the same way as conventional, when the differential value data between target data and predicted data is small, the DPCM processing for quantizing the differential value data is performed in principle. As described above, more than or equal to half pixels constituting the image are concentrated in the neighborhood of 0, and therefore according to the present invention, encoding is performed by using the quantized data obtained by applying DPCM quantization processing to more than or equal to half pixels. Accordingly, the encoding delay is not greater than that of a conventional structure. Particularly, all of the encoding mode decision means, encoding target decision means, quantization means, and fixed length code generation means can process the image data from the encoding modes of one or more preceding pixels, the predicted value data of the target pixel, and the target pixel data. The predicted value data is the data obtained by using the quantized data of one preceding pixel and the encoding modes of one or more preceding pixels. Therefore, all data can be obtained before the target pixel is encoded, and encoding is achieved by a simple calculation of the target pixel without processing delay. Simultaneously, such data is calculated and generated by processing several preceding pixels immediately before the target pixel, and therefore the image encoding device of the present invention can be realized by only an area for storing data of several pixels, at a small hardware cost.

Further, a second structure of the image encoding device of the present invention according to the first structure is provided, wherein the number of bits of the quantized data is a natural number "m" of 2 or more; when the encoding mode of the target pixel shows the first information and the threshold value is $2^{m-1}$ or less, the quantization means generates the quantized data by expressing the differential value data by a signed integer of m-bits without applying re-quantization processing to the differential value data; and when the encoding mode of the target pixel shows the first information and the threshold value is larger than $2^{m-1}$, the quantization means generates the quantized data by clipping an absolute value of the differential value data at $2^{m-1}$ and expressing the clipped differential value data by a signed integer of m-bits.

Further, a third structure of the image encoding device of the present invention according to the first structure is provided, wherein the number of bits of the quantized data is a natural number "m" of 2 or more, and when the encoding mode of the target pixel shows the first information and the threshold value is $2^{m-1}$ or less, the quantization means generates the quantized data by expressing the differential value data by a signed integer of m-bits without applying re-quantization processing to the differential value data, and when the encoding mode of the target pixel shows the first information and the threshold value is a number of s-bits larger than $2^{m-1}$, where s is a natural number, the quantization means generates the quantized data by dividing the differential value data by $2^{s-m}$.

According to the second or third structure of the image encoding device of the present invention, the quantization step for re-quantization processing by the quantization means can be changed, while maintaining a constant bit width of the generated quantized data, in accordance with the threshold value decided by the encoding modes of one or more preceding pixels immediately before the target pixel. Each encoding mode is decided by the amount of the differential value between each pixel data and the predicted value data, and therefore the quantization step can be changed by the amount of the differential value of adjacent pixels preceding the target pixel by one or more pixels. Accordingly, even if the differential value between the target pixel and one preceding pixel is small, the quantization step can be widened when the differential value between the one preceding pixel and further preceding neighboring pixel is large, and therefore the image degradation in the neighborhood of the edge of the image can be prevented.

Further, a fourth structure of the image encoding device of the present invention according to any one of the first to third structures is provided, wherein the number of bits of the quantized data is a natural number "m" of 2 or more, and the bits of the target image data are set as the natural number "n" of "m" or more, and when the encoding mode of the target pixel shows the second information, the quantization means generates the quantized data by dividing the target pixel data by $2^{n-m}$.

According to the fourth structure of the image encoding device of the present invention, in an area where the differential values between the neighboring pixels is large, encoding can be performed, by emphasizing the dynamic range variation, while maintaining a constant bit width of the quantized data which is generated by simple processing. Accordingly, by restoring the pixel data based on the fixed length code after conversion which is generated by the aforementioned processing, the dynamic variation can be faithfully restored even in a case of the data after restoring.

Further, a fifth structure of the image encoding device of the present invention according to any one of the first to third structure is provided, the pixel data is digitized for every prescribed components constituting the pixel, and the subtractor calculates the differential value between the target pixel data and the predicted value data for every prescribed components, and generates the differential value data, and the encoding mode decision means compares a maximum value of the absolute value of the differential value data calculated for every prescribed components, and a threshold value uniquely decided from a plurality of values by the encoding modes of one or more preceding pixels immediately before the target pixel, and generates the encoding mode with fixed length data, the encoding mode showing first information that indicates the differential value data is used as the encoding target data when the maximum value of the absolute value of the differential value data is the threshold value or less, and showing second information that indicates the target pixel data is used as the encoding target data when the maximum value of the absolute value of the differential value data exceeds the threshold value.

According to the fifth structure of the image encoding device of the present invention, not a plurality of encoding modes are set in respective components constituting the pixel, but one encoding mode is set as a whole in one pixel. Accordingly, the encoding mode is not added to the fixed length code generated by the fixed length code generation means, for every component. Instead, one encoding mode is added to an entire pixel. Thus, a high compression rate can be maintained.

Normally, a viewing way of pixels is greatly different, if one of the differential values of each component is large, and it can be considered that the dynamic variation of the image occurs in this part. Accordingly, as shown in this structure, small and large relation of the maximum value of the absolute values of the differential values and the threshold values are compared, for every component, and when the value exceeds the threshold value, quantization is performed by the PCM processing. With this structure, the dynamic variation can be faithfully restored. Reversely, the maximum value of the absolute values of the differential values falls within a range of the threshold value or less, for every component, which means that the differential values of all components fall within a range of the threshold value or less. Thus, delicate luminance and the nuance of color can be restored by quantizing the image data by the DPCM processing.

Further, a sixth structure of the image encoding device of the present invention according to any one of the first to third structure is provided, wherein the encoding mode decision means decides the encoding mode of a pixel at the head of the pixels arranged in a scan order as the first information.

According to the sixth structure of the image encoding device of the present invention, the encoding processing is achieved even for the head pixel where no preceding pixel exists.

Further, a seventh structure of the image encoding device of the present invention according to any one of the first to third structure is provided, wherein the predicted value generation means generates predicted value data by restoring pixel data of one preceding pixel immediately before the target pixel, based on the quantized data generated based on one preceding pixel data immediately before the target pixel, and the encoding mode of pixel data of one preceding pixel immediately before the target pixel and the encoding modes of one or more pixel data of further one or more preceding pixels before the target pixel read from the first buffer.

According to the seventh structure of the image encoding device of the present invention, the pixel data of one preceding pixel can be restored, and therefore predicted value data extremely close to the pixel data of the target pixel can be generated.

Further, an eighth structure of the image encoding device of the present invention according to any one of the first to third structures is provided, wherein the encoding mode is expressed by a fixed length code composed of 1 bit.

According to the eighth structure of the image encoding device of the present invention, the encoding mode of 1 bit is added to one pixel, in addition to the quantized data, and the decrease of the compression rate can be suppressed maximally, owing to existence of the encoding mode.

Further, a ninth structure of the image encoding device of the present invention according to any one of the first to third structures is provided, wherein the encoding mode decision means forcibly decides the encoding mode as the first information, for every prescribed number of pixels.

According to the ninth structure of the image encoding device of the present invention, even when the DPCM processing is sequentially performed, the PCM processing is inevitably executed for every prescribed number of pixels, and therefore the decoding processing can be surely performed retroactively to a pixel preceding the target pixel by at least prescribed number of pixels. Thus, the number of pixels retroactive from the pixel to be calculated for obtaining information necessary for performing decoding processing, can be suppressed to minimum.

Further, a tenth structure of the image encoding device of the present invention according to any one of the first to third structures is provided, wherein the encoding mode decision means forcibly decides the encoding mode as the first information, based on a signal inputted from outside.

According to the tenth structure of the image encoding device of the present invention, even when the DPCM processing is sequentially performed, the PCM processing can be forcibly executed. Therefore, the number of pixels retroactive from the pixel to be calculated for obtaining the information necessary for the decoding processing, can be suppressed to minimum.

Further, an eleventh structure of the image encoding device of the, present invention according to any one of the first to third structures is provided, wherein there is a difference between a method of re-quantization processing applied to the encoding target data of a head pixel, and a method of re-quantization processing applied to the encoding target data of other pixels, performed by the quantization means, and pixel data of the head pixel is encoded to a plurality of fixed length codes having the number of bits that is equal to or more than that of the pixel data.

According to the eleventh structure of the image encoding device of the present invention, at least the pixel data of the head pixel can be realized by a plurality of fixed length codes having the number of bits that is equal to or more than that of the pixel data. Therefore, the decoding processing can be surely performed, without generating quantization error. Then, the image data of the head pixel is encoded by the plurality of fixed length codes, and therefore the fixed length of the generated code can be maintained. Moreover, the encoding method is used only for the data of the head pixel, and therefore the decoding processing can be surely realized and applied to the head pixel, while suppressing increase of data amount to minimum after encoding processing.

Further, a twelfth structure of the image encoding device of the present invention according to any one of the first to third structures is provided, wherein a converter is provided for converting an image data format from a first image data format to a second image data format, to thereby compress data amount, and when pixel data of the first image data format is inputted, an image data format of the inputted pixel data is converted to the second image data format by the converter, and thereafter the converted pixel data of the second image data format is compressed and encoded to the fixed length code.

According to the twelfth structure of the image encoding device of the present invention, the compression rate of data can be further increased.

Further, a thirteenth structure of the image encoding device of the present invention according to any one of the first to third structures is provided, including: differential value quantization means for generating quantized differential value data by calculating differential statistical data based on statistical information of the encoding modes of statistical target pixels ranging from one preceding pixel immediately before the target pixel to be encoded to a pixel preceding the target pixel by one or more prescribed number of pixels, the differential statistical data showing a larger value, as a pixel differential value between each pixel and its preceding pixel within the statistical target pixels becomes smaller, and by dividing the differential value data outputted from the subtractor by the differential statistical data, wherein the encoding mode decision means decides the encoding mode based on the quantized differential value data instead of the differential value data, and the encoding target decision means decides which of the quantized differential value data, instead of the differential value data, and the target pixel data is used as the encoding target data.

According to the thirteenth structure of the image encoding device of the present invention, when the differential statistical data is defined as "r", a candidate as the encoding mode target data is 1/r of the differential value data, and therefore the encoding target data can be expressed up to r-fold value when the bit numbers of the quantized data has the same value.

Here, the differential statistical data "r" is a value defined based on the statistical information of the encoding modes of the statistical target pixels from the preceding pixel immediately before the encoding processing target pixel, to a pixel preceding the target pixel by one or more prescribed number of pixels. The encoding mode is the data showing the amount of the differential value between a pixel and its preceding pixel. Therefore, tendency of the amount of the pixel difference within the statistical target pixels can be recognized by the statistical information of the encoding mode in the statistical target pixels. Accordingly, the quantized differential value data obtained by dividing the differential value data by the differential statistical data which is obtained based on the statistical information, is given to the encoding target decision means and the encoding mode decision means. Whereby, dynamic range can be adjusted, in accordance with the amount of the pixel difference within the statistical target pixels. Thus, even in the data after restoration, the dynamic variation can be faithfully restored, and the image with much chromatic variation can be efficiently encoded, and the image degradation can be suppressed.

Note that the differential statistical data may also be obtained by the differential value quantization means, based on the statistical information of the encoding mode of one frame preceding image before the encoding target image including the target pixel to be encoded. With this structure, by using the encoding mode of an entire image already encoded in a series of encoding target images or a part of the image as the differential statistical data, a statistical distribution of the differential values between neighboring pixels in the series of the encoding target images can be provided in the quantization step of the differential value data. Then, efficient encoding can be performed, in accordance with the property of a motion image.

Further, the differential statistical data may be calculated by the differential value quantization means, for every prescribed number of pixels, or for every number of frames. With this structure, even when the differential statistical data takes a large value locally and sequentially, the DPCM processing equal to the processing in a case of r=1 is inevitably executed for every prescribed number of pixels or for every number of frames, and therefore the decoding processing can be surely performed retroactively to a pixel preceding the target pixel by at least prescribed number of pixels or frames. Thus, the number of pixels retroactive from the pixel to be calculated for obtaining information necessary for performing the decoding processing, can be suppressed to minimum.

Further, a fourteenth structure of the image encoding device of the present invention according to the thirteenth structure is provided, wherein the differential value quantization means calculates the differential statistical data, based on the number of encoding modes showing the first information out of the encoding modes of the statistical target pixels, and the number of the statistical target pixels.

According to the fourteenth structure of the image encoding device of the present invention, the tendency of the amount of the pixel difference within the statistical target pixels can be simply and directly reflected on differential statistical data.

Further, a fifteenth structure of the image encoding device of the present invention according to the thirteenth structure is provided, wherein the differential value quantization means calculates the differential statistical data for every prescribed number of pixels or frames.

Further, a sixteenth structure of the image encoding device of the present invention according to the thirteenth structure is provided, wherein the differential value quantization means forcibly decides the differential statistical data based on a signal inputted from outside, irrespective of statistical information of the encoding modes of the statistical target pixels.

According to the fifteenth or sixteenth structure of the image encoding device of the present invention, PCM/DPCM processing is applied to at least one pixel based on simple differential value data, within sequential prescribed number of pixels. Thus, even when the differential statistical data sequentially takes a large value locally, the pixel to which the PCM/DPCM processing is applied based on the simple differential value data can exists forcibly, and therefore the decoding processing can be surely performed retroactively to a pixel preceding the target pixel by at least prescribed number of pixels. Thus, the number of pixels retroactive from the pixel to be calculated for obtaining information necessary for performing the decoding processing, can be suppressed to minimum.

Further, a seventeenth structure of the image encoding device of the present invention according to any one of the first to third structures is provided, including: encoding error generation means for generating and outputting encoding error data, based on the target pixel data or irrespective of the target pixel data; and encoding error adding means for adding the encoding error data and the target pixel data, and outputting error-added target pixel data, to the encoding target decision means, wherein when the encoding target mode shows the second information, the encoding target decision means decides that the error-added target pixel data is used as the encoding target data, instead of the target pixel data.

According to the seventeenth structure of the image encoding device of the present invention, when the encoding mode shows the second information, namely, when the differential value between the target pixel and the neighboring pixel is large, the encoding error data is added to the target pixel data. Therefore, the target pixel data is not always encoded to a code of the same value even if original target pixel data has the same value.

When the image data is encoded to a code of the same value in an area of the original image data where the differential value between the neighboring pixels is small, the differential value is increased during decoding processing, and as a result, a false contour would be formed. However, according to the seventeenth structure, the encoding processing is applied to the error-added target pixel data, to which the encoding error data is added, and therefore even in the area where the differential value is small, the possibility of encoding the pixel data to the code of the same value is remarkably reduced. Thus, the problem that the false contour is formed in the image data restored in the area where the differential value is small, can be prevented.

Further, an eighteenth structure of the image encoding device of the present invention according to the seventeenth structure is provided, wherein the encoding error generation means outputs a pseudo-random number having distribution in which a mean value is 0, as the encoding error data.

According to the eighteenth structure of the image encoding device of the present invention, a mean error value added during encoding is 0. Therefore, an appearance of the false contour can be prevented, while suppressing an influence given to the luminance and chromatic phase as much as possible.

A nineteenth structure of the image encoding device of the present invention according to the seventeenth structure is provided, wherein the encoding error generation means generates and outputs the encoding error data corresponding to the target pixel data, by substituting position coordinate information of the target pixel data into function formula held inside to execute operation.

According to the nineteenth structure of the image encoding device of the present invention, an error value to be added is obtained from the position coordinate information within the image data. Therefore, the encoding error generation means can be realized by a simple counter circuit and arithmetic circuit. Further, the same error value or the related error value can always be added to the pixel at the same position of the frame. Therefore, the appearance of the false contour can be prevented, while preventing flickering of the image caused by random change of the added error during slide show display of a static image. Alternatively, the luminance of the pixel itself can be prevented from changing by periodically changing the pixel at the same position.

Further, a twentieth structure of the image encoding device of the present invention according to the seventeenth structure is provided, wherein the encoding error generation means selects an element corresponding to position coordinate information of the target pixel data, from a matrix held inside, and generates and outputs the encoding error data corresponding to the target pixel data.

According to the twentieth structure of the image encoding device of the present invention, the appearance of the false contour can be prevented, while equalizing errors in the entire image, by equally distributing the errors in each element in the matrix by utilizing the matrix (error matrix) previously held inside, and repeatedly arranging the errors in the entire the image.

Further, a twenty-first structure of the image encoding device of the present invention according to the thirteenth structure is provided, including: encoding error generation means for generating and outputting encoding error data based on the target pixel data, or irrespective of the target pixel data; and encoding error adding means for adding the encoding error data and the target pixel data, and outputting error-added target pixel data, to the encoding target decision means, wherein when the encoding target mode shows the second information, the encoding target decision means decides that the error-added target pixel data is used as the encoding target data, instead of the target pixel data.

According to the twenty-first structure of the image encoding device of the present invention, when the encoding mode shows the second information, namely, when the differential value between the target pixel and the neighboring pixel is large, the encoding error data is added to the target pixel data.

Therefore, the target pixel data is not always encoded to a code of the same value even if original target pixel data has the same value.

When the image data is encoded to a code of the same value in an area of the original image data where the differential value between the neighboring pixels is small, the differential value is increased during decoding processing, and as a result, the false contour would be formed. However, according to the twenty-first structure, the encoding processing is applied to the error-added target pixel data, to which the encoding error data is added, and therefore even in the area where the differential value is small, the possibility of encoding the pixel data to the code of the same value is remarkably reduced. Thus, the problem that the false contour is formed in the image data restored in the area where the differential value is small, can be prevented.

Further, a twenty-second structure of the image encoding device of the present invention according to the twenty-first structure is provided, wherein the encoding error generation means outputs a pseudo-random number having a distribution in which a mean value is 0, as the encoding error data.

According to the twenty-second structure of the image encoding device of the present invention, a mean error value added during encoding is 0. Therefore, an appearance of the false contour can be prevented, while suppressing an influence given to the luminance and chromatic phase as much as possible.

A twenty-third structure of the image encoding device of the present invention according to the twenty-first structure is provided, wherein the encoding error generation means generates and outputs the encoding error data corresponding to the target pixel data, by substituting position coordinate information of the target pixel data into function formula held inside to execute operation.

According to the twenty-third structure of the image encoding device of the present invention, an error value to be added is obtained from the position coordinate information within the image data. Therefore, the encoding error generation means can be realized by a simple counter circuit and arithmetic circuit. Further, the same error value or the related error value can always be added to the pixel at the same position of the frame. Therefore, the appearance of the false contour can be prevented, while preventing flickering of the image caused by random change of the added error during slide show display of a static image. Alternatively, the change of the luminance of the pixel itself can be prevented by periodically changing the pixel at the same position.

Further, a twenty-fourth structure of the image encoding device of the present invention according to the twenty-first structure is provided, wherein the encoding error generation means selects an element corresponding to position coordinate information of the target pixel data, from a matrix held inside, and generates and outputs the encoding error data corresponding to the target pixel data.

According to the twenty-fourth structure of the image encoding device of the present invention, the appearance of the false contour can be prevented, while equalizing errors in the entire image, by equally distributing the errors in each element in the matrix by utilizing the matrix (error matrix) previously held inside, and repeatedly arranging the errors in the entire image.

A first structure of an image decoding device of the present invention is provided that generates restored data of the prescribed image data format, from the fixed length code to which encoding processing is applied by the image encoding device according to any one of first to third structures, including: decoding means for recognizing the encoding mode and the quantized data from a target fixed length code serving as the fixed length code to be restored; inverse quantization means for generating the restored data by applying inverse quantization processing to the quantized data recognized by the decoding means; and a second buffer for temporarily holding the encoding mode included in the target fixed length code and the restored data generated by the inverse quantization means, wherein the decoding means recognizes the encoding mode and the quantized data from the target fixed length code, and transmits the recognized quantized data to the inverse quantization means, and temporarily holds the encoding mode in the second buffer, and when the encoding mode shows the second information, the inverse quantization means generates the restored data by applying inverse quantization processing to the quantized data based on the quantization step associated with the encoding mode showing the second information, and temporarily holds the restored data in the second buffer, and when the encoding mode shows the first information, the inverse quantization means reads from the second buffer the encoding mode of one preceding pixel, and generates the restored data by reading from the second buffer the restored data of one preceding pixel and adding the read restored data to a value obtained by applying inverse quantization processing to the quantized data based on the quantization step associated with the values of the encoding mode included in the target fixed length code and the encoding mode of one preceding pixel, and temporarily holds the restored data in the second buffer.

Further, a second structure of an image decoding device of the present invention is provided that generates restored data of the prescribed image data format from the fixed length code to which encoding processing is applied by the image encoding device according to the thirteenth structure, the image decoding device including: decoding means for recognizing the encoding mode and the quantized data from a target fixed length code serving as the fixed length code to be restored; inverse quantization means for generating the restored data by applying inverse quantization processing to the quantized data recognized by the decoding means; and a second buffer for temporarily holding the encoding mode included in the target fixed length code and the restored data generated by the inverse quantization means, wherein the decoding means recognizes the encoding mode and the quantized data from the target fixed length code, and transmits the recognized quantized data to the inverse quantization means, and temporarily holds the encoding mode in the second buffer; and when the encoding mode shows the second information, the inverse quantization means generates the restored data by applying inverse quantization processing to the quantized data based on the quantization step associated with the encoding mode showing the second information, and temporarily holds the restored data in the second buffer, and when the encoding mode shows the first information, the inverse quantization means reads from the second buffer the encoding modes of statistical target pixels down to a preceding pixel by one or more prescribed number of preceding pixels to calculate the differential statistical data, reads the encoding mode of one preceding pixel, generates the restored data by applying inverse quantization processing to the quantized data based on the quantization step associated with the values of the encoding mode included in the target fixed length code and the encoding mode of one preceding pixel, multiplying a value obtained by the inverse quantization processing by the differential statistical data, reading the restored data of one preceding pixel from the second buffer, and adding the read restored data to the multiplication result, and temporarily holds the restored data in the second buffer.

According to the first or the second structure of the image decoding device of the present invention, the restored data close to original target pixel data can be generated with little error, based on the fixed length code encoded by the image encoding device of the present invention. Accordingly, the image closed to original image information before encoding can be outputted, by displaying the outputted restored data.

Further, a third structure of an image decoding device of the present invention is provided that generates restored data of the prescribed image data format from the fixed length code to which encoding processing is applied by the image encoding device according to the seventeenth structure, the image decoding device including: decoding means for recognizing the encoding mode and the quantized data from a target fixed length code serving as the fixed length code to be restored; inverse quantization means for generating the restored data by applying inverse quantization processing to the quantized data recognized by the decoding means; and a second buffer for temporarily holding the encoding mode included in the target fixed length code and the restored data generated by the inverse quantization means, wherein the decoding means recognizes the encoding mode and the quantized data from the target fixed length code, and transmits the recognized quantized data to the inverse quantization means, and temporarily holds the encoding mode in the second buffer; and when the encoding mode shows the second information, the inverse quantization means generates the restored data by applying inverse quantization processing to the quantized data based on the quantization step associated with the encoding mode showing the second information, and temporarily holds the restored data in the second buffer, and when the encoding mode shows the first information, the inverse quantization means reads from the second buffer the encoding mode of one preceding pixel, and generates the restored data by reading from the second buffer the restored data of one preceding pixel and adding the read restored data to a value obtained by applying inverse quantization processing to the quantized data based on the quantization step associated with the values of the encoding mode included in the target fixed length code and the encoding mode of one preceding pixel, and temporarily holds the restored data in the second buffer.

Further, a fourth structure of an image decoding device of the present invention is provided that generates restored data of the prescribed image data format from the fixed length code to which encoding processing is applied by the image encoding device according to twenty-first structure, the image decoding device including: decoding means for recognizing the encoding mode and the quantized data from a target fixed length code serving as the fixed length code to be restored; inverse quantization means for generating the restored data by applying inverse quantization processing to the quantized data recognized by the decoding means; and a second buffer for temporarily holding the encoding mode included in the target fixed length code and the restored data generated by the inverse quantization means, wherein the decoding means recognizes the encoding mode and the quantized data from the target fixed length code, and transmits the recognized quantized data to the inverse quantization means, and temporarily holds the encoding mode in the second buffer; and when the encoding mode shows the second information, the inverse quantization means generates the restored data by applying inverse quantization processing to the quantized data based on the quantization step associated with the encoding mode showing the second information, and temporarily holds the restored data in the second buffer, and when the encoding mode shows the first information, the inverse quantization means reads from the second buffer the encoding mode of one preceding pixel, and generates the restored data by reading from the second buffer the restored data of one preceding pixel and adding the read restored data to a value obtained by applying inverse quantization processing to the quantized data based on the quantization step associated with the values of the encoding mode included in the target fixed length code and the encoding mode of one preceding pixel, and temporarily holds the restored data in the second buffer.

Further, a fifth structure of an image decoding device of the present invention according to any one of the first to fourth structures is provided, including: decoding error generation means for generating and outputting decoding error data, based on the target fixed length code or irrespective of the target fixed length code; and decoding error adding means for outputting error-added restored data obtained by adding the decoded error data to the restored data when the encoding mode included in the target fixed length code shows the second information, wherein when the encoding mode shows the second information, the inverse quantization means applies inverse quantization processing to the quantized data based on the quantization step associated with the encoding mode showing the second information, the decoding error adding means adds the decoded error data thereto to generate the error-added restored data, and the inverse quantization means temporarily holds the error-added restored data as the restored data in the second buffer.

According to the fifth structure of the image decoding device of the present invention, when the encoding mode shows the second information in generating the restored data from the fixed length code encoded by the image encoding device of the present invention, the image data is restored based on the error-added restored data, to which the decoding error data is added. Therefore, the possibility of forming the false contour in the restored data can be greatly reduced, by always restoring lower bits of the restored data with the same value.

Further, a sixth structure of the image decoding device of the present invention according to the fifth structure is provided, wherein the decoding error generation means outputs the pseudo-random number having the distribution in which a mean value is 0, as the decoding error data.

Further, a seventh structure of the image decoding device of the present invention according to the fifth structure is provided, wherein the decoding error generation means generates and outputs the decoding error data corresponding to the target fixed length code, by substituting position coordinate information of the target fixed length code into function formula held inside, to execute operation.

Further, an eighth structure of the decoding device of the present invention according to the fifth structure is provided, wherein the decoding error generation means selects an element corresponding to the position coordinate information of the target fixed length code from a matrix held inside, and generates and outputs the decoding error data corresponding to the target fixed length code.

Further, a first structure of an image encoding/decoding system of the present invention is provided, including: the image encoding device according to any one of the first to third structures; the image decoding device according to the first structure; and recording means for storing information, wherein when image information including one or more pixel data is written, each pixel data is converted to the fixed length code respectively by the image encoding device and is stored in the recording means, and when the image information is read, the restored data converted from the fixed length code read from the recording means is read by the decoding device.

Further, a second structure of an image encoding/decoding system of the present invention is provided, including: the image encoding device according to the thirteenth structure; the image decoding device according to the second structure; and recording means for storing information, wherein when image information including one or more pixel data is written, each pixel data is converted to the fixed length code respectively by the image encoding device and is stored in the recording means, and when the image information is read, the restored data converted from the fixed length code read from the recording means, is read by the decoding device.

According to the first or second structure of the image encoding/decoding system of the present invention, the image information can be stored under high compression, while reducing the image degradation. Namely, a memory capacity and a band width of access can be reduced, by incorporating such an image encoding/decoding system into an interface of an image memory. Further, bus clock can be reduced by reducing a data transfer amount of bus, and accordingly a low power consumption effect can be expected. Moreover, owing to the feature of the fixed length encoding per pixel according to the present invention, random access is realized without a particular address management for memory access. Therefore, a memory interface with no awareness of existence/non-existence of the image encoding device can be realized.

Further, a third structure of an image encoding/decoding system of the present invention is provided, including: the image encoding device according to the seventeenth structure; the image decoding device according to the third structure; and the recording means for storing information, wherein when the image information including one or more pixel data is written, each pixel data is converted to the fixed length code respectively by the image encoding device, and is stored in the recording means, and when the image information is read, the restored data converted from the fixed length code read from the recording means is read by the decoding device.

Further, a fourth structure of an image encoding/decoding system of the present invention is provided, including: the image encoding device according to the twenty-first structure; the image decoding device according to the fourth structure; and the recording means for storing information, wherein when the image information including one or more pixel data is written, each pixel data is converted to the fixed length code respectively by the image encoding device, and is stored in the recording means, and when the image information is read, the restored data converted from the fixed length code read from the recording means is read by the decoding device.

Further, a fifth structure of an image encoding/decoding system of the present invention is provided, including: the image encoding device according to any one of the first to third structures; the image decoding device according to the fifth structure; and recording means for storing information, wherein when the image information including one or more pixel data is written, each pixel data is converted to the fixed length code respectively by the image encoding device, and is stored in the recording means, and when the image information is read, the restored data converted from the fixed length code read from the recording means is read by the decoding device.

Further, a sixth structure of an image encoding/decoding system of the present invention is provided, including: the image encoding device according to the thirteenth structure; the image decoding device according to the fifth structure; and recording means for storing information, wherein when the image information including one or more pixel data is written, each pixel data is converted to the fixed length code respectively by the image encoding device, and is stored in the recording means, and when the image information is read, the restored data converted from the fixed length code read from the recording means is read by the decoding device.

Further, a seventh structure of an image encoding/decoding system of the present invention is provided, including: the image encoding device according to the seventeenth structure; the image decoding device according to the fifth structure; and recording means for storing information, wherein when the image information including one or more pixel data is written, each pixel data is converted to the fixed length code respectively by the image encoding device, and is stored in the recording means, and when the image information is read, the restored data converted from the fixed length code read from the recording means is read by the decoding device.

An eighth structure of an image encoding/decoding system of the present invention is provided, including: the image encoding device according to the twenty-first structure; the image decoding device according to the fifth structure; and recording means for storing information, wherein when the image information including one or more pixel data is written, each pixel data is converted to the fixed length code respectively by the image encoding device, and is stored in the recording means, and when the image information is read, the restored data converted from the fixed length code read from the recording means is read by the decoding device.

Further, a first structure of an encoding method of the present invention is provided, which is a method of compressing pixel data to a fixed length code and encoding the compressed pixel data, the pixel data having a prescribed image data format with pixels arranged in a scan order, the method, including the steps of generating predicted value data by predicting target pixel data serving as pixel data of an encoding target pixel; generating differential value data by calculating a differential value between the target pixel data and the predicted value data; deciding an encoding mode serving as information showing the encoding method based on the differential value data, and temporarily holding the encoding mode; and deciding which of the target pixel data and the differential value data is used as encoding target data, to which encoding processing is applied, based on the encoding mode; generating quantized data by applying re-quantization processing to the encoding target data based on the encoding mode; and generating a fixed length code by adding the encoding mode to the quantized data, wherein the step of deciding the encoding mode includes comparing an absolute value of the differential value data and a threshold value uniquely decided from a plurality of values by the encoding modes of one or more preceding pixels immediately before the target pixel, and generating the encoding mode with fixed length data, the encoding mode showing first information that indicates the differential value data is used as the encoding target data when the absolute value of the differential value data is the threshold value or less, and showing second information that indicates the target pixel data is used as the encoding target data when the absolute value of the differential value data exceeds the threshold value, and the step of generating the quantized data includes deciding a quantization step in accordance with the encoding mode of the target pixel and the threshold value, and applying the re-quantization processing to the encoding target data with the quantization step to generate the quantized data having a fixed length.

According to the first structure of the image encoding method of the present invention, encoding is achieved with a fixed length data, while suppressing the encoding delay. In addition, degradation of a quality of the image generated by decoding the encoded image can be suppressed to minimum.

Further, a second structure of the image encoding method of the present invention according to the first structure is provided, further including steps of generating quantized differential value data by calculating differential statistical data based on statistical information of the encoding modes of statistical target pixels ranging from one preceding pixel immediately before the target pixel to be encoded to a pixel preceding the target pixel by one or more prescribed number of pixels, the differential statistical data showing a larger value, as a pixel differential value between each pixel and its preceding pixel within the statistical target pixels becomes smaller, and by dividing the differential value data by the differential statistical data, wherein the step of deciding the encoding mode includes deciding the encoding mode based on the quantized differential value data instead of the differential value data, and the step of deciding the encoding target data includes deciding which of the quantized differential value data, instead of the differential value data, and the target pixel data is used as the encoding target data.

According to the second structure of the image encoding method of the present invention, the dynamic range can be adjusted in accordance with the amount of the pixel difference within the statistical target pixels. Thus, a dynamic variation can be faithfully restored even in the data after restoration, and efficient encoding is achieved even for the image with much color variation, and the image degradation can be suppressed.

Further a third structure of the image encoding method of the present invention according to the first or second structure is provided, including steps of; generating encoding error data based on the target pixel data or irrespective of the target pixel data; and adding the encoding error data and the target pixel data and outputting error-added target pixel data, wherein the step of deciding the encoding target data includes deciding that the error-added target pixel data is used as the encoding target data, instead of the target pixel data when the encoding target mode shows the second information.

According to the third structure of the image encoding method of the present invention, by adding the encoding error data, it is possible to prevent a state in which the target pixel data is encoded to the code of the same value in the neighboring pixel range when the target pixel data is encoded, and thus formation of the false contour can be prevented.

A first structure of an image decoding method of the present invention is provided, which is a method of generating restored data of the prescribed image data format, from the fixed length code to which encoding processing is applied by the image encoding method according to the first structure, the image decoding method including steps of: deciding the encoding mode and the quantized data, from a target fixed length code serving as the fixed length code to be restored; and applying inverse quantization processing to the quantized data decided by the step of deciding the encoding mode and the quantized data and generating the restored data, wherein the step of deciding the encoding mode and the quantized data includes deciding the encoding mode and the quantized data from the encoded data and temporally holding the encoding mode, and the step of applying inverse quantization processing includes generating the restored data in such a way that: when the encoding mode shows the second information, the quantized data is subjected to inverse quantization processing based on the quantization step associated with a value of the encoding mode showing the second information; and when the encoding mode shows the first information, the restored data of one preceding pixel is read, and the read data is added to a value obtained by applying inverse quantization processing to the quantized data based on the quantization step associated with values of the encoding mode included in the target fixed length code and the encoding mode of one preceding pixel.

Further, a second structure of an image decoding method of the present invention is provided, which is a method of generating restored data of the prescribed image data format, from the fixed length code to which encoding processing is applied by the image encoding method according to the second structure, the image decoding method including steps of: deciding the encoding mode and the quantized data, from a target fixed length code serving as the fixed length code to be restored; and applying inverse quantization processing to the quantized data decided by the step of deciding the encoding mode and the quantized data, and generating the restored data, wherein the step of deciding the encoding mode and the quantized data includes deciding the encoding mode and the quantized data from the encoded data and temporally holding the encoding mode, and the step of applying inverse quantization processing includes generating the restored data in such a way that: when the encoding mode shows the second information, the quantized data is subjected to inverse quantization processing based on the quantization step associated with a value of the encoding mode showing the second information; and when the encoding mode shows the first information, the encoding modes of statistical target pixels down to a preceding pixel by one or more prescribed number of pixels are read, the differential statistical data is calculated, the encoding mode of one preceding pixel is read, the quantized data is subjected to inverse quantization processing based on the quantization step associated with values of the encoding mode included in the target fixed length code and the encoding mode of one preceding pixel, a value obtained by the inverse quantization processing is multiplied by the differential statistical data, and the restored data of one preceding pixel is read and added to the multiplication result.

Further, a third structure of an image decoding method of the present invention according to the first or second structure, is provided, including steps of generating decoding error data based on the target fixed length code or irrespective of the target fixed length code and outputting the decoding error data; and obtaining error-added restored data by adding the decoding error data to the restored data and outputting the error-added restored data when the encoding mode included in the target fixed length code shows the second information, wherein when the encoding mode shows the second information, the step of applying inverse quantization processing includes applying inverse quantization processing to the quantized data based on the quantization step associated with the encoding mode showing the second information, and temporarily holding the error-added restored data, which is obtained by adding the decoded error data to resultant data of the inverse quantization processing, as the restored data.

According to the first to third structures of the image decoding methods of the present invention, the restored data close to original target pixel data can be generated with little error, based on the fixed length code encoded by the image decoding method of the present invention.

Effect of the Invention

According to the structure of the present invention, image data can be compressed and encoded with fixed length data, while suppressing encoding delay. Further, degradation of an image generated by decoding the encoded image can be suppressed to minimum.

BRIEF DESCRIPTION OF THE DRAWINGS

FIG. 4 is a conceptual view showing an example of quantization processing performed by quantization means.

FIG. 13 shows an example when pixel data inputted into the encoding device according to the present invention is preliminarily converted.

FIG. 14 is another block diagram showing a schematic structure of a part of the encoding device according to another embodiment of the present invention.

FIG. 19 is a view for explaining an effect of encoding by the encoding device according to another embodiment of the present invention.

BEST MODE FOR CARRYING OUT THE INVENTION

Embodiments of an image encoding device of the present invention (suitably called "the device" hereinafter), and an image encoding method of the present invention (suitably called "method of this invention" hereinafter), will be described hereinafter, with reference to the drawings of FIG. 1 to FIG. 10.

Figure 1:
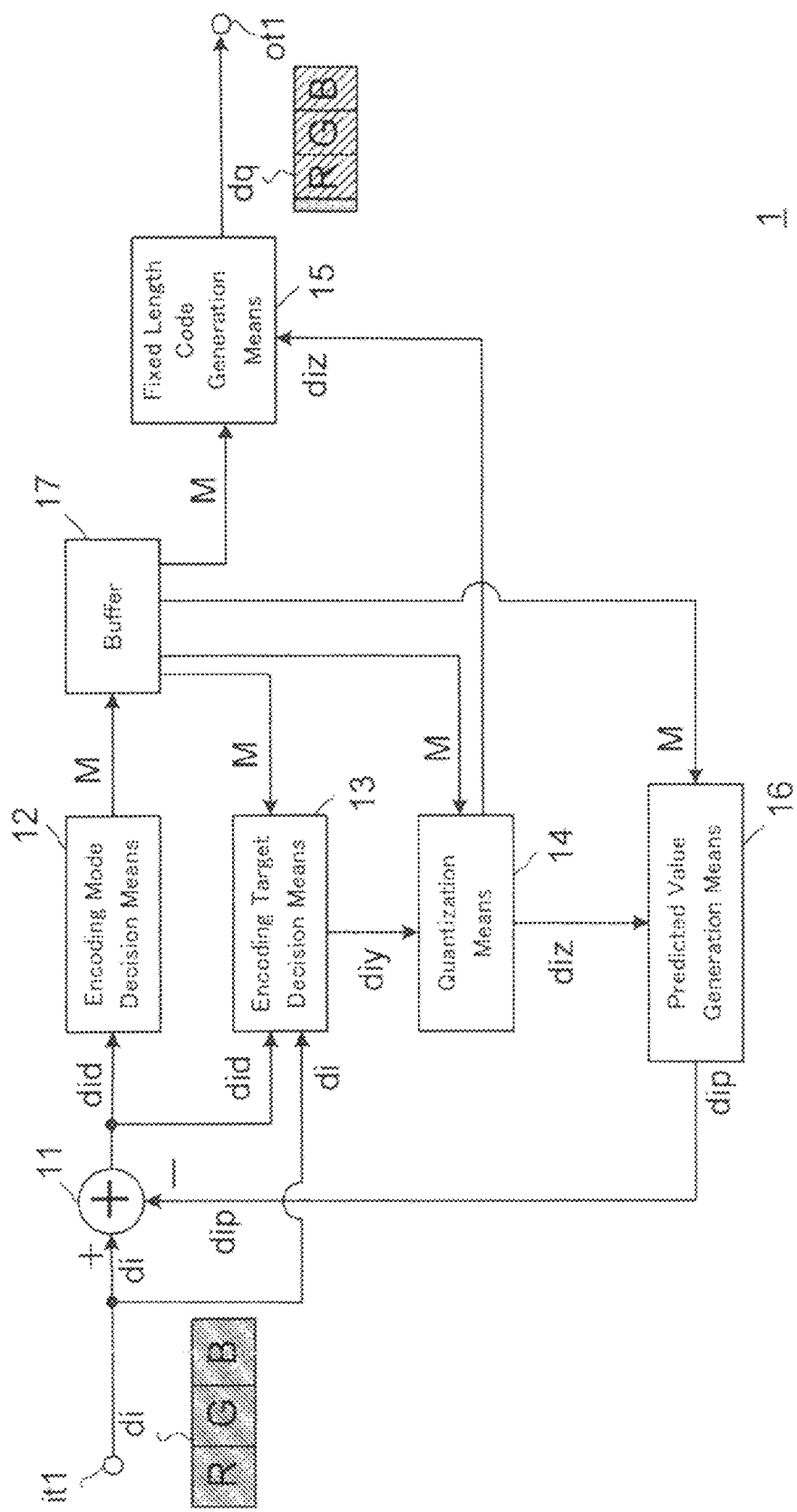
FIG. 1 is a block diagram showing a schematic structure of an encoding device according to the present invention.

FIG. 1 is a block diagram showing a schematic structure of the device. As shown in FIG. 1, the device 1 includes input terminal it1, subtractor 11, encoding mode decision means 12, encoding target decision means 13, quantization means 14, fixed length code generation means 15, predicted value generation means 16, buffer 17, and output terminal ot1.

The input terminal it1 is a terminal for receiving input of the target pixel data "di" serving as an object to be encoded. The target data "di" inputted from the input terminal it1 is transmitted to the subtractor 11 and the encoding target decision means 13.

The subtractor 11 calculates differential value data "did" between target pixel data "di" and predicted value data "dip" outputted from the predicted value generation means 16, described later, and outputs a result thereof to the encoding mode decision means 12 and the encoding target decision means 13.

The encoding mode decision means 12 decides encoding mode M based on the differential value data "did" inputted from the subtractor 11, and outputs it to the buffer 17, and temporarily holds it in the buffer 17. The encoding mode M is expressed by binary values as will be described later, and therefore can be expressed by 1 bit code.

The encoding target decision means 13 decides data, actually becoming an object to be encoded, (encoding target data "diy"), based on the encoding mode M held in the buffer 17, and outputs it to the quantization means 14.

The quantization means 14 applies re-quantization processing to the encoding target data "diy" with $2^m$ gradation (m is a natural number), by a method based on the encoding mode M held in the buffer 17, and outputs quantized data "diz" having encoding length m bit, to the fixed length code generation means 15 and the predicted value generation means 16.

The fixed length code generation means 15 generates fixed length code "dq" based on the encoding mode M and quantized data "diz" held in the buffer 17, and outputs them from the output terminal "ot1".

The predicted value generation means 16 applies inverse quantization processing and decoding processing and the like to the quantized data "diz" to restore the preceding pixel data immediately before the target pixel data, and outputs predicted value data "dip" to the subtractor 11.

Specific contents of the encoding processing in the device 1 thus constituted will be described in detail, by using numerical examples.

Figure 2:
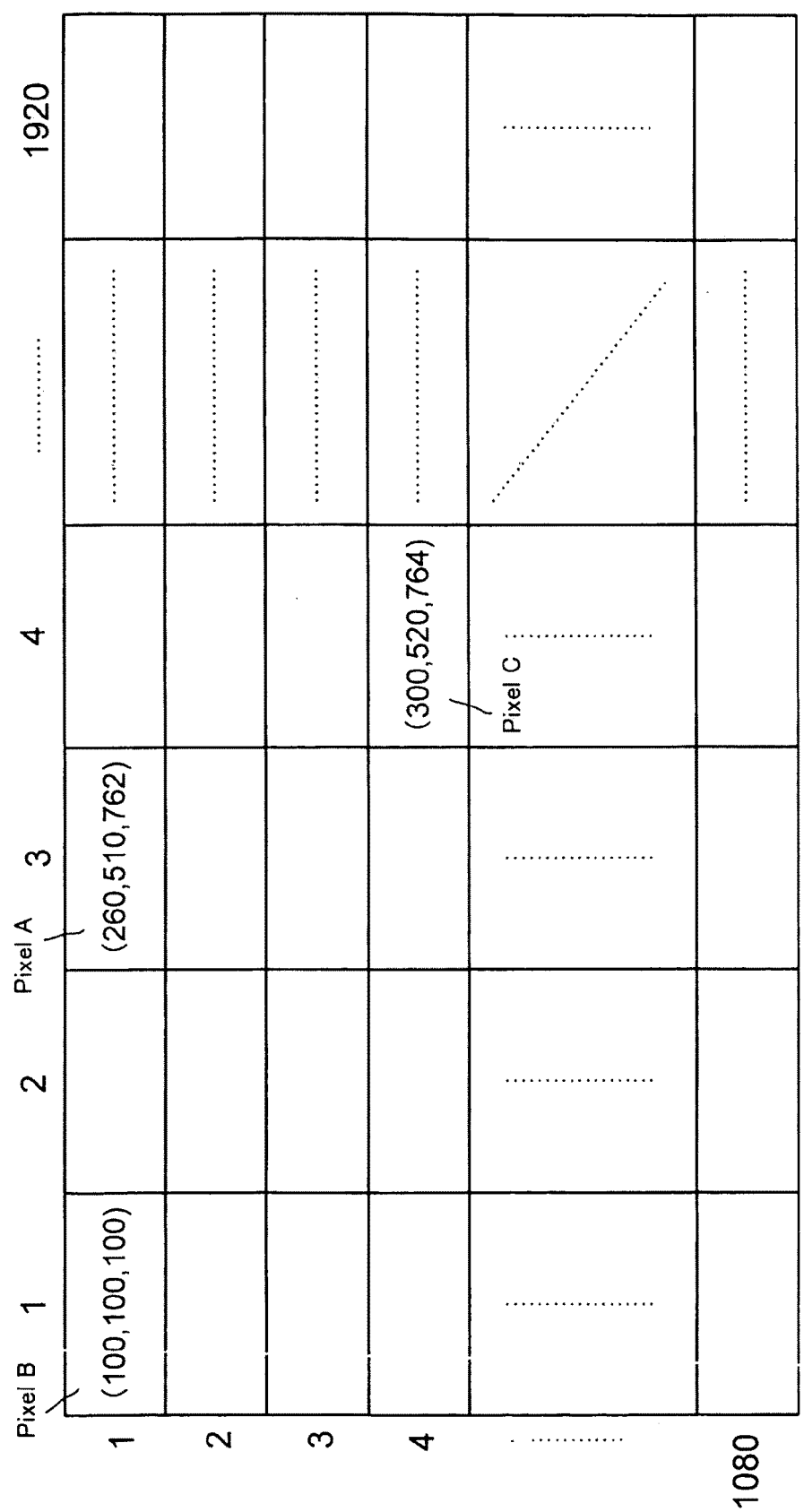
FIG. 2 is a block diagram showing a structure of general image data.
Figure 3A:
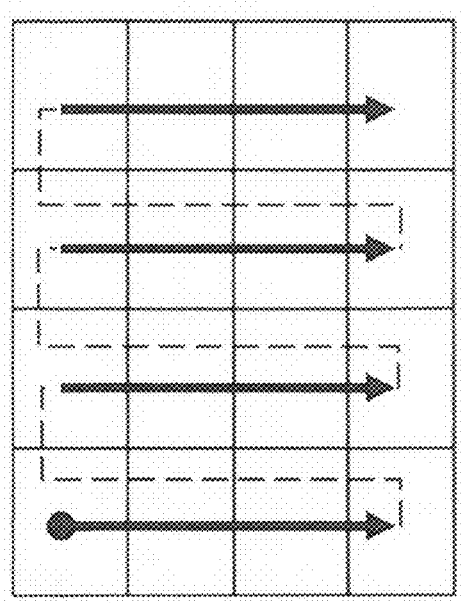
FIG. 3 shows a specific example of a scanning system.
Figure 3B:
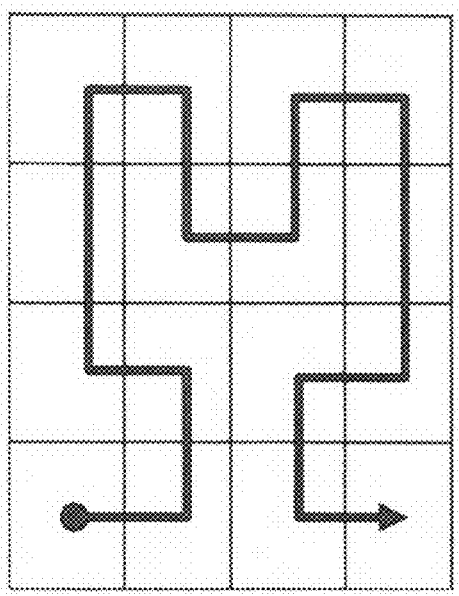
Figure 3C:
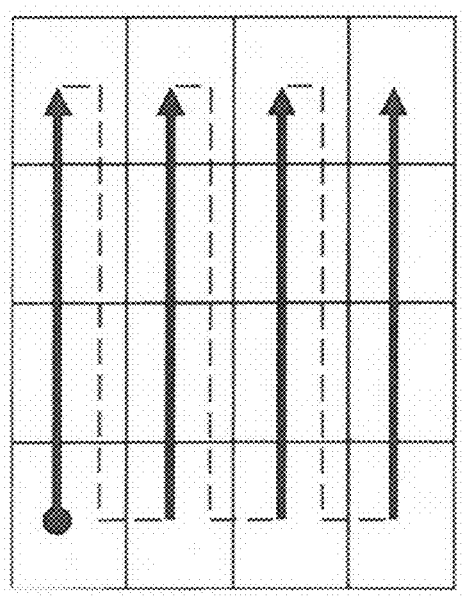
Figure 3D:
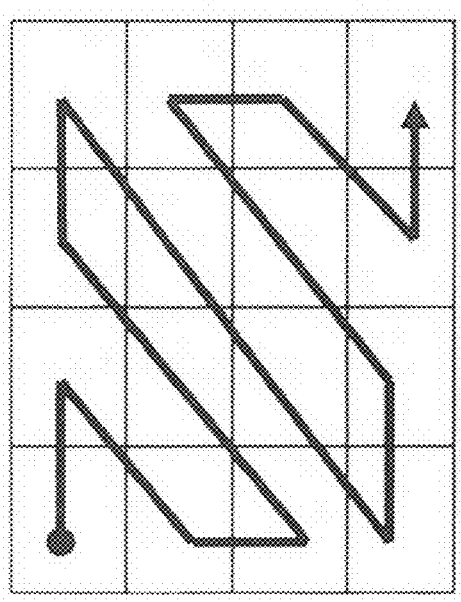

FIG. 2 is a block diagram showing an example of a general structure of the image data. FIG. 2 shows the image data constituted of vertical 1080 pixels×horizontal 1920 pixels. Thus, the image data is generally constituted of a plurality of pixels arranged on a matrix, and each pixel is specified by two-dimensional position information.

Thus, when the encoding processing is applied to the image data, in which a plurality of pixels are two-dimensionally arranged, the encoding processing is performed after structure is previously converted to a structure in which each pixel is arranged on one-dimensional scanning line by using a scanning method, for example, as shown in FIG. 3A to FIG. 3D. For example, when the image data of FIG. 2 is converted by a method (Raster scan) shown in FIG. 3A, the image data is converted to 1080 scanning lines having 1920 effective pixel data. Note that even in a case of using any one of the methods of FIG. 3A to FIG. 3D, or even when other scanning method is used, neighboring pixels in the image data are converted to neighboring positions on the scanning line.

Here, the target pixel data "di" inputted into the input terminal "it1" in FIG. 1 is assumed to be the pixel data of n-th (n>0) pixel from a head pixel on the scanning line converted by the method shown in any one of FIG. 3A to FIG. 3D. Further, the value of the pixel data of the n-th pixel on the scanning line is described as X(n), and values of R component, G component, and B component are respectively described as Xr(n), Xg(n), and Xb(n). At this time, the target pixel data "di" is expressed by di=X(n)=Xr(n)·Xg(n)·Xb(n), by using operator "·" showing link between data. The target pixel data "di" is suitably described as "X(n)" hereinafter.

Here, when Xr(n), Xg(n), Xb(n) serving as each component constituting the target pixel data X(n), are respectively values of 10 bits, 0≦Xr(n), Xg(n), Xb(n)≦1023 are satisfied respectively. Thus, the target pixel data X(n) becomes the pixel data of 30 bits. Note that the number without subscript number "2", whose absolute value is 3 or more, is expressed in decimal notation, and the number with subscript number "2" is expressed in binary number notation, hereinafter.

Actually, as the predicted value data "dip" serving as an object to be subtracted by the subtractor 11, data predicted based on the pixel data X(n−1) of the preceding pixel immediately before the target pixel X(n) serving as an object to be encoded is used. The predicted value data predicted based on the pixel data X(n−1) is described as X'(n), and the predicted value data predicted based on the target pixel data X(n) is described as X'(n+1) because this is the data used for encoding the next pixel data X(n+1). At this time, when the predicted value data "dip" generated by the predicted value generation means 16 is expressed by dip=X'(n)=Xr'(n)·Xg'(n)·Xb'(n), the differential value "did" outputted from the subtractor 11 can be expressed by "did"=(Xr(n)−Xr'(n))·(Xg(n)−Xg'(n))·(Xb(n)−Xb'(n)). Note that the differential value "did" is expressed by "did"=D(n)=Dr(n)·Dg(n)·Db(n) hereinafter, namely satisfying Dr(n)=Xr(n)−Xr'(n), Dg(n)=Xg(n)−Xg'(n), Db(n)=Xb(n)−Xb'(n).

For example, when predicted value X'(n) of pixel of FIG. 2, A : X(n)=(260, 510, 762) is (256, 512, 768), the differential value data D(n) is calculated as D(n)=(260, 510, 762)−(256, 512, 768)=(4, −2, −6).

The encoding mode decision means 12 decides the encoding mode M(n) of the target pixel data X(n) based on the differential value data D(n), and holds the value thereof in the buffer 17. Here, in a case of n=0, namely, when the pixel data is the head pixel of the scanning line (corresponding to pixel B in FIG. 2), the encoding mode M(n) is expressed by M(n)=1.

Further, in a case of n≧1, namely, when the target pixel data is the pixel other than the head pixel, the encoding mode M(n) is decided based on the following formula 1 and formula 2, by a relation between the value of the target pixel data and a threshold value decided by the encoding mode M of "k" preceding pixels immediately before the target pixel. Note that in the formula 1 and the formula 2, Th(M(n−k), . . . , M(n−1)) indicates a constant uniquely defined by the encoding mode M(n−k), . . . , M(n−1) of the "k" preceding pixels.

$$\max(|Dr(n)|, |Dg(n)|, |Db(n)|) \leq Th(M(n-k), \ldots, M(n-1)) \rightarrow M(n)=0 \quad \text{Formula 1}$$

$$\max(|Dr(n)|, |Dg(n)|, |Db(n)|) > Th(M(n-k), \ldots, M(n-1)) \rightarrow M(n)=1 \quad \text{Formula 2}$$

Each encoding mode M is constituted of binary values of 0 and 1, by the above-described formula 1 and formula 2. Here, for example, when the encoding mode M is decided based on the threshold value defined by the encoding mode of one preceding pixel (namely, k=1), the encoding mode M(n) is decided by a small and large relation between a maximum value of each component of the differential value data D(n), and Th(M(n−1)).

Here, the threshold value is expressed by Th(0)=15=(1111)$_2$, Th(1)=63=(111111)$_2$. In the pixel A of FIG. 2, the differential data is expressed by D(n)=(4, −2, −6), thereby satisfying max(|Dr(n)|, |Dg(n)|, |Db(n)|)=6. Accordingly, the encoding mode is expressed by M(n)=0 based on the above-described formula 1, irrespective of 0 or 1 of the encoding mode M(n−1) of the preceding pixel immediately before the pixel A.

Meanwhile, when the predicted value of pixel C of FIG. 2: X(n)=(300, 520, 764) is (256, 512, 768), the differential value D(n) is similarly calculated as D(n)=(300, 520, 764)−(256, 512, 768)=(44, 8, −4). At this time, max(|Dr(n)|, |Dg(n)|, |Db(n)|)=44 is obtained, and the encoding mode M(n) of the pixel C is varied depending on the value of the encoding mode M(n−1) of the pixel of the preceding pixel immediately before the pixel C. Namely, Th(n−1)=15 is derived from M(n−1)=0, and therefore the encoding mode M(n) is decided as M(n)=1 by the formula 1, and reversely, Th(n−1)=63 is derived from M(n−1)=1, and therefore the encoding mode M(n) is decided as M(n)=0 by the formula 2.

Further, when the target pixel is the head pixel of the scanning line like pixel B of FIG. 2, the encoding mode M(n) is expressed by M(n)=1.

The encoding target decision means 13 reads the encoding mode M(n) from the buffer 17, and decides the encoding processing mode as described below in accordance with the value of M(n), and decides encoding target data "diy". (described as Y(n) hereinafter) in accordance with the encoding processing mode, and outputs it to the quantization means 14.

Specifically, the encoding target decision means 13 decides the encoding processing mode to be PCM processing mode, when the encoding mode M(n) is expressed by M(n)=1, and also decides the encoding target data Y(n) to be expressed by Y(n)=X(n). Meanwhile, when the encoding mode M(n) is expressed by M(n)=0, the encoding processing mode is decided to be DPCM processing mode, and also the encoding target data Y(n) is decided to be expressed by Y(n)=D(n).

Namely, when the encoding mode M(n) is expressed by M(n)=1, in other words, when the differential value between the target pixel and the neighboring pixel is larger than the threshold value (see formula 2), not the differential value D(n) but the pixel data X(n) itself is used as the encoding target data Y(n). Meanwhile, when the encoding mode M(n) is expressed by M(n)=0, in other words, when the differential value between the target pixel and the neighboring pixel is the threshold value or less (see formula 1), the differential value D(n) is used as the encoding target data Y(n).

For example, the encoding target decision means 13 decides the encoding processing mode to be DPCM processing mode in pixel A of FIG. 2, and decides the encoding target data Y(n) to be expressed by Y(n)=D(n)=(4, −2, −6). Further, the encoding processing mode is decided to be PCM processing in pixel C of FIG. 2, and the encoding target data Y(n) is decided to be expressed by Y(n)=X(n)=(300, 520, 764). As described above, when the maximum value of the absolute value of a difference between each component and the preceding pixel data is larger than the threshold value decided by the encoding mode of one preceding pixel, the encoding target decision means 13 decides the encoding mode of the target pixel to be PCM processing mode.

The quantization means 14 reads from the buffer 17, the encoding modes M(n−k), . . . , M(n−1), and M(n) obtained during processing of the pixel data of "k" preceding pixels (k≧0), and decides quantization step $2^q$ based on each encoding mode, then quantizes the encoding target data Y(n) by the quantization step $2^q$, and generates quantized data "diz" (described as "Z(n)" hereinafter). As described above, the encoding mode M is expressed by 1 bit, and therefore an aggregate of encoding modes M of the "k" preceding pixels can be expressed as the value of "k" bits, if they are linked. Namely, information amount of the encoding mode M to be held in the buffer 17 is constituted of (k+1) bits at most, even if including the information of the encoding mode M of the encoding target pixel.

For example, when each component of the target data X(n) is constituted of 10 bits respectively, and when the target pixel data X(n) is encoded to a fixed length code of 16 bits composed of the encoding mode of 1 bit and quantized data of 15 bits, a bit width of the quantized data Z(n) of each component is set to m=5. Then, in a case of the PCM processing (M(n)=1), the quantization means 14 expresses a signal of each 10 bits as the signal of high-order five bits by dividing the signal of each 10 bits by $2^{(10-5)}$ (Quantization by the quantization step $2^5$). For example, in pixel C of FIG. 2, the encoding target data is expressed by: Y(n)=(300, 520, 764)=(0100101100, 1000001000, 1011111100)$_2$, and therefore the image data is quantized to quantized data expressed by Z(n)=(01001, 10000, 10111)$_2$ by 5 bits shift.

Meanwhile, when the encoding mode of the target pixel is the DPCM processing mode (M(n)=0), the absolute value of each component is smaller than the threshold value Th(M(n−k), . . . , M(n−1)) by the formula 1, in differential values D(n)=(Dr(n), Dg(n), Db(n)) constituting the encoding target data Y(n).

At this time, when the threshold value is expressed by Th(M(n−k), . . . , M(n−1))≦$2^4$(=16), the differential value is expressed by D(n)≦$2^4$, and therefore the absolute value can be expressed by code length of 4 bits even if the differential value D(n) is quantized by quantization step $2^0$ (=1). Therefore, the differential value D(n) (=encoding target data Y(n)) is not quantized but is expressed as it is by the value of ±polar encoded integer of 5 bits.

Further, when the threshold value is expressed by Th(M(n−k), . . . , M(n−1))>$2^4$, the differential value D(n) is expressed by encoded integer of 5 bits, by combining the quantization processing and overflow processing (underflow processing). For example, in a case of satisfying Th(M(n−k), . . . , M(n−1))=63>16, when the differential value D(n) is quantized by the quantization step 1, each component of the quantized encoding target data is expressed by −32<Dr(n)/2, Dg(n)/2, Db(n)/2<32. Then, when such values are larger than 16(=$2^4$) or smaller than −16)=$2^4$), clipping is performed at 15 (−15) by overflow (underflow) processing. By such a processing, the differential value D(n) constituting Y(n) can be expressed by the encoded integer of 5 bits.

FIG. 4 is a conceptual view showing an example of the quantization processing performed by the quantization means 14. Note that in FIG. 4, only R component of the encoding target data Y(n) is taken as an example and shown. The encoding target data is described as Yr(n) and quantized data obtained by applying quantization processing to Yr(n) is described as Zr(n), hereinafter. At this time, for example when each pixel is encoded to a fixed length code of 16 bits, the quantization processing is performed so that the pixel data is set to have a bit width of m=5, for every components. Namely, Zr(n) has the number of bits satisfying m=5.

Note that in order to simplify the description, explanation will be given below, on the assumption that the quantization means 14 decides the quantization step based on the value of the encoding mode of the target pixel and the preceding pixel immediately before the target pixel. However, as described above, the quantization step may also be decided in consideration of not only the value of the encoding mode of one preceding pixel immediately before the target pixel but also the values of the encoding modes of further preceding pixels.

FIG. 4A shows a case in which the encoding mode is expressed by M(n)=0, M(n−1)=0, and the encoding target data is expressed by Yr(n)=(00000000101)$_2$. As described above, the encoding mode is expressed by M(n)=0, and therefore based on the formula 1, the differential value Dr(n) is used as the value of Yr(n) based on the formula 1. Note that leftmost bit sequence of Yr(n) shows ±code.

Then, in a case of satisfying Th(M(n−1)=Th(0)=15≦$2^4$, quantized data Zr (n) is obtained by the quantization means 14, in such a way that the value of Yr(n) is expressed as it is (as described above, the value of Yr(n) is the value of Dr(n)) by encoded integer of 5 bits (00101)$_2$, without quantizing Yr(n) (q=0).

FIG. 4B shows a case of: encoding mode M(n)=1, and encoding target data Yr(n)=(0111001001)$_2$. As described above, the encoding mode is expressed by M(n)=1, and therefore pixel data Xr(n) is used as Yr(n) based on the formula 2.

In this case, as described above, quantized data Zr(n) is obtained (q=5) by the quantization means 14, in such a way that the encoding target data Yr(n) is divided by $2^{(10-5)}$ to generate encoded integer of high-order 5 bits (01110)$_2$.

Further, FIG. 4C shows a case of: encoding mode M(n)=0, M(n−1)=1, and encoding target data Yr(n)=(00000101101)$_2$ (=45). As described above, the encoding mode is expressed by M(n)=0, and therefore the differential value Dr(n) is used as the value of Yr(n) based on the formula 1. Note that in the same way as FIG. 4A, the leftmost bit sequence shows the code.

Then, when the threshold value is expressed by Th(M(n−1)=Th(1)==63>$2^4$, (0000010110)$_2$(=22) is shown by quantizing Yr(n).first satisfying q=1, and this is a value larger than 16. Accordingly, the value is clipped at 15 by overflow processing. Namely, a minimum bit "0" is omitted, to thereby obtain the quantized data Zr(n) (q=2) expressed by the maximum value of the encoded integer of 5 bits (01111)$_2$.

Regarding the G component and the B component as well, in the same procedure as the procedure of the R component, each quantized data Zg(n) and Zb(n) is generated, to thereby obtain the quantized data Z(n) with respect to the encoding target data Y(n).

Note that in the example of FIG. 4C, the quantized data having a prescribed bit width can also be generated by adjusting the bit width q of the quantization step $2^q$, without performing clipping.

For example, in a case of Th(M(n−k), . . . , M(n−1))>$2^4$, the differential value D(n) is expressed by the encoded integer of 5 bits by adjusting the bit width q. The case of Th(M(n−k), . . . , M(n−1))=63>16 is considered now. In this case, 63 is the number of 7 bits. Here, in order to execute quantization processing to express the differential value D(n) by the encoded integer of 5 bits, the differential value D(n) is divided by $2^{(7-5+1)}=2^3$. By performing such a processing, the differential value D(n) structuring the value of Y(n), can be expressed by the encoded integer of 5 bits.

Here, the threshold value Th(M(n−k), . . . , M(n−1)) is preferably set in accordance with the encoded mode M(n−k), . . . , M(n−1). Namely, when the bit width of the quantized data Z(n) is set as "m", and the bit width of the target data X(n) is set as "n" (m is the natural number of 2 or more, and "n" is the natural number of "m" or more), the threshold value is previously set in accordance with the value of each encoding mode M(n−k), . . . , M(n−1), so as to satisfy Th(M(n−k), . . . , M(n−1))=$2^{s-1}$ (wherein s=m−1, m, . . . , n−1). Then, when the threshold value decided by the encoding mode is actually larger than $2^{m-1}$, the differential value data D(n) is divided by $2^{(s-m+1)}$, to thereby generate the quantized data Z(n) expressed by the encoded integer having m-bits width. At this time, the bit width q is decided as q=s−m−1. Reversely, when the threshold value is smaller than $2^{m-1}$, as described above, the quantized data Z(n) of m-bits width can be generated without performing quantization processing (q=0).

In a case of FIG. 4C, the threshold value is expressed by Th(M(n−1))=Th(1)=63=$2^7$−1>$2^4$, wherein s=7, and m=5, to generate the quantized data Z(n) having 5 bits width. Accordingly, the quantized data Zr(n) expressed by encoded integer $(00101)_2$ of 5 bits is obtained (q=3) by dividing the differential value data D(n)=$(00000101101)_2$ by $2^{s-m+1}$=$2^3$. Note that the leftmost bit sequence "0" shows the code.

The fixed length code generation means 15 generates fixed length code "dq" based on the quantized data Z(n)(=Zr(n)·Zg(n)·Zb(n)) generated by the quantization means 14, and the encoding mode M(n) held in the buffer 17. In the same way as Z(n), the fixed length code generated based on the quantized data Z(n) and the encoding mode M(n), is described as Q(n).

Figure 5:
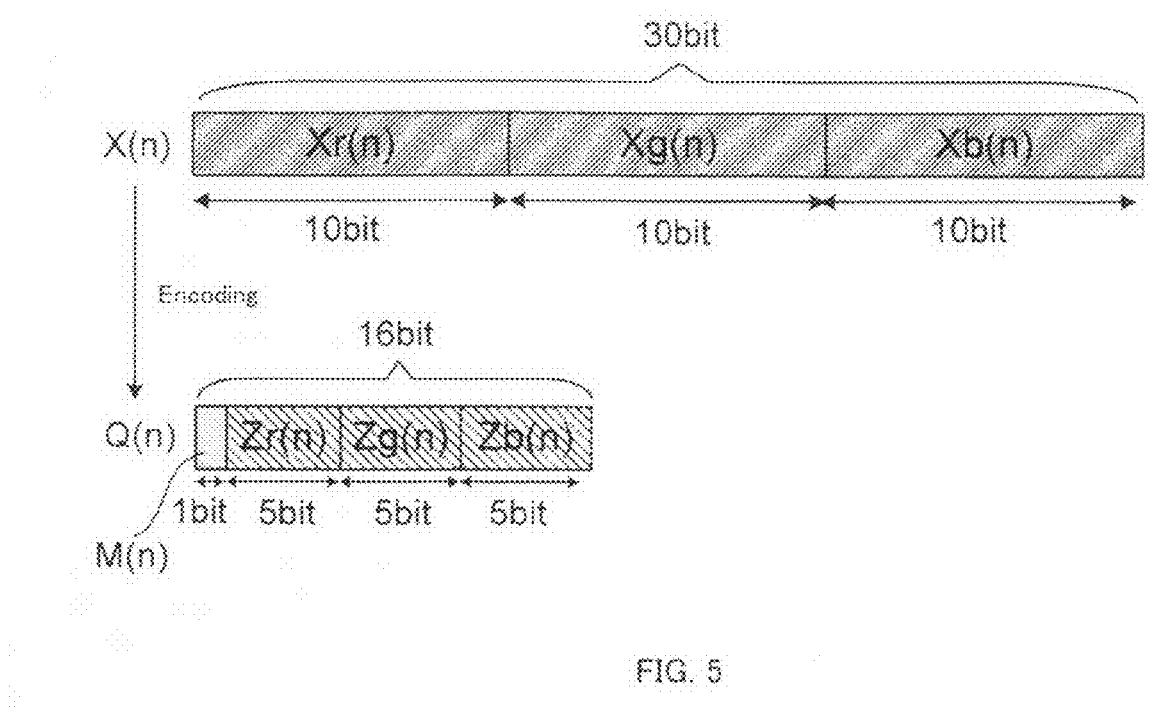
FIG. 5 shows an example of pixel data and fixed length encoded data.

FIG. 5 is a view schematically showing a state in which the fixed length code Q(n) is generated from the inputted target pixel data X(n). The fixed length code Q(n) composed of quantized data Z(n) of 15 bits in total including every 5 bits of Zr(n), Zg(n), Zb(n), and the encoding mode M(n) of 1 bit, is generated by the device 1 from the target pixel data X(n) of 30 bits in total including every 10 bits of R, G, B, respectively. Thus, the whole bits are reduced to 16 bits from 30 bits, and irrespective of the inputted pixel data, the fixed length code of 16 bits is generated. Note that here, the image data X(n) is the quantized data quantized in 10 bit gradation from analogue data.

The predicted value generation means 16 restores original pixel data based on the quantized data Z(n) transmitted from the quantization means 14. Note that as described above, it is in a case of applying encoding processing to pixel data X(n+1) next to the already quantized target pixel data X(n), that the pixel data restored based on the quantized data Z(n) is used as the predicted value data "dip". Accordingly, as described above, the predicted value data "dip" generated by the predicted value generation means 16 based on Z(n−1) is described as X'(n), and the predicted value data "dip" generated by the predicted value generation means 16 based on Z(n) is described as X'(n+1). Explanation will be given hereinafter for a process of generating the predicted value data X'(n+1) based on the quantized data Z(n).

Figure 6:
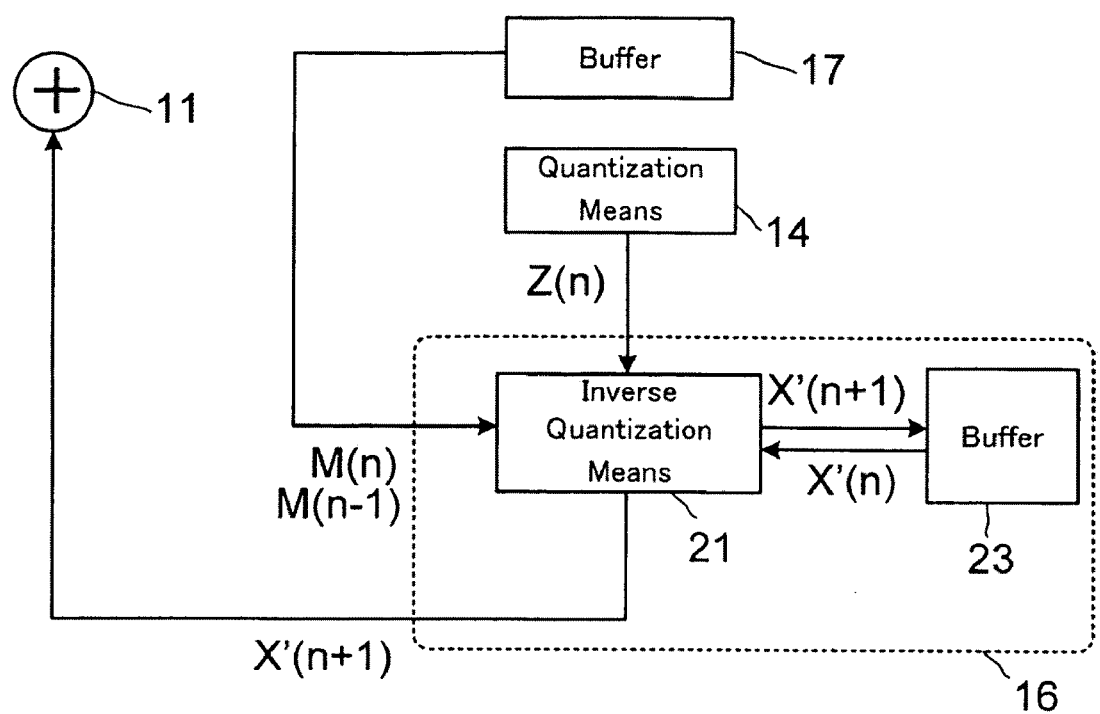
FIG. 6 is a block diagram showing a constitutional example of predicted value generation means.

FIG. 6 is a block diagram showing a constitutional example of the predicted value generation means 16. FIG. 6 shows a partial view of other constituent element of the device 1, in addition to a structure of the predicted value generation means 16. The predicted value generation means 16 shown in FIG. 6 includes inverse quantization means 21 and a buffer 23.

The inverse quantization means 21 reads encoding modes M(n), M(n−1) from the buffer 17. Then, according to the above-described example, it is found that when the encoding mode is expressed by M(n)=1, the quantized data Z(n) is a quantized value whose a bit width is expressed by q=5, namely it is found that the quantized data Z(n) is expressed by high-order 5 bits of the encoding target data Y(n), and the encoding target data Y(n) corresponds to the pixel data X(n). Then, prescribed values (such as "00000") are added to the low-order 5 bits of the quantized data Z(n), to thereby generate inverse quantized data Z'(n+1) composed of 10 bits, which is then outputted to the subtractor 11 as the predicted value data X'(n+1), and is also transmitted to the buffer 23, and the value thereof is temporarily held.

For example, when the R component of the quantized data Z(n) is Zr(n)=$(01110)_2$, the R component of the predicted value data Xr'(n+1)=$(0111000000)_2$ is generated by the inverse quantization means 21.

Further, when the encoding mode is expressed by M(n)=0, M(n−1)=0, the inverse quantization means 21 recognizes that the quantized data Z(n) is the differential value data D(n) between the target pixel data X(n) and the predicted value data X'(n−1). Then, the preceding predicted value data X'(n) held in the buffer 23 is read and added to the quantized data Z(n), to thereby generate the predicted value data X'(n+1). For example, when the encoding mode is expressed by M(n)=0, M(n−1)=0, Zr(n)=$(00101)_2$, Xr'(n)=$(0000100001)_2$, predicted value data Xr'(n+1)=$(0000100110)_2$ is generated by the inverse quantization means 21.

Further, when the encoding mode is expressed by M(n)=0, M(n−1)=1, the inverse quantization means 21 recognizes that the quantized data Z(n) is a value obtained by quantizing the differential value data D(n) between the target pixel data X(n) and the predicted value data X'(n) by a prescribed quantization step $2^q$ so that the bits have a prescribed bit width "m", and thereafter clipping is performed thereto. In the same way as FIG. 4C, when the threshold value is expressed by Th(M(n−1))=Th(1)=63, Zr(n)=$(01111)_2$, the inverse quantization means 21 recognizes that overflow processing is applied, after it is quantized by quantization step 2. Accordingly, in a case of Xr'(n)=$(0000000101)_2$, Xr'(n+1)=$(0001000001)_2$ is obtained by the inverse quantization means 21.

Note that when a method without performing clipping is used, and when the threshold value is expressed by Th(M(n−1))=Th(1)=63, a bit width q=3 of the quantization step is derived from the threshold value. Accordingly, for example, when the encoding mode is expressed by M(n)=0, M(n−1)=1, Zr(n)=$(01011)_2$, Xr'(n)=$(0000000101)_2$, Xr'(n+1)=$(0001011101)_2$ is obtained by the inverse quantization means 21.

Thus, based on the quantized data Z(n) obtained by the quantization means 14, data close to original target pixel data X(n) can be restored by the predicted value generation means 16, by using the encoding modes M(n) and M(n−1) held in the buffer 17, and by using the preceding predicted value data X'(n) held in the buffer 23. Then, the value thus obtained can be used as the predicted value data X'(n+1) when the encoding processing is applied to the next pixel data X(n+1).

Further, as shown in FIG. 5, the fixed length code Q(n) finally generated by the device 1 includes the quantized data Z(n) and the encoding mode M(n). Therefore, when the pixel data X(n) is restored based on the fixed length code Q(n), the same method as the aforementioned predicted value generation method by the predicted value generation means 16 can be used.

Figure 7:
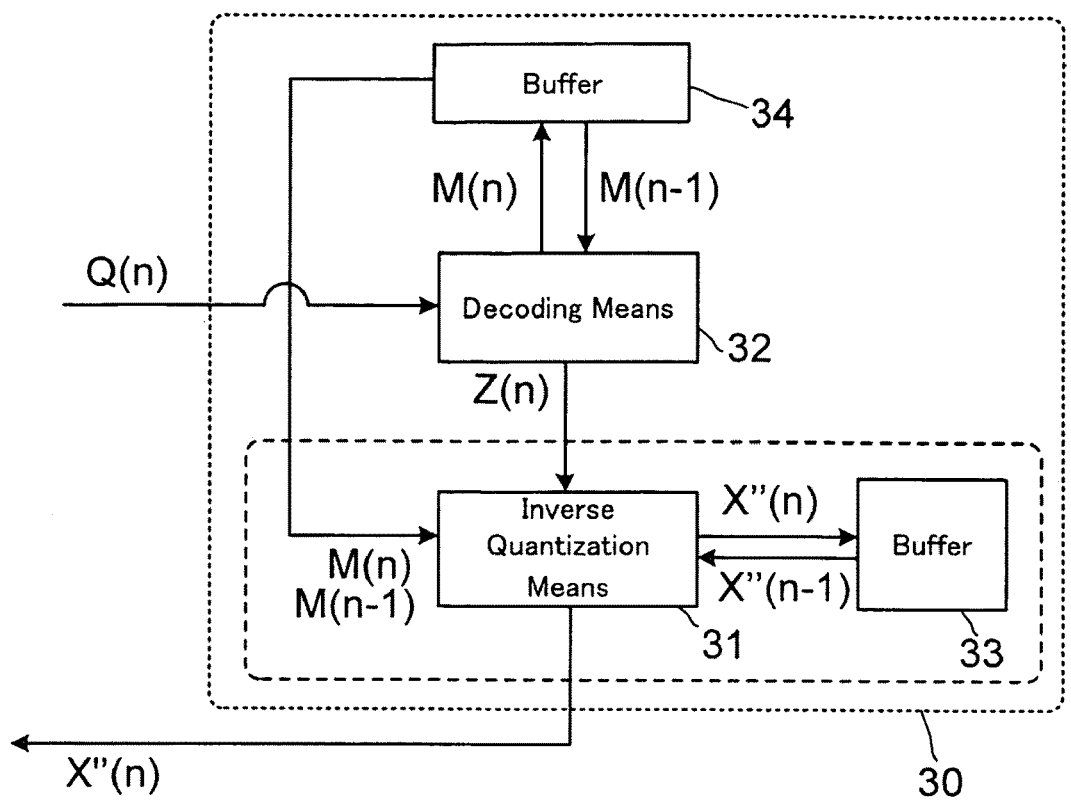
FIG. 7 is a block diagram showing a schematic structure of a decoding device according to the present invention.

FIG. 7 is a block diagram showing a schematic structure of the image decoding device for restoring the original pixel data X(n) from the fixed length code Q(n) generated by the device 1.

An image decoding device 30 shown in FIG. 7 includes inverse quantization means 31, decoding means 32, buffer 33, and buffer 34. Note that the inverse quantization means 31 corresponds to the inverse quantization means 21 and the buffer 33 corresponds to the buffer 23 in the predicted value generation means 16 of FIG. 6.

When the fixed length code Q(n) is inputted into the image decoding device 30, first, the decoding means 32 recognizes the encoding mode M(n) and the quantized data Z(n) from the fixed length code Q(n). Then, the encoding mode M(n) is transmitted to the buffer 34 and is held therein. The buffer 34 temporarily holds the value of the encoding mode, and holds at least the encoding mode M(n−1) included in the fixed length code Q(n−1) of the preceding pixel immediately before the fixed length code Q(n) serving as data restoring target.

Next, the inverse quantization means 31 reads the encoding mode M(n−1) from the buffer 34, and by using M(n), M(n−1), and the quantized data Z(n), generates the restored data in the same way as generating the predicted value data by the predicted value generation means 16. Note that the predicted value generation means 16 is prepared only for the purpose of being used for the encoding processing of the pixel data X(n+1) next to the pixel data X(n) serving as an encoding target. Therefore, in the description above, the generated predicted value data is described as X'(n+1), so that the pixel number of the predicted value data and the pixel number of the pixel data to be encoded are matched with each other. However, the decoding device 30 is provided only for the purpose of restoring the original pixel data from the fixed length code Q(n). Therefore, it is desirable that the pixel number of the original pixel data and the pixel number of the pixel data after restoration are matched with each other, and from this viewpoint, the restored data is described as X"(n) hereinafter, which is generated from the fixed length code Q(n) by the inverse quantization means 31. At this time, as described above, X"(n) and X' (n+1) are substantially the same data.

In the same method as the method of generating the predicted value data X'(n+1) by the inverse quantization means 21, the inverse quantization means 31 generates restored data X"(n). Thus, in the same way as the predicted value generation means 16, based on the quantized data Z(n) generated by the quantization means 14, the restored data X"(n) close to the original data X(n) can be restored by using the encoding modes M(n) and M(n−1), and by using restored data X"(n−1) (=predicted value data X'(n)) of the preceding pixel held in the buffer 23.

As described above, according to the device 1, the PCM processing for quantizing the pixel data itself in accordance with the pixel data, and the DPCM processing for quantizing the differential data between the target value and the predicted value, are automatically selected, so that quantization can be performed. Specifically, when the differential value between the target pixel and the neighboring pixel is large, quantization is performed by the PCM processing, and when the differential value is small, the DPCM processing is performed.

Further, even when the differential value between the target pixel and the neighboring pixel is small, the image data with little error can be obtained after restoration, by varying the bit width "q" without varying the code length depending on the amount of the differential value between the neighboring pixel and the further preceding neighboring pixel.

Figure 8:
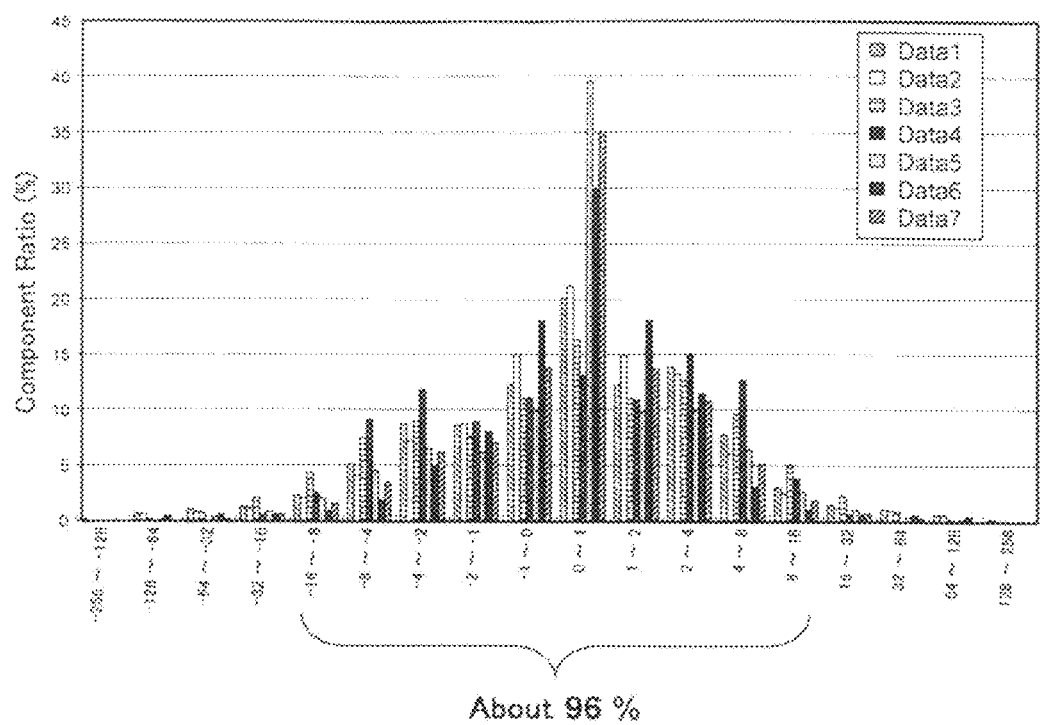
FIG. 8 is a distribution view showing the amount of a differential value between a target pixel and a preceding neighboring pixel in a certain image.

FIG. 8 shows a distribution showing the amount of the differential value between each pixel and its preceding neighboring pixel in a certain image, and actually shows a graph in which the distribution of the differential values is tabulated, in the images (data 1 to data 7) of each 8 bits, of RGB. In an example of FIG. 8, the differential values can be varied in a range of −255 to +255, with almost 96% within a range of −15 to +15, and it is found that reversible encoding is achieved by encoding using only low-order bits of the differential value.

Regarding the pixel with large differential value, there is little error in encoding the pixel data, rather than encoding differential data.

Figure 9:
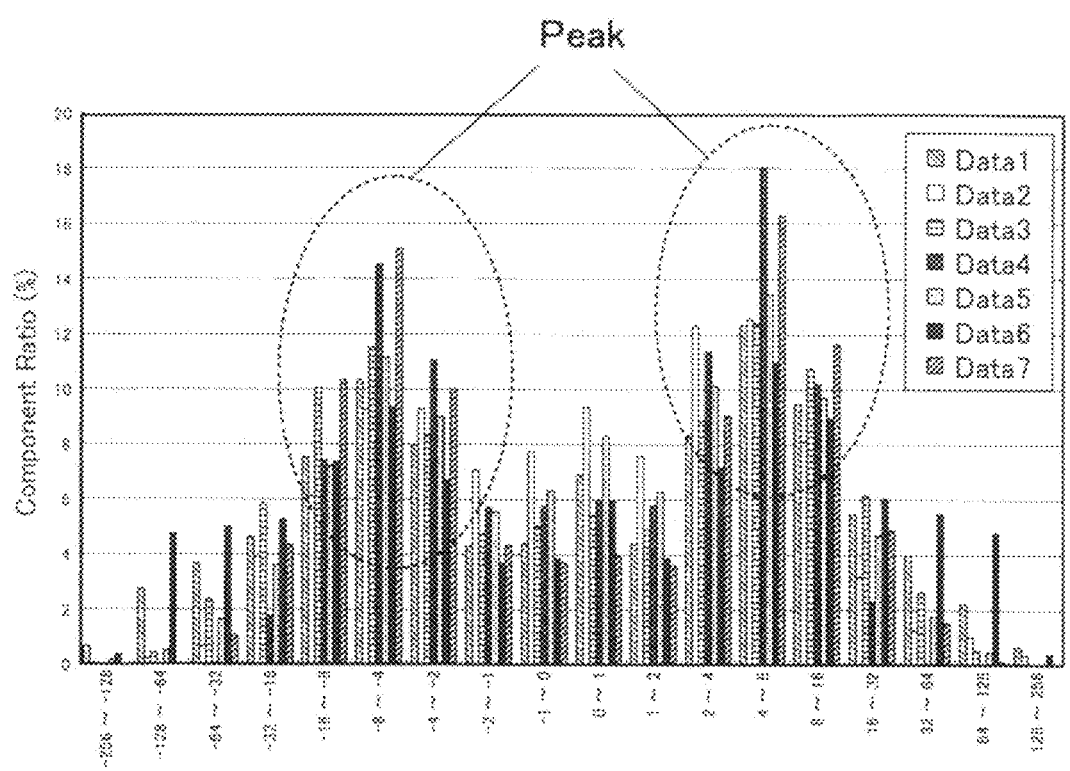
FIG. 9 is a distribution view showing the amount of a differential value between a target pixel and one subsequent neighboring pixel, in pixels in which the differential value between the target pixel and one preceding neighboring pixel is large.

FIG. 9 shows a graph for tabulating the distribution of the differential values of only pixels having large difference from the preceding pixel, in the same image data as the image data of FIG. 8. As is observed in FIG. 9, the distribution of the differential values is not the Laplace distribution with 0 as a center, but is a distribution with two peaks at approximately symmetrical positions. In this case, even if the differential data is set as the encoding target, encoding is not performed by using only the low-order bits, and preferably a peak portion is efficiently encoded.

As described in the example of FIG. 4, according to this device 1, when the encoding mode is expressed by M(n)=0, M(n−1)=0 (see FIG. 4(a)), namely, when the differential value between the target pixel component and the preceding pixel component is small and the differential value between the preceding pixel component and the further preceding pixel component is small, the DPCM processing is performed by using only the low-order bits of the differential value. Further, when the encoding mode is expressed by M(n)=0, M(n−1)=1 (see FIG. 4C), namely, when the differential value between the target pixel component and the preceding pixel component is small, and the differential value between the one preceding pixel component and the further preceding pixel component is large, the differential value is clipped after being quantized to fall within a defined bit width, or is quantized by the quantization step to fall within the bit width. Thus, the encoding is not performed by using only low-order bits of the differential data, but is performed by using high-order bits portion, namely, by using the peak portion. Further, when the encoding mode is expressed by M(n)=1 (see FIG. 4B), namely, when the differential value between the target pixel component and the preceding pixel component is large, the differential value is not used, and the pixel data itself is quantized so as to fall within the defined bit width.

As described above, the device 1 performs encoding by changing an allocation of the code, depending on the information of the differential value between the target pixel and the preceding pixel in the image data. Thus, variation of the pixel data particularly in the vicinity of the edge where the value of the pixel data is greatly varied, can be restored by decoding as image information based on the encoded data, with little error.

Further, encoding can be automatically realized with a fixed length code, irrespective of the value of the pixel data and the amount of the differential value between the target pixel data and the neighboring pixel data. Thus, data management after encoding is facilitated.

Further, in the same way as a conventional structure, when the differential data between the target pixel and the neighboring pixel is small (M(n)=0) in principle, the DPCM processing of quantizing the differential data D(n) is performed. In an example of FIG. 8, almost 96% is included within a range of −15 to +15, and therefore, the quantized data obtained by the DPCM processing is used for encoding the large part of pixels constituting the image. Accordingly, the encoding delay is not greater than that of the conventional structure.

Figure 21:
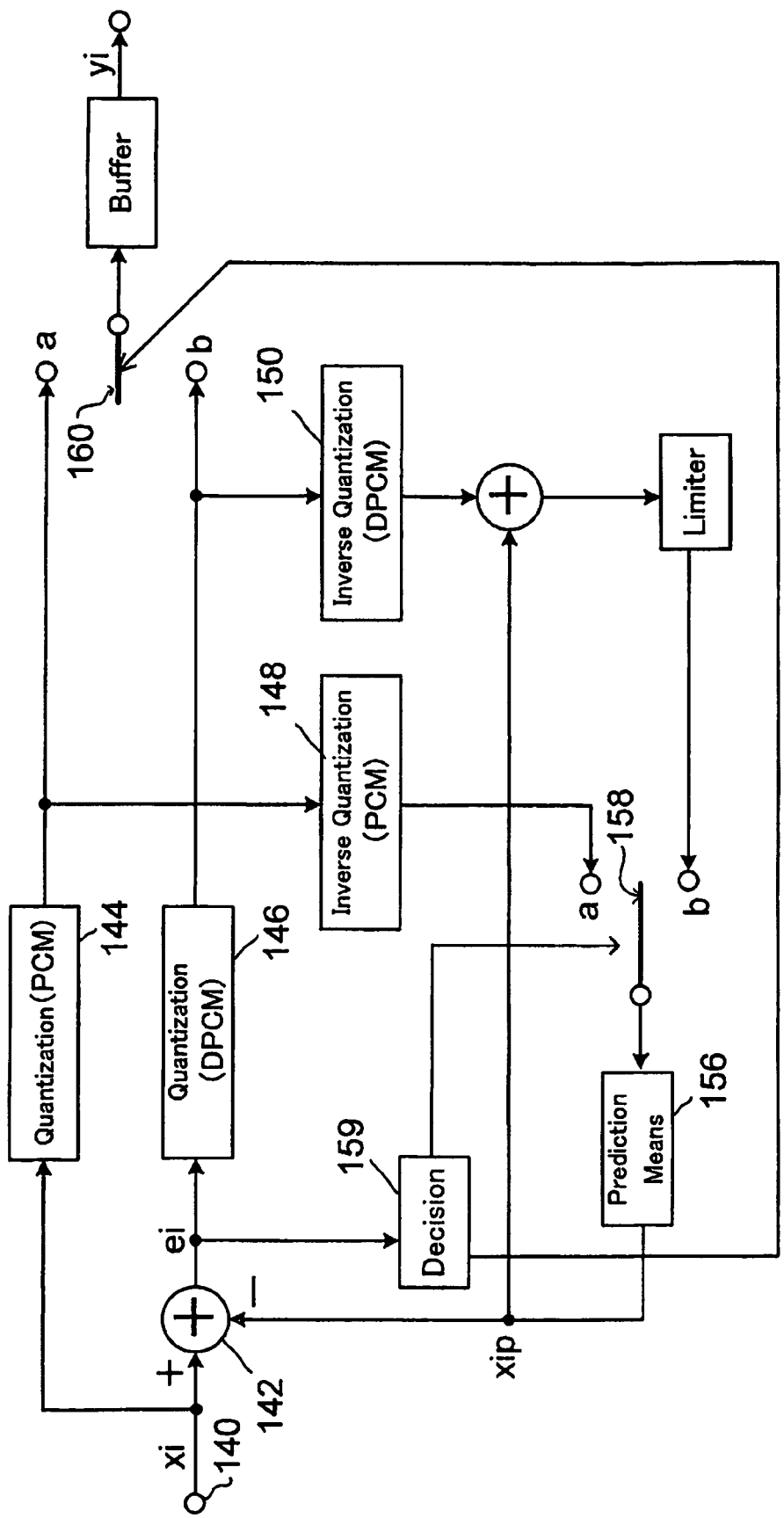
FIG. 21 is a block diagram showing a schematic structure of a conventional encoding device.
Figure 22:
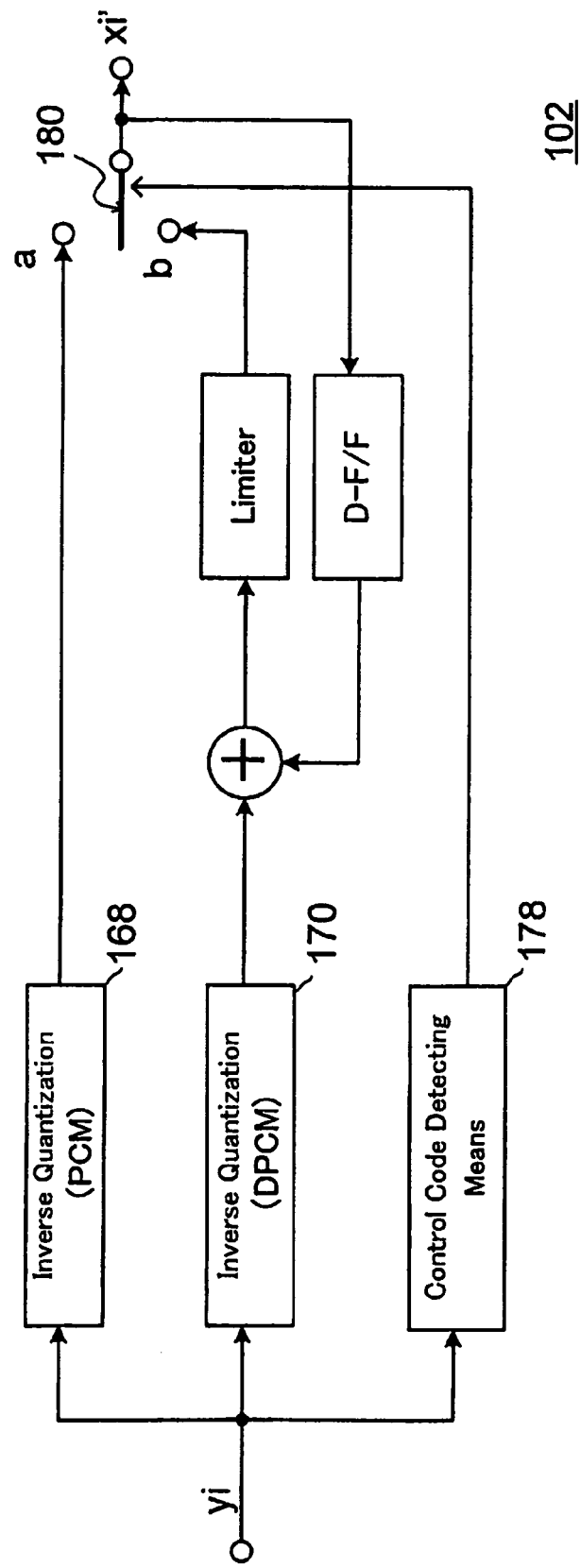
FIG. 22 is a block diagram showing a schematic structure of the decoding device corresponding to the conventional encoding device.

Further, in the conventional structure shown in FIG. 21, the quantized data is prepared by quantization processing performed by both PCM quantization means 144 and DPCM quantization means 146, irrespective of the amount of the differential value of the image data, and decision circuit 159 decides which of the quantized data is used. Namely, both quantization processing is always performed, irrespective of whether or not the quantized data is used. Meanwhile, in the device 1, the quantization processing is performed by the quantization means 14, by using the encoding target data Y(n) decided by the encoding target decision means 13, and therefore one quantization processing is executed for one component of one pixel. Therefore, useless calculation processing can be omitted, and power consumption can be suppressed, compared with the conventional structure.

Further, based on the encoding modes of "k" preceding pixels (1 pixel in the example), the encoding mode decision means 12 decides which of the pixel data X(n) and the differential value data D(n) is used as the encoding target data Y(n), in other words, whether the PCM quantization processing is performed or the DPCM quantization processing is performed. Then, the encoding mode M(n) is a value of binary values decided by the aforementioned formula 1 and formula 2. Namely, the encoding mode M(n) is decided for every pixel, and is not decided for every components (R, G, B) of each pixel. Namely, which of the PCM or DPCM processing is performed, is decided for every pixel, and is not decided for every component of each pixel.

Therefore, in order to recognize which of the quantization processing is performed, based on the finally formed fixed length code Q(n), the fixed length code Q(n) is formed by adding the encoding mode M(n) of 1 bit to each pixel, and there is no necessity for forming the code by adding a flag to each component of the pixel showing which of the quantization processing is performed. Accordingly, as shown in the example of FIG. 5, the pixel data of 30 bits in total including each 10 bits of each component can be compressed to the fixed length code Q(n) of 16 bits in which the encoding mode M(n) of 1 bit is added to the quantized data Z(n) of 15 bits. Thus, the encoding processing can be realized while maintaining a high compression rate.

Further, the device 1 can be used for the purpose of reducing data amount by encoding image information, and therefore an application range of the device 1 is wide. For example, when applied to a memory interface, memory capacity and the band width of access can be reduced, and also the power consumption can be reduced, by the encoding processing in writing memory and by the decoding processing in reading the memory, using the device 1.

Figure 10:
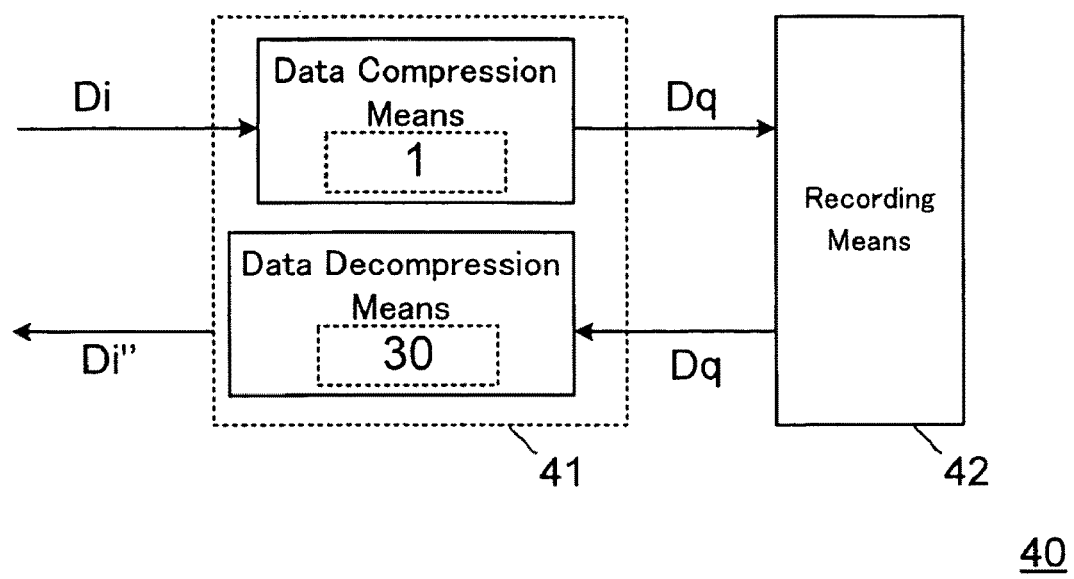
FIG. 10 shows an example of applying the encoding device and the decoding device of the present invention, to a memory system.

FIG. 10 shows an example of applying an image encoding/decoding system including the encoding device and the decoding device of the present invention to a memory system. A memory system 40 shown in FIG. 10 includes a memory interface 41 and a recording means 42, and the memory interface 41 includes the aforementioned encoding device 1 and decoding device 30 according to the present invention.

With this structure, when a writing instruction of prescribed information Di is given to the memory system 40, the information Di is converted to fixed length code Dq by the encoding device 1, and thereafter the fixed length code Dq is stored in the recording means 42. Meanwhile, when a reading instruction is given, the fixed length code Dq is read from the recording means 42 and is decoded by the decoding device 30, and the decoded data Di" is outputted, which has little error compared with the original information Di. When the information Di is the image information, the image obtained based on the read restored data Di" is displayed. Therefore, as described above, the variation of the pixel data particularly in the vicinity of the edge where the value of the pixel data is greatly varied, can be restored, with little error. Further, the information Di is encoded to fixed length code Dq and can be stored in the recording means 42 during writing, and therefore the memory capacity and the band width of access can be reduced and also the power consumption can be suppressed.

Another embodiment will be described hereinafter.

(1) In the above-described embodiment, the quantization means 14 decides the quantization step based on the value of the encoding mode of the target pixel and the preceding pixel immediately before the target pixel. However, the quantization step may also be decided in consideration of the value of the encoding mode of not only the preceding pixel immediately before the target pixel, but also the preceding several pixels.

(2) In the above-described embodiment, regarding the pixel other than the head pixel, either one of the PCM processing and the DPCM processing is executed as the quantization processing, in accordance with the encoding mode M(n) decided based on the differential value data D(n). However, it may be acceptable to have a function of arbitrarily specifying from outside which of the processing is based to perform quantization processing. Further, as described above, normally the quantization processing is more frequently performed by the DPCM processing, and therefore it may be acceptable to have a function of forcibly performing the PCM processing to prescribed numbers of pixels. Thus, it is possible to avoid a state in which the differential value data is continuously used as the encoding target data, and decoding processing is applied to many pixels retroactively during decoding processing.

Further, when the encoding processing is always performed based on the differential value, and when a great error occurs at a certain point, there is a possibility that the generated plurality of quantized data (fixed length codes) sequentially have error. Therefore, by having the function of forcibly executing the PCM processing for every prescribed number of pixels, an influence of the error can be suppressed to minimum, even if the error occurs at a certain point.

Figure 11A:
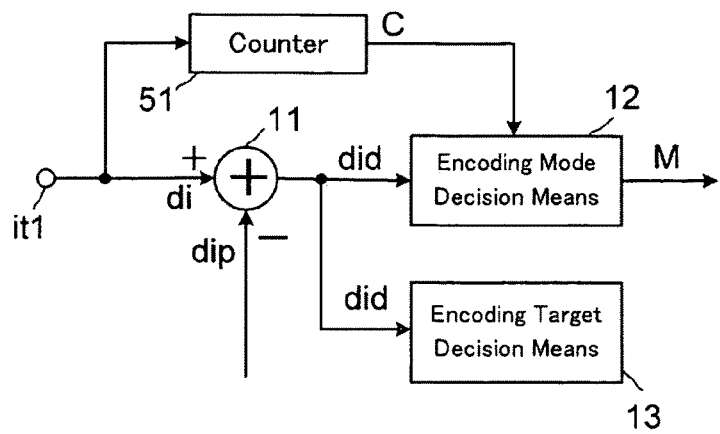
FIG. 11 is a block diagram showing a part of the schematic structure of another embodiment of the encoding device according to the present invention.
Figure 11B:
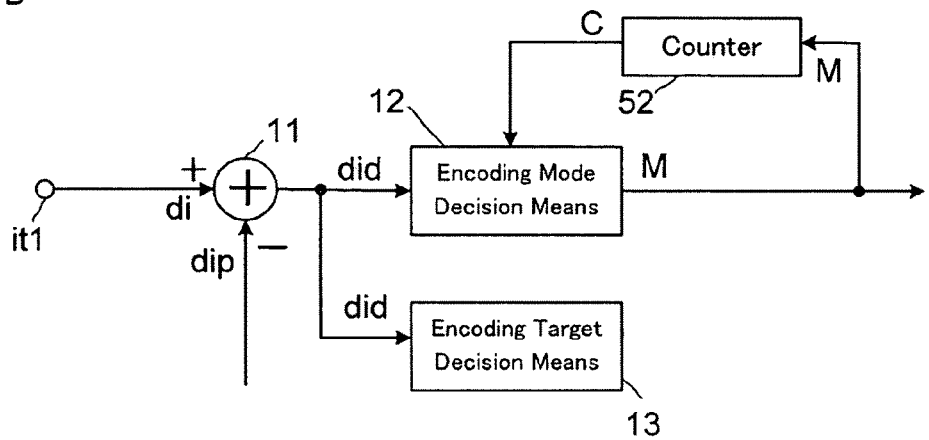
Figure 11C:
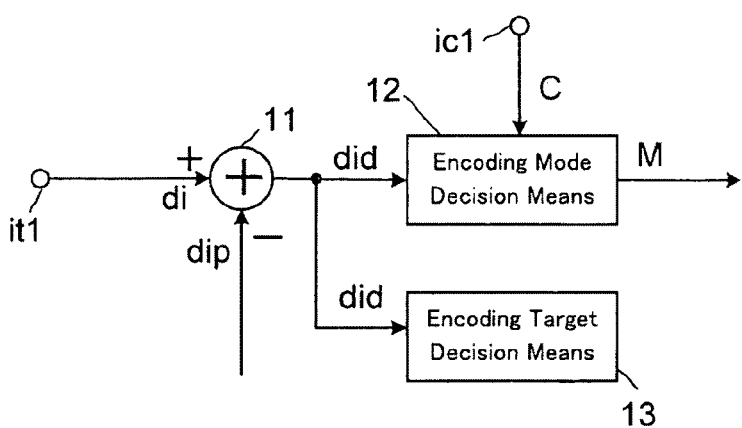

FIG. 11 is a block diagram showing an example of a part of the structure of the image encoding device according to another embodiment of the present invention (FIG. 11A to FIG. 11C). FIG. 11A shows an example of providing a counter 51 for measuring the number of pixels arranged in a scan order, showing the structure of inputting the target pixel data "di" into the counter 51. Further, FIG. 11B shows an example of providing a counter 52 for measuring the number of pixels, showing a state in which the encoding mode M expressed by M=0 continues, wherein the encoding mode M outputted from the encoding mode decision means 12 is inputted into the counter 52.

The number of pixels is counted-up by the counter 51 and the counter 52, until it is matched with the threshold value THcount, and when it is matched with THcount, the count is cleared to 0 again. The encoding mode decision means 12 forcibly sets the encoding mode to M'(n)=1 at a point where a count value shown by the counter 51 and the counter 52 indicates THcount. Thus, at least one pixel of the sequential THcount pixels is subjected to the PCM processing. Regarding the pixel to which the encoding processing is applied by the DPCM processing, the differential value is encoded, and therefore during decoding processing, the decoding processing needs to be performed retroactively to the preceding pixel, and in a worst case, the decoding processing needs to be performed retroactively to the head pixel arranged in a scan order. However, in a case of this embodiment, even in the worst case, the pixel subjected to the PCM processing is encountered if the decoding processing is performed retroactively to the pixel before THcount pixel. Therefore, the decoding processing retroactively to many pixels can be prevented, and simultaneously an influence of accumulation of errors based on the differential value can be suppressed to minimum.

Further, as the structure of having the function of forcibly executing the PCM processing for every prescribed number of pixels, it is also acceptable that external input terminal "ic1" is provided as shown in FIG. 11C, and the PCM processing is forcibly executed based on a signal given to the encoding mode decision means 12 from the external terminal "ic1", other than examples of structures shown in FIG. 11A and FIG. 11B. With this structure, timing of executing the PCM processing can be arbitrarily specified from outside.

Further, the PCM processing may also be forcibly executed by suitably combining the structures shown in FIG. 11A to FIG. 11C.

(3) According to the above-described embodiment, the quantization processing is applied to the pixel of the head of the image, in accordance with the encoding mode of M(n)=1, namely, by the PCM processing. As described above, when a plurality of pixels constituting the image are quantized, frequency of performing the quantization processing by the DPCM processing is increased. Therefore, when the error occurs in the quantization processing applied to the head pixel, there is a possibility that a great influence is given to the quantized data (fixed length code) of the pixel thereafter. Further, not a small quantization error involved in the PCM processing occurs particularly in the head pixel of the scan line. Therefore, regarding at least the head pixel, encoding by allocating the data to a plurality of fixed length codes may also be acceptable, so that decoding with little error can be achieved.

Figure 12A:
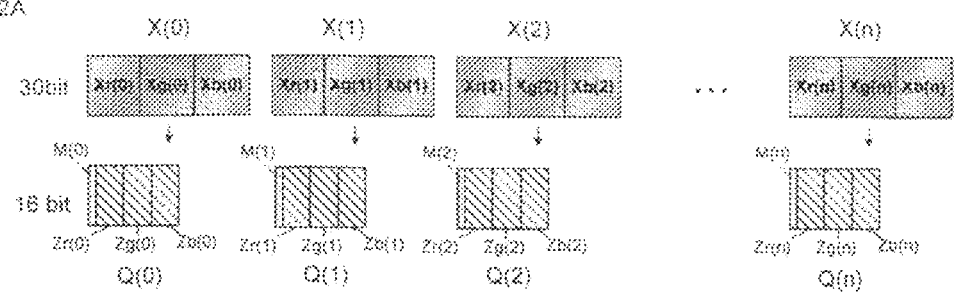
FIG. 12 shows pixel data and an example of fixed length encoding data encoded by a device of the present invention.
Figure 12B:
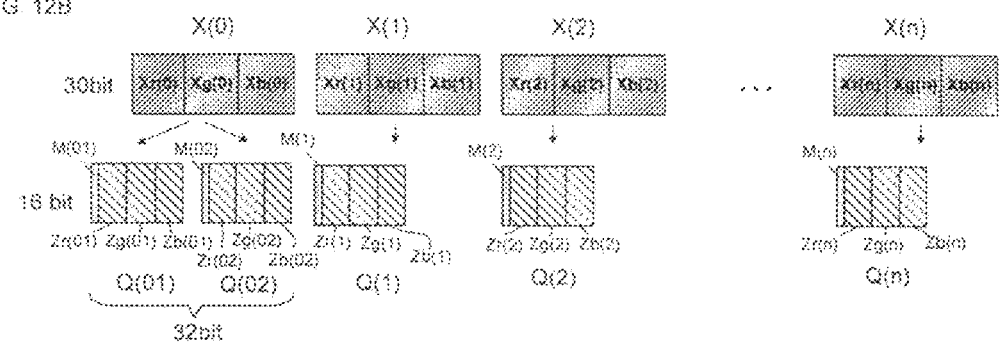

FIG. 12 shows an example of the pixel data and the fixed length encoded data encoded by the device of the present invention, wherein FIG. 12A shows a case by using the device according to the embodiment, and FIG. 12B shows a case by using the device according to another embodiment of the present invention. In the same way as FIG. 5, either case shows a case in which the fixed length code Q(n) is generated from the target image data X(n) composed of 30 bits in total including every 10 bits of R, G, B respectively.

In FIG. 12A, in the same way as FIG. 5, the fixed length code Q(n) composed of the quantized data Z(n) of 15 bits in total including every 5 bits of Zr(n), Zg(n), Zb(n), and the encoding mode M(n) of 1 bit, are generated from the pixel data X(n) of 30 bits in total including every 10 bits of R, G, B. At this time, as described above, according to the device of the present invention, the quantization processing is applied to the head pixel of the image, in accordance with the encoding mode of M(n)=1, namely, by the PCM processing.

As shown in FIG. 12A, regarding the head pixel of the image in the embodiment as well, the pixel data X(0) of 30 bits is encoded to the fixed length code Q(0) of 16 bits. Meanwhile, in a case of the another embodiment, as shown in FIG. 12B, the pixel data X(0) of 30 bits is encoded to two fixed length codes Q(01), Q(02) of 16 bits. At this time, an arbitrary encoding method is taken to encode the pixel data X(0) to the fixed length codes Q(01) and Q(02). Namely, only when the encoding target data is the data corresponding to the head pixel, the quantization means 14 performs "formal" quantization processing (re-quantization processing) by a previously defined quantization method which is different from the aforementioned quantization method. At this time, as shown in FIG. 12B, the quantization processing (re-quantization processing) is performed, so that the generated plurality of fixed length codes have bits of more than the bits constituting the pixel data. Note that in the same way as FIG. 12A, the pixel data X(n) other than the pixel X(0) of the head, is encoded to the fixed length code Q(n) of 16 bits.

With this structure, information amount of 32 bits can be held by Q(01) and Q(02), and therefore information can be held by using the bits of more than the bits constituting the pixel data X(0). Accordingly, the pixel data X(0) can be reversibly decoded, and therefore regarding the pixel data X(0), the quantization error can be set to 0. Further, the generated encoded data has also only an increase quantity of the fixed length corresponding to only the head pixel, and therefore the property of the fixed length code is not greatly damaged. In this example, X(0) is encoded and is allocated to Q(01) and Q(02). However, X(0) can be similarly allocated to Q(01), Q(02), . . . , Q(0k)(k≧1), depending on the compression rate.

(4) Each pixel data, a code length after encoding, and a value of the quantization step used in the description of the embodiment are absolutely examples, and the embodiment is not limited thereto. Moreover, the pixel data is not limited to an RGB form, and the other form (YUV format, etc,) may also be acceptable. Further, bit lengths allocated to each component (R component, G component, and B component, etc,) constituting the pixel may be different from each other. Particularly, when input data of the image is the RGB format, it may be acceptable to have a function of increasing the compression rate, by suitably converting the RGB data to YUV4:2:2 format and YUV4:2:0 format, and thereafter inputting the converted data from the input terminal it1, and executing each processing of later stage. In this case, the aforementioned "pixel data" corresponds to the data obtained by applying the conversion processing to each pixel data.

FIG. 13 shows an example in which the data obtained by converting the RGB format to YUV4:2:2 or YUV4:2:0 format in an input stage, is inputted from the input terminal it1, and thereafter each processing in the later stage is executed. As shown in FIG. 13A, the pixel data before processing is inputted from the input terminal it2, and after the pixel format is converted by a conversion means 61, the pixel data, with the pixel format converted, is outputted from output terminal ot2. Then, the pixel data after conversion is given to the subtractor 11 and the encoding target decision means 13. Then the processing of the later stage is performed.

In the conversion of RGB→YUV4:2:2, one data of Y component is generated for every one pixel in RGB, and one data of U component and V component is respectively generated in every two pixels in RGB, and therefore as shown in FIG. 13B, the data amount after conversion is 2/3. In the conversion of RGB→YUV4:2:0, one data of Y component is generated for every one pixel in RGB, and one data of the U component and V component is respectively generated in every four pixels in RGB, and therefore as shown in FIG. 13C, the data amount after conversion is 1/2. When they are converted by the image encoding device of the present invention, the compression rate as a whole is 1/3 in a case of FIG. 13B, and is 1/4 in a case of FIG. 13C, thus increasing the compression rate. In such cases, a buffer for calculating the U component and the V component is required in a YUV conversion circuit of the former stage.

Note that the conversion means 61 for converting the format of the pixel data may be provided inside of the device 1 of the present invention, or may be provided outside of the device 1 of the present invention. In the former case, data output from the output terminal ot2 shown in FIG. 13A is inputted into the input terminal it1 shown in FIG. 1. Further, in the latter case, the conversion means 61 is provided in the post stage of the input terminal it1 in FIG. 1, and the pixel data given from the input terminal it1 is inputted into the input terminal it2 shown in FIG. 13A, and the pixel data after conversion is given to the subtractor 11 and the encoding target decision means 13 from the output terminal ot2.

(5) According to the embodiment, the differential value data $D(n)=X(n)-X'(n)$, which is simply the differential value between the target pixel data $X(n)$ and the predicted value data $X'(n)$, is used as the input data of the encoding mode decision means 12 and the encoding target decision means 13 of FIG. 1. However, the quantized differential value data $D'(n)$ obtained by dividing the differential value data $D(n)$ by prescribed differential statistical data "r" as will be described later, may be used as the input data of the encoding mode decision means 12 and the encoding target decision means 13. In accordance with the structure of FIG. 1, when the target pixel data is described as "di", the predicted value data is described as "dip", the differential value data is described as "di", and the quantized differential data is described as "didq", then, $didq=(di-dip)/r$ may also be inputted into the encoding mode decision means 12 and the encoding target decision means 13.

Note that in order to distinguish data "did" from data "didq" hereinafter, the data "did" is called "simple differential value data", and the differential value data quantized is called "quantized differential value data". Then, the "simple differential value data" and the "quantized differential value data" are called "differential value data".

FIG. 14 is a block diagram showing an example of a part of the structure of the image encoding device according to the embodiment, wherein a different point is that differential value quantization means 18 is newly provided, compared with the structure shown in FIG. 1.

When the simple differential value data "did" is inputted, which is the differential value between the target pixel data "di" and the predicted value data "dip", outputted from the subtractor 11, the differential value quantization means 18 applies quantization processing to the simple differential value data "did" by using prescribed differential statistical data "r", to thereby generate the quantized differential value data "didq". Then, the quantized differential value data "didq" is outputted to the encoding mode decision means 12 and the encoding target decision means 13.

Then, based on the simple differential value data "did", the encoding mode decision means 12 decides the encoding mode. However, instead, the encoding mode M is decided based on the quantized differential value data "didq". Further, based on the encoding mode M, the encoding target decision means 13 decides which of the target pixel data "di" and the quantized differential value data "didq" is used as the encoding target data "diy", and outputs the encoding target data "diy".

The differential value quantization means 18 reads from the buffer 17 the encoding modes $M(n-k), \ldots, M(n-1)$ of the "k" preceding pixels (k is the natural number, and the "k" pixels correspond to statistical target pixels), and calculates the differential statistical data "r" uniquely defined by each value of the encoding modes $M(n-k), \ldots, M(n-1)$. More specifically, in the encoding modes $M(n-k), \ldots, M(n-1)$ of the "k" preceding pixels, the differential statistical data "r" is calculated based on a calculation formula defined so that the value becomes smaller as MCount becomes larger, by using the MCount which is a value obtained by counting the encoding mode of $M(n)=1$. Then, the quantized differential value data didq $(=D'(n)=D(n)/r)$ is outputted by using the calculated differential statistical data "r" and simple differential value data did $(=D(n))$.

For example, in a case of k=5, when the value obtained by counting the encoding mode of $M(n)=1$ is set to MCount in the encoding modes $M(n-5), \ldots, M(n-1)$ of the five preceding pixels, the differential value quantization means 18 calculates the differential statistical data "r" from the formula $r=G+(MCount/k)\times H$ by using prescribed constants G, H. Specifically, in a case of G=1 and H=2, and MCount=4 corresponding to the target data "di", the differential statistical data "r" is calculated to be $r=1+4/5\times 2=2.6$.

Then, the simple differential value data "did" is divided by the differential statistical data "r" calculated by the differential value quantization means 18, and the quantized differential value data "didq" is calculated.

According to a case of the embodiment, for example, when the predicted values of the pixel $Ca(n)=(300, 520, 764)$ of FIG. 2 are (276, 512, 768), the simple differential value data $D(n)$ is calculated to be $D(n)=(300, 520, 764)-(276, 512, 768)=(24, 8, -4)$. Here, when the threshold value is expressed by $Th(0)=15=(1111)_2$, $Th(1)=63=(111111)_2$, and in a case of r=1, $\max(|Dr(n)|, |Dg(n)|, |Db(n)|)=24$ is obtained, and the encoding mode $M(n)$ of the pixel C is varied depending on the value of the encoding mode $M(n-1)$ of the preceding pixel immediately before the pixel C. Namely, when the encoding mode is expressed by $M(n-1)=0$, $Th(M(n-1))=15$ is obtained and therefore $M(n)=1$ is decided by the formula 1, and reversely in a case of $M(n-1)=1$, $Th(M(n-1))=63$ is obtained and therefore $M(n)=0$ is decided by the formula 2.

Meanwhile, according to another embodiment of the present invention, when the differential value quantization means 18 is provided, and the differential statistical data is expressed by r=2, the quantized differential value data is expressed by $D'(n)=D(n)/r=(24/2, 8/2, -4/2)=(12, 4, -2)$, and $\max(|D'r(n)|, |D'g(n)|, |D'b(n)|)=12$ is obtained. Therefore, $M(n)=0$ is obtained based on the formula 1, irrespective of 0 or 1 of the encoding mode $M(n-1)$ of the preceding pixel immediately before the pixel C.

Thus, according to the another embodiment of the present invention, when the quantized differential value data is expressed by r=2, the differential value data (the simple differential value data in a case of FIG. 1, and the quantized differential data in a case of FIG. 14) given to the encoding target decision means 13 as the candidate of the encoding target data, can take a value of ½, compared with the above-described embodiment. Therefore, in a case of the same bits of the quantized data "diz", a value up to a double value can be expressed as the encoding target data "diy". Therefore, the dynamic range can be expressed with the same bits as the case of FIG. 1, and in the data after restoration as well, the dynamic variation can be faithfully restored.

Note that FIG. 1 shows substantially the same case as the case of expressing the quantized statistical data by r=1 in FIG. 14.

Of course, it is not limited to the case of r=2, that the value that can be taken by the differential value data serving as the encoding target data "diy" is 1/r in a range of r>1 (for example, in the aforementioned example, the quantized statistical data is expressed by r=2.6, and therefore the value that can be taken by the differential value data is 1/2.6). Therefore, in a case of the same bits of the quantized data "diz", the value can be expressed up to r-fold value as the encoding target data "diy". Accordingly, various dynamic ranges can be expressed, and even in the data after restoration, the dynamic variation can be faithfully restored.

Further, in the above-described example, the differential statistical data "r" is decided by using the encoding modes of "k" preceding pixels, expressed by $M(n-k), M(n-1)$. However, the differential statistical data may also be decided in consideration of not only the "k" preceding pixels from the target pixel, but also the value of the encoding mode of the preceding frame.

Further, it may also be acceptable to have a function of forcibly executing the normal PCM/DPCM processing for every prescribed number of pixels. In this case, in the same way as FIG. 11A or B, a prescribed counter for counting the number of processing target pixels is provided, and the number of pixels is counted-up to a prescribed threshold value THcount, and when the number of pixels is matched with the THcount, the counter is cleared to 0 again. The differential value quantization means 18 forcibly sets the differential statistical data to r=1, in a stage when the counter shows the same value as the THcount. At this time, the PCM/DPCM processing is applied to at least one pixel of the sequential THcount pixels, based on the simple differential value data. Thus, even when the differential statistical data takes sequential large values locally, the PCM/DPCM processing is performed based on the simple differential value data, with respect to at least previously defined each prescribed number of THcount pixels, and therefore the decoding processing can be surely performed retroactively to at least the THcount pixel. Thus, the number of pixels that precede a calculating target pixel can be suppressed to minimum, for obtaining information necessary for performing the decoding processing.

Similarly, the differential value quantization means 18 may forcibly set the differential statistical data to r=1 for every predetermined number of frames.

Further, for example, as shown in FIG. 14B, when an external input terminal "ic2" capable of inputting a signal from outside into the differential quantization means 18 is provided and when the signal is given from the external input terminal "ic2", the differential statistical data "r" may be forcibly set to r=1. With this structure, similar PCM/DPCM processing as that of FIG. 1 can be forcibly executed at a timing arbitrarily designated from outside while variously changing dynamic ranges can be expressed.

Note that in decoding the data encoded by the encoding device of FIG. 14, when the inverse quantization means 31 refers to the encoding mode M(n) and recognizes that the quantized data Z(n) is quantized by the DPCM processing in the structure of the decoding device shown in FIG. 7, the encoding modes of the "k" previous pixels expressed by M(n−k), . . . , M(n−1) are read from the buffer 34, to derive the differential statistical data "r", and by using the differential statistical data "r" and the quantized data Z(n), the restored data X"(n) may be generated.

Figure 15:
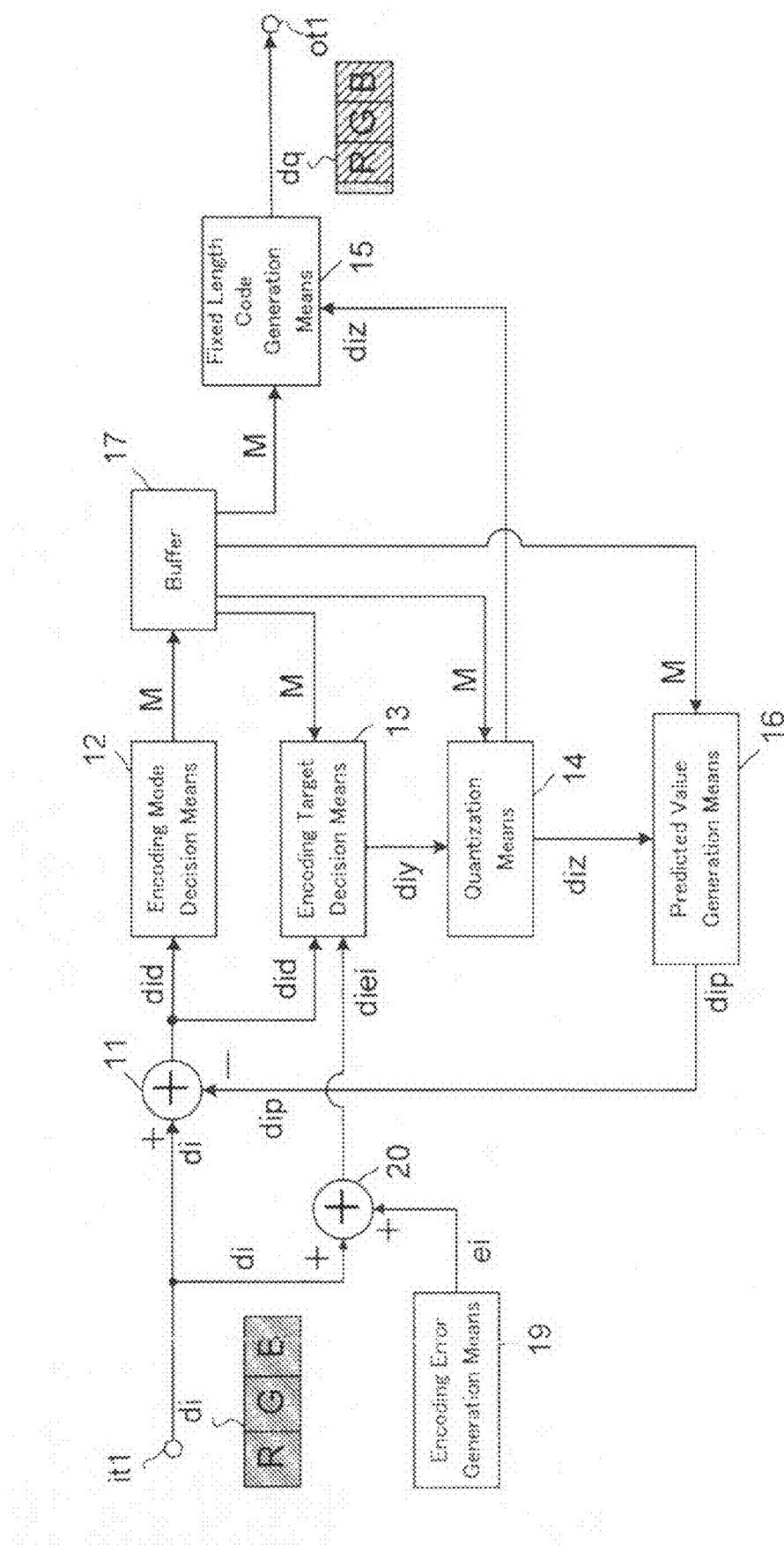
FIG. 15 is a block diagram showing a schematic structure of the encoding device according to another embodiment of the present invention.

(6) According to the embodiment, the target pixel data "di" and the differential value data "did" are inputted into the encoding target decision means 13. Meanwhile, as shown in the structure of FIG. 15, instead of the target pixel data "did", error-added target pixel data as will be described later may be inputted into the encoding target decision means 13. In the description below, first, an example of the structure of another embodiment of the present invention will be described specifically, and thereafter an effect of this structure will be described.

FIG. 15 is a block diagram of an example of showing the structure of the image encoding device according to another embodiment of the present invention, wherein a different point is that encoding error generation means 19 and encoding error adding means 20 are newly provided, compared with the structure shown in FIG. 1.

The encoding error generation means 19 calculates and outputs encoding error data "ei" with respect to the input pixel by a previously defined method. The encoding error adding means 20 adds the encoding error data "ei" given from the encoding error generation means 19, to the inputted target pixel data "di", and outputs the error-added target pixel data "diei" to the encoding target decision means 13.

FIG. 16 to FIG. 18 show examples of the structure of the encoding error generation means 19, respectively. The error generation means 19 may use one of the structures shown in each of FIG. 16 to FIG. 18, and may also have the other structure.

Figure 16A:
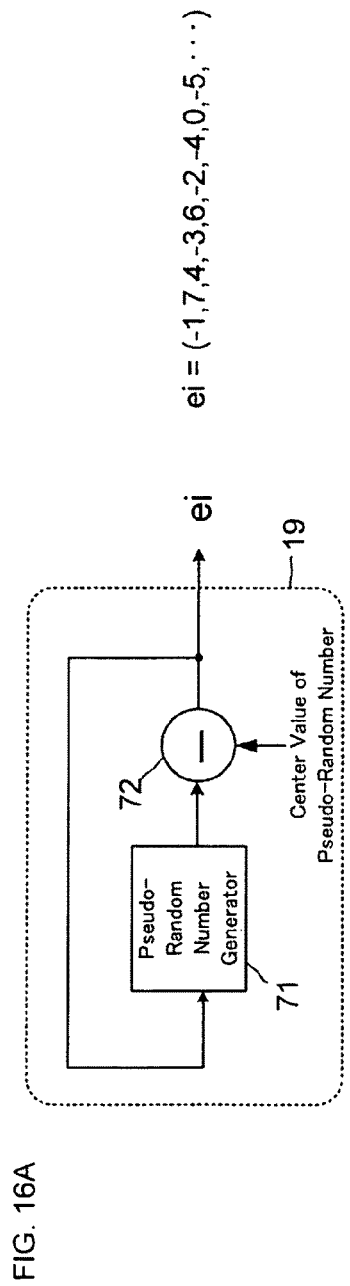
FIG. 16 shows a constitutional example of error generation means.

The encoding error generation means 19 shown in FIG. 16A includes a pseudo-random number generator 71 and a subtractor 72. As the pseudo-random number generator 71, for example, generally used LFSR(Linear Feedback Shift Resister) can be used. Further, a center value between the random number generated from the pseudo-random number generator 71 and the random number outputted from the same pseudo-random generator 71 is inputted into the subtractor 72, and the differential value between them is outputted as encoding error data "ei".

With this structure, the encoding error data "ei" is expressed as the pseudo-random number whose mean value is 0. Then, the error-added target pixel data "diei" obtained by adding the encoding error data "ei" and the target pixel data "di" is inputted into the encoding target decision means 13. Then, when the encoding mode is expressed by M(n)=1, quantization is performed not by using the target pixel data "di", but by using the error-added target pixel data "diei". Note that the mean value of the pseudo-random numbers is set to 0 for the purpose of preventing an average luminance of the image from changing before and after compression, or preventing a great discrepancy between the error-added target pixel data "diei" and the target pixel data "di".

Figure 16B:
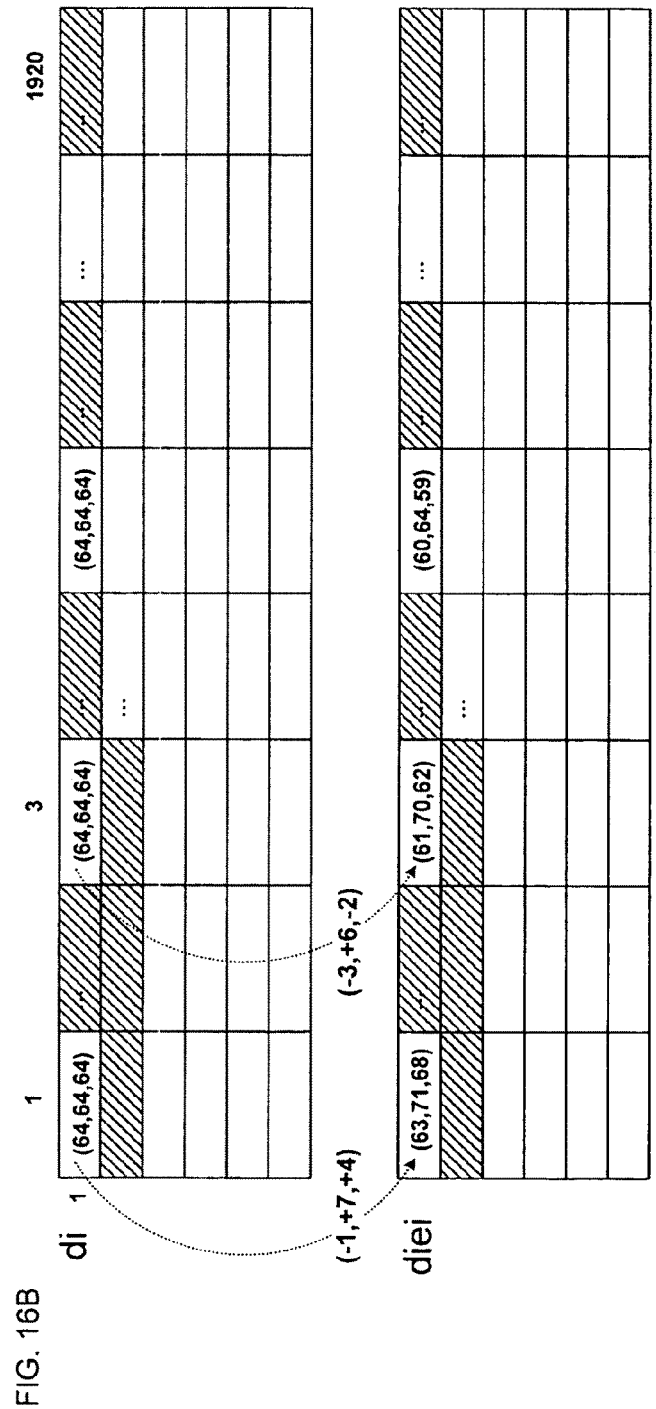

FIG. 16B is a table showing an example of calculating the error-added target pixel data "diei" by the encoding error generation means 19 shown in FIG. 16A. Namely, the error-added target pixel data "diei" is calculated by adding values of the encoding error data "ei" sequentially outputted from the encoding error generation means 19, for every components of the sequentially given target pixel data "di". Note that in FIG. 16B, areas filled with white color indicate the PCM processing target pixels (namely, M(n)=1), and areas filled with diagonal lines indicate the DPCM processing target pixels (namely, M(n)=0) (the same thing can be said for FIG. 17 and FIG. 18). It is in a case of the PCM processing, that quantization is performed by using the error-added target pixel data, and therefore in FIG. 16B, operation contents of the pixels on the coordinates (1,1) and (1, 3) are representatively described. Meanwhile, as described above, in the DPCM processing target pixel, in the same way as the aforementioned embodiment, the differential value data "did" may be used as a target of the quantization processing, or as is described in the another embodiment (5), the quantized differential value data "didq" may be used as the target of the quantization processing. The same thing can be said for FIG. 17 and FIG. 18 hereafter.

Figure 17A:
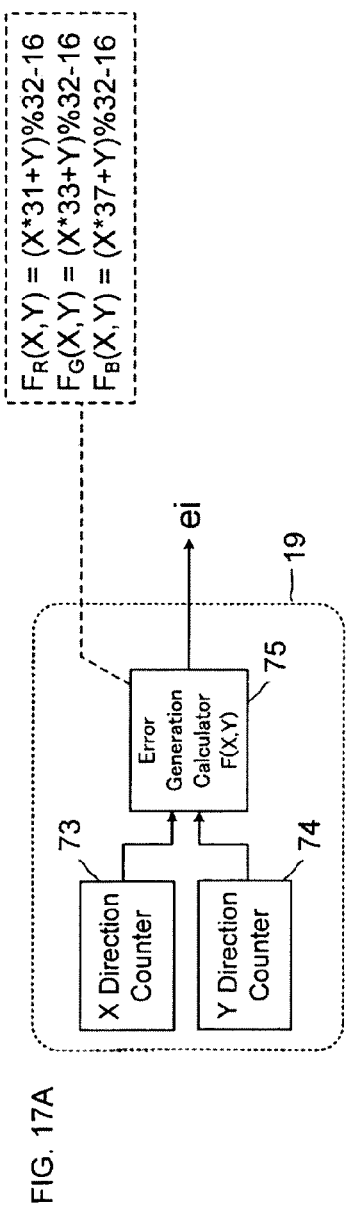
FIG. 17 shows another constitutional example of the error generation means.

The encoding error generation means 19 shown in FIG. 17A includes counters 73, 74 for recognizing the coordinate of the pixel, and an error generation calculator 75. Then, a function formula for calculating errors with respect to each component of R, G, B, is stored in the error generation calculator 75. The encoding error generation means 19 of FIG. 17 decides the encoding error data "ei" in accordance with the pixel coordinate of the target pixel data. With this structure, the encoding error data "ei" on the same coordinate of each frame of a moving picture is always a constant value. Therefore, flickering of the images can be prevented, which is generated by fluctuation of the error data "ei" between frames in a case of a slide show of the static images.

Figure 17B:
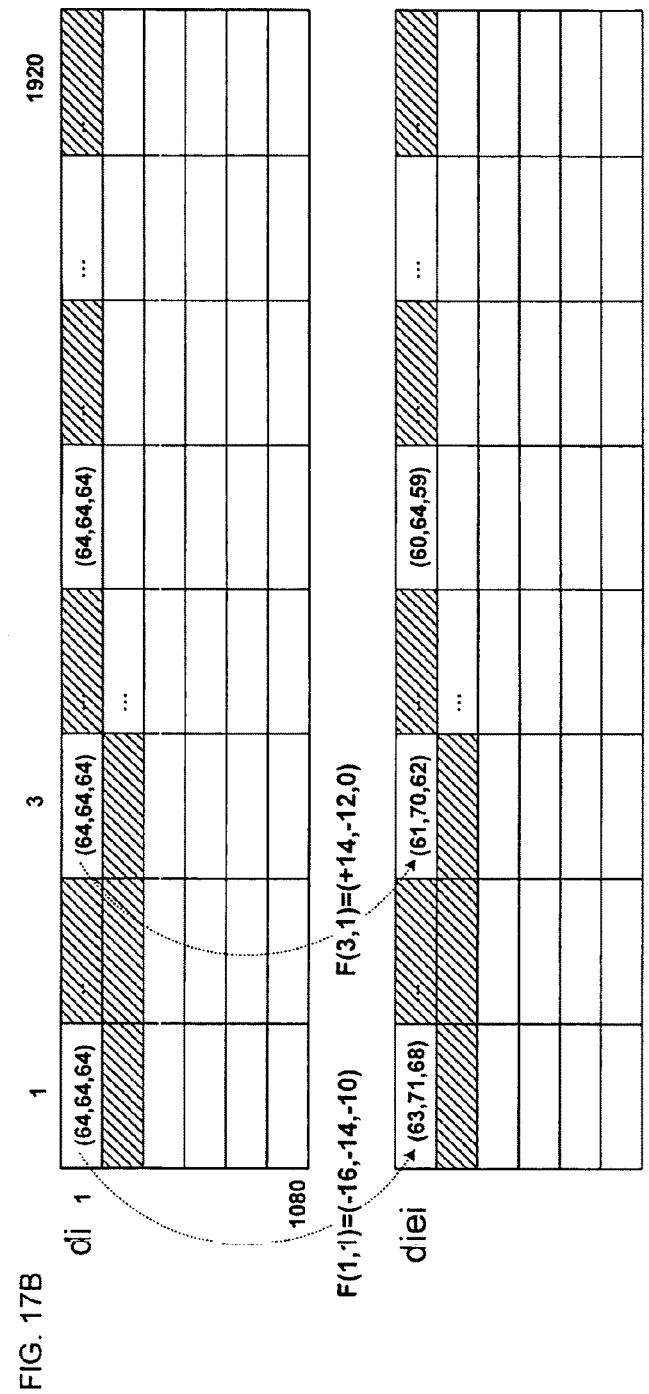

FIG. 17B is a table showing the example of calculating the error-added target pixel data "diei" by the encoding error generation means 19 shown in FIG. 17A. A value is obtained by subtracting 16 from the residue of 32 of the value calculated based on the coordinate (X, Y) to obtain the mean value 0, and the value thus obtained is used as encoding error data "ei" by error generation calculator 75 shown in FIG. 17A. When the pixel corresponding to the coordinate (1, 1) is focused, the error generation calculator 75 reads the values of both counters 73, 74 and recognizes the coordinate as (1, 1), then substitutes X=1, Y=1, and calculates and outputs the encoding error data "ei"=F(1, 1) of R, G, B, respectively. Here, the encoding error data "ei" is calculated to be F(1, 1)=(−16, −14, −10), and therefore the encoding error adding means 20 adds the encoding error data "ei" to the target pixel data di=(64, 64, 64) on the coordinate (1, 1), and transmits the error-added target pixel data "diei"=(63, 71, 68) to the encoding target decision means 13. Note that 16 is subtracted, to obtain the mean value 0of the outputs from the error generation calculator 75. This is because a great discrepancy between the error-added target pixel data "diei" and the target pixel data "di" is prevented as a whole same as in the case of the structure in FIG. 16.

Figure 18A:
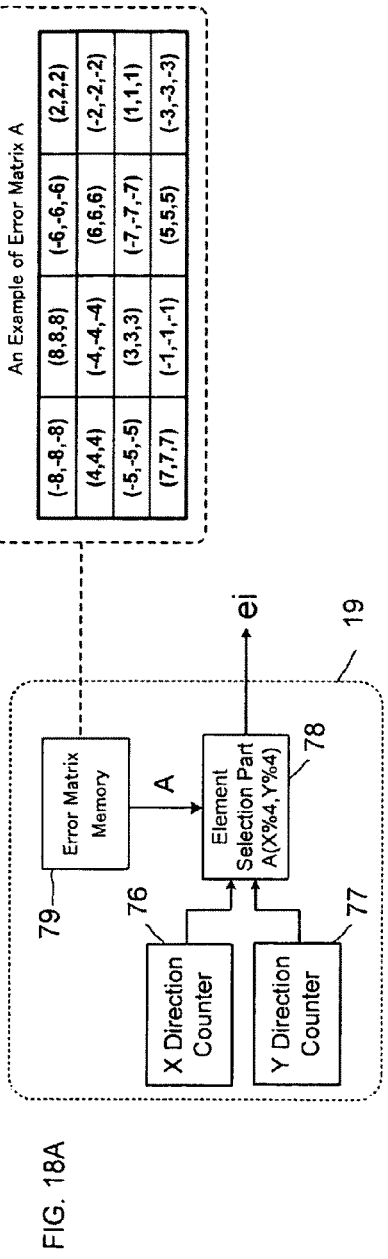
FIG. 18 shows further another constitutional example of the error generation means.

The encoding error generation means 19 shown in FIG. 18A includes: the counters 76, 77 for recognizing the coordinate of the pixel; an element selection part 78; and an error matrix memory 79 in which error matrix is registered. Matrix (error matrix) used for calculating the encoding error data on a plurality of coordinates, is registered in the error matrix memory 79. The element selection part 78 reads an error matrix from the error matrix memory 79, then reads the coordinate of the target pixel from the counters 76, 77, and selects the element of the error matrix corresponding to the coordinate, and outputs the value thus obtained as the encoding error data "ei". Note that here, as an example, the error matrix is set as 4×4 matrix, and therefore the encoding error data shows the same value every four columns in the same row, and every four rows in the same columns. Further, here, the same encoding error data is used for one pixel, among each component of R, G, B.

Figure 18B:
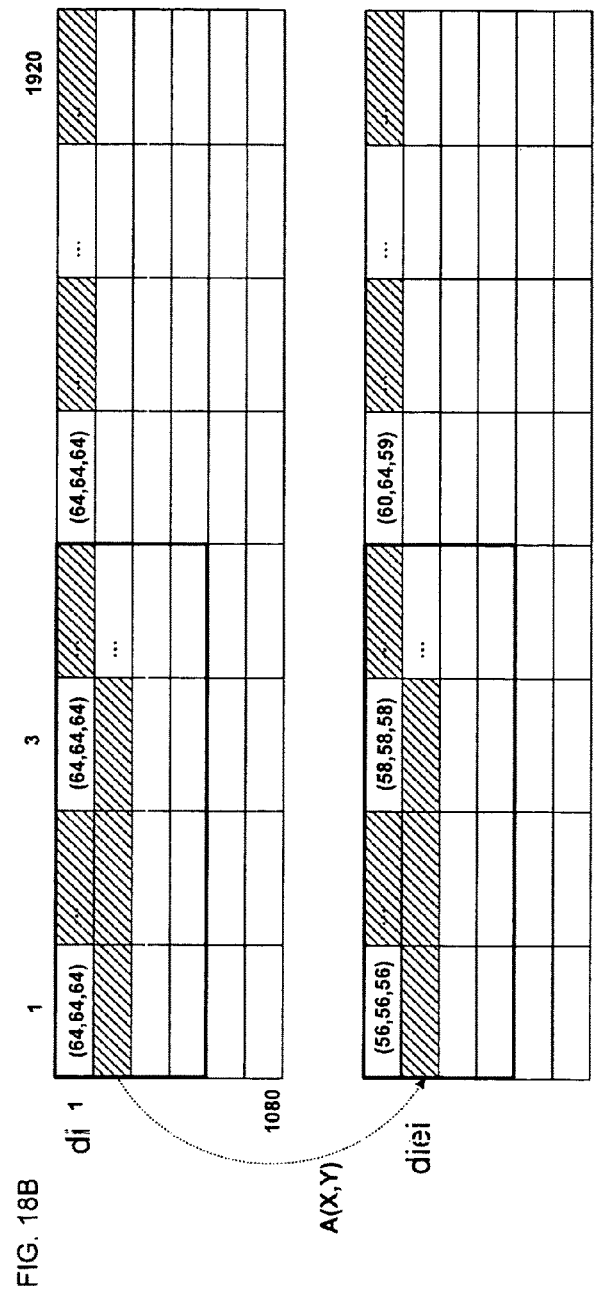

FIG. 18B is a table showing the example of calculating the error-added target pixel data "diei" by the encoding error generation means 19 shown in FIG. 18A. For example, when the pixel corresponding to the coordinate (1, 1) is focused, the element selection part 78 reads the values of both counters 76, 77, and recognizes the coordinate as (1, 1), and selects the element corresponding to the coordinate (1, 1) out of the error matrix A read from the error matrix memory 79, and decides the encoding error data "ei"(=−8, −8, −8). The encoding error adding means 20 adds the encoding error data "ei" to the target pixel data "di"=(64, 64, 64) on the coordinate (1, 1), and transmits the error-added pixel data "diei"=(56, 56, 56) to the encoding target decision means 13.

Note that in FIG. 18, the error matrix is set as 4×4. However, this is simply an example, and the matrix of other size such as 8×8 can also be used. Further, the same encoding error data is used among each component of R, G, B. However, the error matrix may be used as different data for every component of R, G, B, or different encoding error data may also be used among each component of R, G, B by applying a predetermined calculation to the selected element.

In addition to the examples shown in FIG. 16 to FIG. 18, it is also acceptable that the encoding error generation means 19 records, for example, a value of the target pixel data, and a statistical value and an actual result value of the encoding error data until now, and calculates the encoding error data based on the past recorded value.

In any one of the constitutional examples shown in FIG. 16 to FIG. 18, and even when any one of the other methods is used, the encoding error data "ei" is used as the pseudo-random data so that a mean value of the distribution is set to 0. Then, for example, in an arbitrary range "a" of the image data, $\Sigma a(di+ei)-\Sigma a(di) \approx \rho a(ei)=0$ is obtained by expressing the sum of the luminance of all pixel values in this area by $\Sigma a$, and visually no variation occurs in the luminance and color phase of each area. Therefore, distortion of the image is not added when the data after quantization is restored, when the encoding error data is added.

Next, an advantage obtained by the processing of the embodiment will be described by using a specific processing example. FIG. 19 shows a processing example in another embodiment of the present invention. The image with 10-bit gradation (STIPE_GRAD) is considered as the input image data. RGB components of the pixel of STRIPE_GRAD(X, Y) are given by the following formula 3, on the coordinate of the image ($1 \leq X \leq 1920$, $1 \leq Y \leq 1080$). At this time, STRIPE_GRAD is the image data shown in FIG. 19A.

STRIPE_GRAD(X,Y)=(Y,Y,Y) (when X is the odd number)

STRIPE_GRAD(X,Y)=(0,0,0) (when X is the even number)     Formula 3

Here, when the encoding processing is applied to the image data shown in FIG. 19A, by using the encoding device of the embodiment, the maximum value of each component of the differential value data D(n) becomes a large value at a point where the value of the Y-coordinate is large, compared with Th(M(n−1)). Therefore, the encoding mode is expressed by M(n)=1, and all encoding modes of target pixels are set in a PCM processing mode. At this time, the component of each pixel is quantized to 5 bits by being divided by $2^5$ during encoding, and is inversely quantized to 10 bits by being multiplied by $2^5$ during decoding. Image STRIP_GRAD_A after decoding the data encoded by such processing has substantially 5-bit gradation as shown in the following formula 4. Note that in the following, [x] shows that x is rounded off after the decimal point.

STRIPE_GRAD_A(X,Y)=([Y/32]×32, [Y/32]×32, [Y/32]×32) (when X is the even number)

STRIPE_GRAD_A(X,Y)=(0,0,0) (when X is the even number)     Formula 4

At this time, in the image data of STRIPE_GRAD_A, there is a case that the false contour is displayed, which does not exist in the image data (original data) of STRIP_GRAD as shown in FIG. 19B.

Even when the encoding device of another embodiment of the present invention is used, similarly, all encoding modes of the target pixels are set in the PCM processing mode, at a point where the value of the Y-coordinate is large. However, the quantization means 14 performs 5-bit quantization to the error-added target pixel data "diei" in which the encoding error data "ei" generated by the encoding error generation means 19 is added to the component of each pixel. Then, the error-added target pixel data "diei" is inversely quantized to 10 bits. Image STRIPE_GRAD_B after decoding the data encoded by such processing is expressed by the formula 5 as follows. Note that "eiR", "eiG", "eiB" show each component (R, G, B components) of the encoding error data "ei", respectively.

STRIPE_GRAD_B(X,Y)=([(Y+eiR)/32]×32, [(Y+eiG)/32]×32, [(Y+eiB)/32]×32) (when X is the odd number)

STRIPE_GRAD_B(X,Y)=(0,0,0) (when X is the even number)     Formula 5

In the above-described formula 5, in a case of |eiC|<32 (C is any one of R, G, B), [(Y+eiC)/32]×32 takes any one of three values of ([Y/32]×32−32), ([Y/32]×32), ([Y/32]×32+32). Namely, the value restored in accordance with the value of the added encoding error data "ei" is varied, and therefore an effect that no false contour is observed in the STRIP_GRAD_B image in the neighborhood area where the false contour appears in the STRIPE_GRAD_A image, can be expected (see FIG. 19C).

Namely, another embodiment of the present invention shows an effect of not allowing the false contour to be generated by intentionally adding the encoding error data to a certain specific image such as the image STRIPE_GRAD, in which the false contour is generated when the decoding processing is performed after the encoding processing is performed by the encoding device of this embodiment.

(7) In the aforementioned embodiment of the image decoding device, output data of the inverse quantization means 31 of FIG. 7 is set as decoded data X"(n) as it is. However, instead of the output data of the inverse quantization means 31, error-added restored data is also acceptable, in which decoding error data "eo" is added to the data. Namely, in the structure of FIG. 7, error-added restored data "doeo" (=do+eo) obtained by adding output data "do" of the inverse quantization means 31 and decoding error data "eo", may be outputted as the restored data X"(n).

Figure 20:
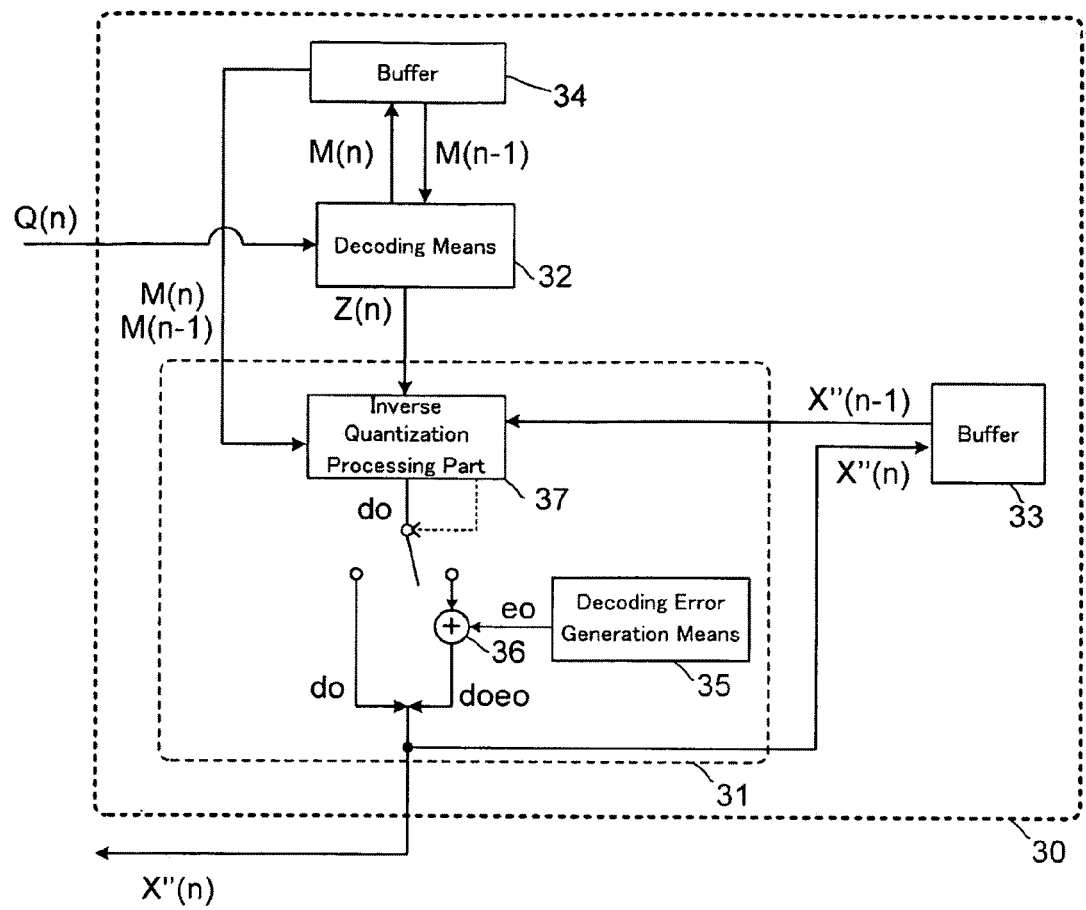
FIG. 20 is a block diagram showing a schematic structure of the decoding device according to another embodiment of the present invention.

FIG. 20 is a block diagram showing an example of the structure of the image decoding device according to another embodiment of the present invention, wherein a different point is that decoding error generation means 35 and decoding error adding means 36 are provided in the inverse quantization means 31, compared with the structure shown in FIG. 7. Note that for the convenience of explanation, a calculation processing part for preparing restored data "do" by using the quantized data Z(n) given from the decoding means, the encoding modes M(n), M(n−1) given from the buffer 34, and the pixel data X"(n−1) given from the buffer 33, in the inverse quantization means 31 is described as an inverse quantization processing part 37. The inverse quantization means 21 in FIG. 6, and the inverse quantization means 31 in FIG. 7 include the inverse quantization processing part 37, but do not include the decoding error generation means 35 and the decoding error adding means 36.

The decoding error generation means 35 calculates and outputs the decoding error data "eo" with respect to the output data "do" of the inverse quantization means 31 by a previously defined method. The inverse quantization processing part 37 selects and executes, whether the output data "do" is outputted as serial restored data in accordance with the encoding mode M(n), or is outputted to the decoding error adding means 36. Namely, when the encoding mode is expressed by M(n)=1, the inverse quantization means 31 adds the output data "do" from the inverse quantization processing part 37 and the decoding error data "eo" given from the decoding error generation means 35, and outputs the error-added decoded data "doeo" obtained as a result of addition, as the restored data X"(n). Meanwhile, in a case of the encoding mode of M(n)=0, the quantization means 31 outputs the output data "do" from the inverse quantization processing part 37 as it is, as the restored data X"(n).

Note that the decoding error generation means 35 can be realized, with the same structure as that of the encoding error generation means 19.

Namely, for example, in the same way as FIG. 16, it is also acceptable that the decoding error generation means 35 outputs the pseudo-random number having the distribution, in which the mean value is set to 0, as the decoding error data.

Further, in the same way as FIG. 17, it is also acceptable that the decoding error generation means 35 generates and outputs the decoding error data corresponding to the target fixed length code, by substituting the position coordinate information of the target fixed length code into the function formula held inside, to execute operation. Further, in the same way as FIG. 18, it is also acceptable that the decoding error generation means 35 selects the element corresponding to the position coordinate information of the target fixed length code from the matrix held inside, and generates and outputs the decoding error data corresponding to the target fixed length code.

The STRIPE_GRAD of 10-bit gradation shown in FIG. 19A is considered as an example of the input image data. At this time, in a case of using the image encoding device not having the encoding error generation means 19 and the encoding error adding means 20, the output data "do" of the inverse quantization means of the another embodiment is the same as the data of the STRIPE_GRAD_A image. Therefore, image STRIPE_GRAD_C of the restored data is expressed by the formula 6 as follows.

STRIPE_GRAD_$C(X,Y)$=([$Y$/32]×32+$eoR$, [$Y$/32]× 32+$eoG$, [$Y$/32]×32+$eoB$) (when $X$ is the odd number)

STRIPE_GRAD_$C(X,Y)$=(0,0,0) (when $X$ is the even number)  Formula 6

In a case of |eoC|<32 (C is any one of R,G, B) in the above-described formula 6, the data restored in the same value for each pixel by the image decoding device of the embodiment (FIG. 7), is distributed to different values by adding the decoding error data "eo" by the image decoding device of another embodiment of the present invention (FIG. 20). Therefore, the false contour hardly appears in the data after decoding.

(8) The image encoding/decoding system can be constituted by combining the encoding device described in (5) (FIG. 15), and the decoding device described in (7) (FIG. 20). In this case, error data (ei, eo) is added during encoding time and decoding time respectively, thereby increasing the effect of removing the false contour synergistically. In this case, the image STRIPE_GRAD_D of the restored data in this embodiment is expressed by the formula 7 as follows.

STRIPE_GRAD_$D(X,Y)$=([($Y$+$eiR$)/32]×32+$eoR$, [($Y$+$eiG$)/32]×32+$eoG$, [($Y$+$eiB$)/32]×32+$eoB$) (when $X$ is the odd number)

STRIPE_GRAD_$D(X,Y)$=(0,0,0) (when $X$ is the even number)  Formula 7

(9) In the encoding error generation means 19 (FIG. 15) of another embodiment described in (5), and the decoding error generation means 35 (FIG. 20) described in (7), respectively, a range of the generated error value can be restricted.

For example, in a case of |eiC|<32 (C is any one of R, G, B) in the STRIPE_GRAD_D image, the value of [(Y+eiC)/32]×32 is finally restricted to any one of the three values of ([Y/32]×32−32), ([Y/32]×32), ([Y/32]×32+32). Further, in the aforementioned three values, the lower-order 5 bits are 0. However, in a case of |eoC|<32, the value of [(Y+eiC)/32]× 32+eoC is finally the pixel value with arbitrary value used in the low-order 5 bits. According to another embodiment of the present invention described in (5) and (6), error is added during encoding or decoding, and therefore although the effect of not allowing the false contour to appear in the image data after decoding can be obtained, there is a possibility that a noise in a screen is increased by the added error itself. Therefore, the noise in the screen is reduced by restricting the range of the generated error, so that visually excellent restored data can be obtained in some cases, while suppressing the false contour.

In order to restrict the range of error values, it is also acceptable to set a condition that the encoding error data within a prescribed range is calculated when each error value is calculated for example, as shown in FIG. 16 to FIG. 18. For example, in a case of the structure of FIG. 16, an upper limit value and a lower limit value may be previously set in the pseudo-random number outputted from the pseudo-random generator 71. Further, in a case of the structure of FIG. 17, functions may be previously set so as to calculate the error data showing the value between the prescribed upper limit value and lower limit value, when each coordinate information is inputted. Further, in a case of the structure of FIG. 18, each element of the error matrix may be previously set so as to show the value showing the upper limit value and the lower limit value.

The invention claimed is:

1. An image encoding device that compresses and encodes pixel data of a prescribed image data format of pixels arranged in a scan order into a fixed length code, comprising:
predicted value generation means for predicting target pixel data serving as pixel data of a target pixel to be encoded and generating predicted value data;
a subtractor for calculating a differential value between the target pixel data and the predicted value data and generating differential value data;
encoding mode decision means for deciding an encoding mode serving as information showing an encoding method based on the differential value data;
a first buffer for temporarily holding the encoding mode;
encoding target decision means for deciding which of the target pixel data and the differential value data is used as encoding target data serving as a target to which encoding processing is applied, based on the encoding mode;
quantization means for applying re-quantization processing to the encoding target data, based on the encoding mode, and generating quantized data; and
fixed length code generation means for adding the encoding mode to the quantized data, and generating a fixed length code, wherein
the encoding mode decision means compares an absolute value of the differential value data, and a threshold value uniquely decided from a plurality of values by the encoding modes of one or more preceding pixels immediately before the target pixel, and generates the encoding mode with fixed length data, the encoding mode showing first information that indicates the differential value data is used as the encoding target data when the absolute value of the differential value data is the threshold value or less, and showing second information that indicates the target pixel data is used as the encoding target data when the absolute value of the differential value data exceeds the threshold value, and
the quantization means decides a quantization step in accordance with the encoding mode of the target pixel and the threshold value, and applies re-quantization processing to the encoding target data with the quantization step to generate the quantized data with fixed length.

2. The image encoding device according to claim 1, wherein
a number of bits of the quantized data is a natural number "m" of 2 or more,
when the encoding mode of the target pixel shows the first information and the threshold value is $2^{m-1}$ or less, the quantization means generates the quantized data by expressing the differential value data by a signed integer of m-bits without applying re-quantization processing to the differential value data, and
when the encoding mode of the target pixel shows the first information and the threshold value is larger than $2^{m-1}$, the quantization means generates the quantized data by clipping an absolute value of the differential value data at $2^{m-1}$ and expressing the clipped differential value data by a signed integer of m-bits.

3. The image encoding device according to claim 1, wherein
a number of bits of the quantized data is a natural number "m" of 2 or more,
when the encoding mode of the target pixel shows the first information and the threshold value is $2^{m-1}$ or less, the quantization means generates the quantized data by expressing the differential value data by a signed integer of m-bits without applying re-quantization processing to the differential value data, and
when the encoding mode of the target pixel shows the first information and the threshold value is a number of s-bits larger than $2^{m-1}$, where s is a natural number, the quantization means generates the quantized data by dividing the differential value data by $2^{s-m}$.

4. The image encoding device according to claim 1, wherein
a number of bits of the quantized data is a natural number "m" of 2 or more, and a number of bits of the target image data is a natural number "n" of "m" or more, and
when the encoding mode of the target pixel shows the second information, the quantization means generates the quantized data by dividing the target pixel data by $2^{n-m}$.

5. The image encoding device according to claim 1, wherein
the pixel data is digitized for every prescribed components constituting the pixel,
the subtractor calculates the differential value between the target pixel data and the predicted value data for every prescribed components, and generates the differential value data, and
the encoding mode decision means compares a maximum value of the absolute value of the differential value data calculated for every prescribed components, and a threshold value uniquely decided from a plurality of values by the encoding modes of one or more preceding pixels immediately before the target pixel, and generates the encoding mode with fixed length data, the encoding mode showing first information that indicates the differential value data is used as the encoding target data when a maximum value of the absolute value of the differential value data is the threshold value or less, and showing second information that indicates the target pixel data is used as the encoding target data when a maximum value of the absolute value of the differential value data exceeds the threshold value.

6. The image encoding device according to claim 1, wherein
the encoding mode decision means decides the encoding mode of a pixel at a head of the pixels arranged in a scan order as the first information.

7. The image encoding device according to claim 1, wherein
the predicted value generation means generates predicted value data by restoring pixel data of one preceding pixel immediately before the target pixel, based on the quantized data generated based on one preceding pixel data immediately before the target pixel, and the encoding mode of pixel data of one preceding pixel immediately before the target pixel and the encoding modes of one or more pixel data of further one or more preceding pixels before the target pixel read from the first buffer.

8. The image encoding device according to claim 1, wherein the encoding mode is expressed by a fixed length code composed of 1 bit.

9. The image encoding device according to claim 1, wherein the encoding mode decision means forcibly decides the encoding mode as the first information, for every prescribed number of pixels.

10. The image encoding device according to claim 1, wherein the encoding mode decision means forcibly decides the encoding mode as the first information, based on a signal inputted from outside.

11. The image encoding device according to claim 1, wherein
there is a difference between a method of re-quantization processing applied to the encoding target data of a head pixel and a method of re-quantization processing applied to the encoding target data of other pixels, performed by the quantization means, and
pixel data of the head pixel is encoded to a plurality of fixed length codes having a number of bits that is equal to or more than that of the pixel data.

12. The image encoding device according to claim 1, further comprising
a converter for converting an image data format from a first image data format to a second image data format, to thereby compress data amount, wherein
when pixel data of the first image data format is inputted, an image data format of the inputted pixel data is converted to the second image data format by the converter, and thereafter the converted pixel data of the second image data format is compressed and encoded to the fixed length code.

13. The image encoding device according to claim 1, further comprising:
differential value quantization means for generating quantized differential value data by calculating differential statistical data based on statistical information of the encoding modes of statistical target pixels ranging from one preceding pixel immediately before the target pixel to be encoded to a pixel preceding the target pixel by one or more prescribed number of pixels, the differential statistical data showing a larger value, as a pixel differential value between each pixel and its preceding pixel within the statistical target pixels becomes smaller, and by dividing the differential value data outputted from the subtractor by the differential statistical data, wherein
the encoding mode decision means decides the encoding mode based on the quantized differential value data instead of the differential value data, and
the encoding target decision means decides which of the quantized differential value data, instead of the differential value data, and the target pixel data is used as the encoding target data.

14. The image encoding device according to claim 13, wherein
the differential value quantization means calculates the differential statistical data, based on a number of encoding modes showing the first information out of the encoding modes of the statistical target pixels, and a number of the statistical target pixels.

15. The image encoding device according to claim 13, wherein
the differential value quantization means calculates the differential statistical data for every prescribed number of pixels or frames.

16. The image encoding device according to claim 13, wherein
the differential value quantization means forcibly decides the differential statistical data based on a signal inputted from outside, irrespective of statistical information of the encoding modes of the statistical target pixels.

17. The image encoding device according to claim 1, further comprising:
encoding error generation means for generating and outputting encoding error data, based on the target pixel data or irrespective of the target pixel data; and
encoding error adding means for adding the encoding error data and the target pixel data, and outputting error-added target pixel data to the encoding target decision means, wherein
when the encoding target mode shows the second information, the encoding target decision means decides that the error-added target pixel data is used as the encoding target data, instead of the target pixel data.

18. The image encoding device according to claim 17, wherein
the encoding error generation means outputs a pseudo-random number having distribution in which a mean value is 0, as the encoding error data.

19. The image encoding device according to claim 17, wherein
the encoding error generation means generates and outputs the encoding error data corresponding to the target pixel data, by substituting position coordinate information of the target pixel data into function formula held inside to execute operation.

20. The image encoding device according to claim 17, wherein
the encoding error generation means selects an element corresponding to position coordinate information of the target pixel data, from a matrix held inside, and generates and outputs the encoding error data corresponding to the target pixel data.

21. The image encoding device according to claim 13, further comprising:
encoding error generation means for generating and outputting encoding error data, based on the target pixel data, or irrespective of the target pixel data; and
encoding error adding means for adding the encoding error data and the target pixel data, and outputting error-added target pixel data to the encoding target decision means, wherein
when the encoding target mode shows the second information, the encoding target decision means decides that the error-added target pixel data is used as the encoding target data, instead of the target pixel data.

22. The image encoding device according to claim 21, wherein
the encoding error generation means outputs a pseudo-random number having a distribution in which a mean value is 0, as the encoding error data.

23. The image encoding device according to claim 21, wherein
the encoding error generation means generates and outputs the encoding error data corresponding to the target pixel data, by substituting position coordinate information of the target pixel data into function formula held inside to execute operation.

24. The image encoding device according to claim 21, wherein
the encoding error generation means selects an element corresponding to position coordinate information of the target pixel data, from a matrix held inside, and generates and outputs the encoding error data corresponding to the target pixel data.

25. An image decoding device that generates restored data of the prescribed image data format from the fixed length code to which encoding processing is applied by the image encoding device according to claim 1, the image decoding device comprising:
decoding means for recognizing the encoding mode and the quantized data from a target fixed length code serving as the fixed length code to be restored;
inverse quantization means for generating the restored data by applying inverse quantization processing to the quantized data recognized by the decoding means; and
a second buffer for temporarily holding the encoding mode included in the target fixed length code and the restored data generated by the inverse quantization means, wherein
the decoding means recognizes the encoding mode and the quantized data from the target fixed length code, and transmits the recognized quantized data to the inverse quantization means, and temporarily holds the encoding mode in the second buffer, and
when the encoding mode shows the second information, the inverse quantization means generates the restored data by applying inverse quantization processing to the quantized data based on the quantization step associated with the encoding mode showing the second information, and temporarily holds the restored data in the second buffer, and
when the encoding mode shows the first information, the inverse quantization means reads from the second buffer the encoding mode of one preceding pixel, and generates the restored data by reading from the second buffer the restored data of one preceding pixel and adding the read restored data to a value obtained by applying inverse quantization processing to the quantized data based on the quantization step associated with the values of the encoding mode included in the target fixed length code and the encoding mode of one preceding pixel, and temporarily holds the restored data in the second buffer.

26. An image decoding device that generates restored data of the prescribed image data format from the fixed length code to which encoding processing is applied by the image encoding device according to claim 13, the image decoding device comprising:
decoding means for recognizing the encoding mode and the quantized data from a target fixed length code serving as the fixed length code to be restored;
inverse quantization means for generating the restored data by applying inverse quantization processing to the quantized data recognized by the decoding means; and
a second buffer for temporarily holding the encoding mode included in the target fixed length code and the restored data generated by the inverse quantization means, wherein
the decoding means recognizes the encoding mode and the quantized data from the target fixed length code, and transmits the recognized quantized data to the inverse quantization means, and temporarily holds the encoding mode in the second buffer, and
when the encoding mode shows the second information, the inverse quantization means generates the restored data by applying inverse quantization processing to the quantized data based on the quantization step associated with the encoding mode showing the second information, and temporarily holds the restored data in the second buffer, and
when the encoding mode shows the first information, the inverse quantization means reads from the second buffer the encoding modes of statistical target pixels down to a preceding pixel by one or more prescribed number of pixels to calculate the differential statistical data, reads the encoding mode of one preceding pixel, generates the restored data by applying inverse quantization processing to the quantized data based on the quantization step associated with the values of the encoding mode included in the target fixed length code and the encoding mode of one preceding pixel, multiplying a value obtained by the inverse quantization processing by the differential statistical data, reading the restored data of one preceding pixel from the second buffer, and adding the read restored data to a multiplication result, and temporarily holds the restored data in the second buffer.

27. An image decoding device that generates restored data of the prescribed image data format from the fixed length code to which encoding processing is applied by the image encoding device according to claim 17, the image decoding device comprising:
decoding means for recognizing the encoding mode and the quantized data from a target fixed length code serving as the fixed length code to be restored;
inverse quantization means for generating the restored data by applying inverse quantization processing to the quantized data recognized by the decoding means; and
a second buffer for temporarily holding the encoding mode included in the target fixed length code and the restored data generated by the inverse quantization means, wherein
the decoding means recognizes the encoding mode and the quantized data from the target fixed length code, and transmits the recognized quantized data to the inverse quantization means, and temporarily holds the encoding mode in the second buffer, and
when the encoding mode shows the second information, the inverse quantization means generates the restored data by applying inverse quantization processing to the quantized data based on the quantization step associated with the encoding mode showing the second information, and temporarily holds the restored data in the second buffer, and
when the encoding mode shows the first information, the inverse quantization means reads from the second buffer the encoding mode of one preceding pixel, and generates the restored data by reading from the second buffer the restored data of one preceding pixel and adding the read restored data to a value obtained by applying inverse quantization processing to the quantized data based on the quantization step associated with the values of the encoding mode included in the target fixed length code and the encoding mode of one preceding pixel, and temporarily holds the restored data in the second buffer.

28. An image decoding device that generates restored data of the prescribed image data format from the fixed length code to which encoding processing is applied by the image encoding device according to claim 21, the image decoding device comprising:
decoding means for recognizing the encoding mode and the quantized data from a target fixed length code serving as the fixed length code to be restored;

inverse quantization means for generating the restored data by applying inverse quantization processing to the quantized data recognized by the decoding means; and a second buffer for temporarily holding the encoding mode included in the target fixed length code and the restored data generated by the inverse quantization means, wherein the decoding means recognizes the encoding mode and the quantized data from the target fixed length code, and transmits the recognized quantized data to the inverse quantization means, and temporarily holds the encoding mode in the second buffer, and when the encoding mode shows the second information, the inverse quantization means generates the restored data by applying inverse quantization processing to the quantized data based on the quantization step associated with the encoding mode showing the second information, and temporarily holds the restored data in the second buffer, and when the encoding mode shows the first information, the inverse quantization means reads from the second buffer the encoding mode of one preceding pixel, and generates the restored data by reading from the second buffer the restored data of one preceding pixel and adding the read restored data to a value obtained by applying inverse quantization processing to the quantized data based on the quantization step associated with the values of the encoding mode included in the target fixed length code and the encoding mode of one preceding pixel, and temporarily holds the restored data in the second buffer.

29. The image decoding device according to claim 25, comprising:

decoding error generation means for generating and outputting decoding error data, based on the target fixed length code or irrespective of the target fixed length code; and decoding error adding means for outputting error-added restored data obtained by adding the decoded error data to the restored data when the encoding mode included in the target fixed length code shows the second information, wherein when the encoding mode shows the second information, the inverse quantization means applies inverse quantization processing to the quantized data based on the quantization step associated with the encoding mode showing the second information, the decoding error adding means adds the decoded error data thereto to generate the error-added restored data, and the inverse quantization means temporarily holds the error-added restored data as the restored data in the second buffer.

30. The image decoding device according to claim 29, wherein the decoding error generation means outputs a pseudorandom number having distribution in which a mean value is 0, as the decoding error data.

31. The image decoding device according to claim 29, wherein the decoding error generation means generates and outputs the decoding error data corresponding to the target fixed length code, by substituting position coordinate information of the target fixed length code into function formula held inside to execute operation.

32. The image decoding device according to claim 29, wherein the decoding error generation means selects an element corresponding to position coordinate information of the target fixed length code from a matrix held inside, and generates and outputs the decoding error data corresponding to the target fixed length code.

33. An image encoding method of compressing pixel data to a fixed length code and encoding the compressed pixel data, the pixel data having a prescribed image data format with pixels arranged in a scan order, the method comprising steps of:

generating predicted value data by predicting target pixel data serving as pixel data of an encoding target pixel;

generating differential value data by calculating a differential value between the target pixel data and the predicted value data;

deciding an encoding mode serving as information showing the encoding method based on the differential value data, and temporarily holding the encoding mode; and deciding which of the target pixel data and the differential value data is used as encoding target data, to which encoding processing is applied, based on the encoding mode;

generating quantized data by applying re-quantization processing to the encoding target data based on the encoding mode; and generating a fixed length code by adding the encoding mode to the quantized data, wherein the step of deciding the encoding mode includes comparing an absolute value of the differential value data and a threshold value uniquely decided from a plurality of values by the encoding modes of one or more preceding pixels immediately before the target pixel, and generating the encoding mode with fixed length data, the encoding mode showing first information that indicates the differential value data is used as the encoding target data when the absolute value of the differential value data is the threshold value or less, and showing second information that indicates the target pixel data is used as the encoding target data when the absolute value of the differential value data exceeds the threshold value, and the step of generating the quantized data includes deciding a quantization step in accordance with the encoding mode of the target pixel and the threshold value, and applying the re-quantization processing to the encoding target data with the quantization step to generate the quantized data having a fixed length.

34. The image encoding method according to claim 33, further comprising steps of:

generating quantized differential value data by calculating differential statistical data based on statistical information of the encoding modes of statistical target pixels ranging from one preceding pixel immediately before the target pixel to be encoded to a pixel preceding the target pixel by one or more prescribed number of pixels, the differential statistical data showing a larger value, as a pixel differential value between each pixel and its preceding pixel within the statistical target pixels becomes smaller, and by dividing the differential value data by the differential statistical data, wherein the step of deciding the encoding mode includes deciding the encoding mode based on the quantized differential value data instead of the differential value data, and the step of deciding the encoding target data includes deciding which of the quantized differential value data, instead of the differential value data, and the target pixel data is used as the encoding target data.

35. The image encoding method according to claim 33, comprising steps of:

generating encoding error data based on the target pixel data or irrespective of the target pixel data; and adding the encoding error data and the target pixel data and outputting error-added target pixel data, wherein the step of deciding the encoding target data includes deciding that the error-added target pixel data is used as the encoding target data, instead of the target pixel data when the encoding target mode shows the second information.

36. An image decoding method of generating restored data of the prescribed image data format, from the fixed length code to which encoding processing is applied by the image encoding method according to claim 33, the image decoding method comprising steps of:

deciding the encoding mode and the quantized data, from a target fixed length code serving as the fixed length code to be restored; and applying inverse quantization processing to the quantized data decided by the step of deciding the encoding mode and the quantized data and generating the restored data, wherein the step of deciding the encoding mode and the quantized data includes deciding the encoding mode and the quantized data from the encoded data and temporally holding the encoding mode, and the step of applying inverse quantization processing includes generating the restored data in such a way that:

when the encoding mode shows the second information, the quantized data is subjected to inverse quantization processing based on the quantization step associated with a value of the encoding mode showing the second information; and when the encoding mode shows the first information, the restored data of one preceding pixel is read, and the read data is added to a value obtained by applying inverse quantization processing to the quantized data based on the quantization step associated with values of the encoding mode included in the target fixed length code and the encoding mode of one preceding pixel.

37. An image decoding method of generating restored data of the prescribed image data format, from the fixed length code to which encoding processing is applied by the image encoding method according to claim 34, the image decoding method comprising steps of:

deciding the encoding mode and the quantized data, from a target fixed length code serving as the fixed length code to be restored; and applying inverse quantization processing to the quantized data decided by the step of deciding the encoding mode and the quantized data, and generating the restored data, wherein the step of deciding the encoding mode and the quantized data includes deciding the encoding mode and the quantized data from the encoded data and temporally holding the encoding mode, and the step of applying inverse quantization processing includes generating the restored data in such a way that:

when the encoding mode shows the second information, the quantized data is subjected to inverse quantization processing based on the quantization step associated with a value of the encoding mode showing the second information; and when the encoding mode shows the first information, the encoding modes of statistical target pixels down to a preceding pixel by one or more prescribed number of pixels are read, the differential statistical data is calculated, the encoding mode of one preceding pixel is read, the quantized data is subjected to inverse quantization processing based on the quantization step associated with values of the encoding mode included in the target fixed length code and the encoding mode of one preceding pixel, a value obtained by the inverse quantization processing is multiplied by the differential statistical data, and the restored data of one preceding pixel is read and added to the multiplication result.

38. The image decoding method according to claim 36, further comprising steps of:

generating decoding error data based on the target fixed length code or irrespective of the target fixed length code and outputting the decoding error data; and obtaining error-added restored data by adding the decoding error data to the restored data and outputting the error-added restored data when the encoding mode included in the target fixed length code shows the second information, wherein when the encoding mode shows the second information, the step of applying inverse quantization processing includes applying inverse quantization processing to the quantized data based on the quantization step associated with the encoding mode showing the second information, and temporarily holding the error-added restored data, which is obtained by adding the decoded error data to resultant data of the inverse quantization processing, as the restored data.

* * * * *